(12) United States Patent
Maly et al.

(10) Patent No.: US 10,659,881 B2
(45) Date of Patent: May 19, 2020

(54) MOBILE AUDIO MESH DISTRIBUTION SYSTEM AND METHOD

(71) Applicants: Andrew Alexander Maly, Bryan, TX (US); Viktor Yevgenievich Vlassov, College Station, TX (US)

(72) Inventors: Andrew Alexander Maly, Bryan, TX (US); Viktor Yevgenievich Vlassov, College Station, TX (US)

(*) Notice: Subject to any disclaimer, the term of this patent is extended or adjusted under 35 U.S.C. 154(b) by 0 days.

(21) Appl. No.: 16/672,782

(22) Filed: Nov. 4, 2019

(65) Prior Publication Data

US 2020/0059725 A1  Feb. 20, 2020

Related U.S. Application Data

(63) Continuation-in-part of application No. 15/648,404, filed on Jul. 12, 2017, now Pat. No. 10,469,895, which is a continuation-in-part of application No. 14/336,786, filed on Jul. 21, 2014, now abandoned.

(60) Provisional application No. 61/856,519, filed on Jul. 19, 2013.

(51) Int. Cl.
| | |
|---|---|
| *H04R 5/04* | (2006.01) |
| *H04B 17/318* | (2015.01) |
| *G01T 7/12* | (2006.01) |
| *G06K 9/00* | (2006.01) |
| *G05D 1/00* | (2006.01) |
| *G05D 1/02* | (2020.01) |
| *B64C 39/02* | (2006.01) |

(52) U.S. Cl.
CPC ............ *H04R 5/04* (2013.01); *B64C 39/024* (2013.01); *G01T 7/125* (2013.01); *G05D 1/0022* (2013.01); *G05D 1/0027* (2013.01); *G05D 1/0202* (2013.01); *G06K 9/0063* (2013.01); *H04B 17/318* (2015.01); *B64C 2201/12* (2013.01)

(58) Field of Classification Search
CPC .................................................. H04N 21/4307
USPC ......................................................... 386/201
See application file for complete search history.

(56) References Cited

U.S. PATENT DOCUMENTS

| | | | | |
|---|---|---|---|---|
| 5,979,591 | A * | 11/1999 | Harrison .................. | H04R 1/02 181/151 |
| 2011/0229105 | A1* | 9/2011 | Khan ..................... | H04N 5/765 386/200 |
| 2016/0350067 | A1* | 12/2016 | Sundaresan ............ | G06F 3/165 |

* cited by examiner

*Primary Examiner* — Eileen M Adams
*Assistant Examiner* — Daniel T Tekle
(74) *Attorney, Agent, or Firm* — Kevin Mark Klughart

(57) ABSTRACT

A mobile audio mesh distribution (MAD) system/method allowing synchronized audio distribution to modular audio modules (MAMs) and/or drone delivery aircraft (DDA) in mesh audio network (MAN) is disclosed. The system/method utilizes a computer control system (CCS) that communicates wirelessly using a plurality of RF transceivers (RFT) over a RF mesh network (RMN) with one or more MAM that are configured to independently communicate with each other and automatically determine if audio updates are required from the CCS. The MAM are configured to query other MAMs in the RMN to determine if a connected MAM has updated audio/text (UAT), and if so, to download the UAT and schedule audio playback on a speaker. Messages may be transmitted to the MAM in the event of an emergency, terrorist event, or a physical event detected (PED) using prerecorded or updated audio that trigger immediate or scheduled playback by the MAM.

20 Claims, 64 Drawing Sheets

2700

3100

3200

3300

3800

5200

MOBILE AUDIO MESH DISTRIBUTION SYSTEM AND METHOD

CROSS REFERENCE TO RELATED APPLICATIONS

Continuation-In-Part Patent Application (CIP)

This is a continuation-in-part (CIP) patent application of and incorporates by reference United States Utility Patent Application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as U.S. Pat. No. 10,469,895 on Nov. 5, 2019.

UTILITY PATENT APPLICATIONS

This patent application claims benefit under 35 U.S.C. 120 and incorporates by reference United States Utility Patent Application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as U.S. Pat. No. 10,469,895 on Nov. 5, 2019.

United States Utility Patent Application for MOBILE AUDIO DISTRIBUTION SYSTEM AND METHOD by inventor Andrew Maly, et al., filed electronically with the USPTO on 12 Jul. 2017, with Ser. No. 15/648,404, EFS ID 29767564, confirmation number 8703, issued as MOBILE AUDIO MESH DISTRIBUTION SYSTEM AND METHOD U.S. Pat. No. 10,469,895 on Nov. 5, 2019 claims benefit under 35 U.S.C. § 120 and incorporates by reference United States Utility Patent Application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023.

PROVISIONAL PATENT APPLICATIONS

United States Utility Patent Application for MOBILE AUDIO/STEREO NETWORK AND SYSTEM by inventor Andrew Maly, et al., filed electronically with the USPTO on Jul. 21, 2014, with Ser. No. 14/336,786, EFSID 271855555, confirmation number 5023, claims benefit under 35 U.S.C. § 119 and incorporates by reference United States Provisional Patent Application for MOBILE AUDIO/STEREO NETWORK AND SYSTEM by inventor Andrew Maly, et al., filed electronically with the USPTO on Jul. 19, 2013, with Ser. No. 61/856,519, EFSID 27287845, confirmation number 8965.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to systems and methods associated distribution of audio over a spatially diverse area. Without limitation, the present invention relates to distribution of time-synchronized audio in public venues to mobile audio modules (MAMs) that communicate autonomously over a wireless mesh audio network (MAN) that may include the use of drone delivery aircraft (DDA). The present invention in some preferred embodiments may have particular anti-terrorist applications in contexts where terrorist events must be detected and emergency messages must be automatically disseminated across widely diverse spatial areas either in real-time or on a scheduled basis as directed by a computer control system (CCS) or automatically based on physical event detectors (PED) located within the MAM.

BRIEF SUMMARY OF THE INVENTION

The present invention allows a plurality of independent spatially diverse mobile audio modules (MAMs) to present MOBILE AUDIO MESH DISTRIBUTION SYSTEM AND METHOD coordinated audio that is distributed over a wide geographic area. Each MAM provides for distribution of audio from an audio playback recorder (APR) and/or synchronization input from a radio frequency receiver. The system and method described permit mass programming of a plurality of APRs with a single CCS and time synchronization on each APR as well as remote time synchronization of APR content using an independent time reference in each MAM that is utilized by a RF receiver to coordinate playback of APR content.

BRIEF DESCRIPTION OF THE DRAWINGS

For a fuller understanding of the advantages provided by the invention, reference should be made to the following detailed description together with the accompanying drawings wherein.

DESCRIPTION OF THE PRESENTLY PREFERRED EXEMPLARY EMBODIMENTS

Figure 1:
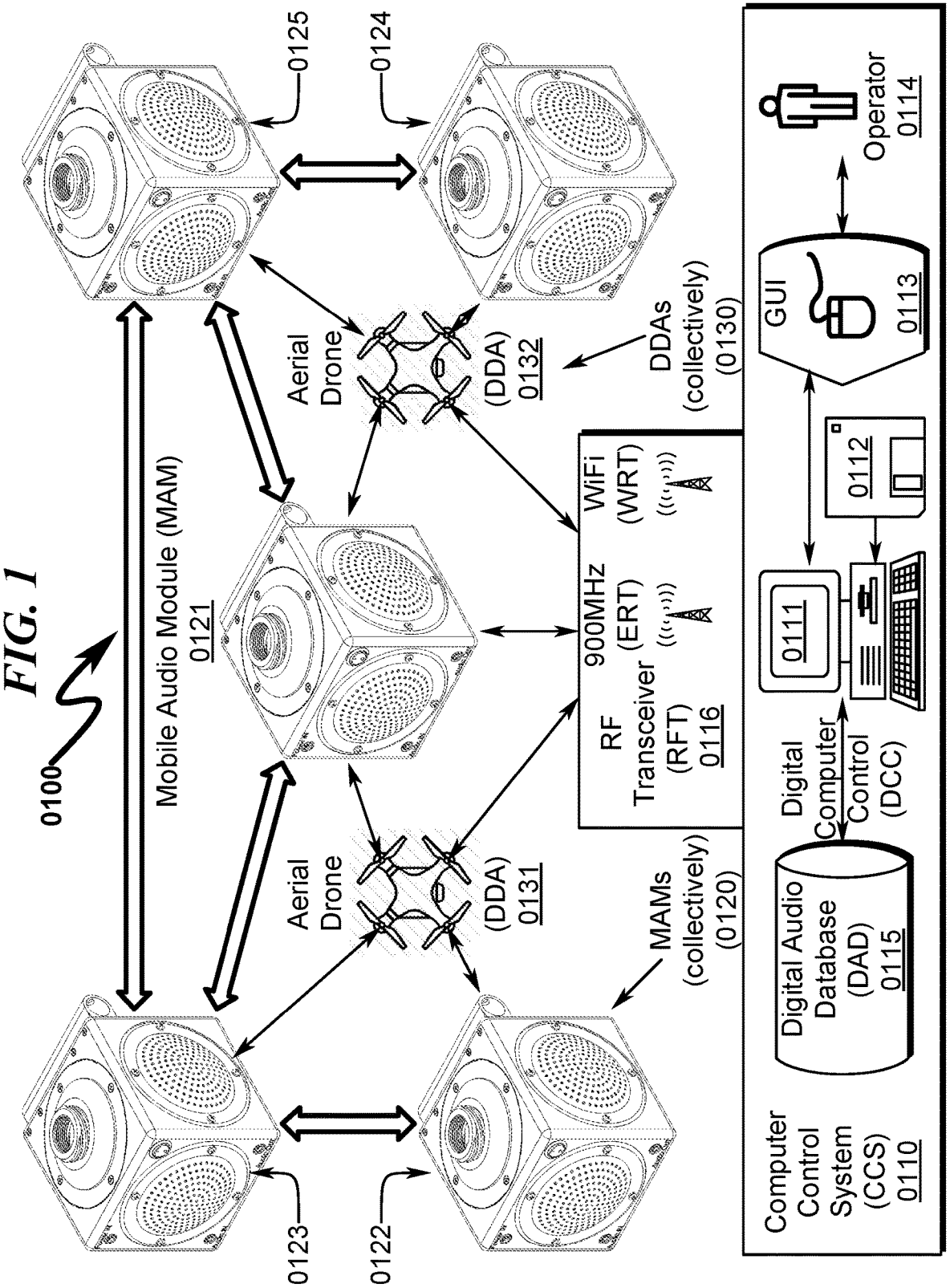
FIG. 1 illustrates a block diagram of a preferred exemplary system embodiment of the present invention.

While this invention is susceptible to embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a MOBILE AUDIO MESH DISTRIBUTION SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

MAM Physical Event Detector/Alarm (PED) not Limitive

Various embodiments of the MAM as described herein may include one or more physical environmental detectors/sensors and/or alarms. While the present invention specifically anticipates that these detectors may include: indicator light alarm; audio signal alarm; 900 MHz signal strength detector; WiFi signal strength detector; battery capacity detector; battery voltage detector; ambient temperature detector; internal temperature detector; GPS coordinate detector; GPS real-time clock (RTC) timebase reference detector; audio output volume detector; ambient sound volume detector; RFID tracking identifier detector; humidity detector; motion detector; wind speed detector; vibration detector; beta radiation detector; gamma radiation detector; neutron radiation detector; photo cell detector; visual image recording detector; infrared image recording detector; ultraviolet image recording detector; visual video recording detector; infrared video recording detector; and ultraviolet video recording detector, this list is not exhaustive nor limitive of the scope of detectors that may be incorporated within the MAM.

Note that the range of detectors provided above includes a number of detectors that are useful in detecting the result of terrorist events. As such, the deployment of a number of mesh-enabled MAM over a disparate spatial venue may provide the capability to localize a terrorist event once the event has occurred.

It should be noted that the present invention anticipates that the PED detectors may be configured as "triggering" detectors in which thresholds may be used to trigger events based on sensor detection. In addition, the PED detectors may be configured to continuously log information on the status of a particular detector and permit this information to be queried via a remote request or dumped to a third party MAM/CCS/DDA on the detection of some PED event. Thus, a "physical event detected" may encompass a number of situations in which a PED detector is queried and information from this detector is later transferred to a third party or internally analyzed within the MAM/CCS/DDA.

Wireless Communication not Limitive

While the present invention will be described in terms of WiFi (WRT/WMT) and 900 MHz (ERT/EMT) communication methodologies, the present invention is not limited to these particular types of wireless communication.

Emergency Radio Frequency Transceiver (ERT) not Limitive

While the present invention will be described in terms of an emergency radio frequency transceiver (ERT/EMT) that is herein described generally as a 900 MHz transceiver, the present invention anticipates that the EFT may utilize a wide range of frequency bands ranging from high frequency (HF) (3 MHz-30 MHz), VHF (30 MHz-300 MHz), UHF (300 MHz-3000 MHz), and microwave (3000 MHz and beyond). Thus, the EFT is not limited to a specific frequency range or band of frequencies but is rather determined based on the signal strength and distance over which the CCS must communicate with the various MAMs configured in the mobile audio mesh distribution system. As such, descriptions of 900 MHz radio frequency transceivers herein may reference any ERT/EMT configuration described above.

PAINLESSMESH Network not Limitive

The present invention in some preferred embodiments makes use of a PAINLESSMESH mesh networking library. PAINLESSMESH is a public domain software library known to one skilled in the art that takes care of the particulars of creating a simple mesh network using ESP8266 and ESP32 hardware. The goal is to allow the programmer to work with a mesh network without having to worry about how the network is structured or managed. PAINLESSMESH is a true ad-hoc network, meaning that no-planning, central controller, or router is required. Any system of one or more nodes will self-organize into fully functional mesh. The maximum size of the mesh is limited by the amount of memory in the heap that can be allocated to the sub-connections buffer and so should be really quite high.

PAINLESSMESH uses JSON objects for all its messaging. This makes the code and the messages human readable and painless to understand and second, it makes it painless to integrate PAINLESSMESH with JavaScript front-ends, web applications, and other apps.

PAINLESSMESH is designed to be used with Arduino, but it does not use the Arduino WiFi libraries. Rather the networking is all done using the native ESP32 and ESP8266 SDK libraries, which are available through the Arduino IDE.

While many preferred invention embodiments may make use of the PAINLESSMESH network, the present invention is not limited to this particular type of mesh network or the use of ESP8266 and ESP32 hardware.

Real-Time Clock (RTC) not Limitive

The present invention anticipates that a real-time clock may be used by the CCS and/or MAM and/or DDA in order to coordinate the playback of audio within the audio mesh distribution system and method. This real-time clock (RTC) may be implemented as a separate hardware clock on the CCS/MAM/DDA using an independent real-time clock (RTC) timebase reference and/or may incorporate the use of global positioning system (GPS) timing reference in order to implement a real-time clock. In some circumstances the local RTC hardware may be updated/calibrated using the timing obtained from GPS sources.

System Overview (0100)

An overview of a preferred exemplary system embodiment is illustrated in FIG. 1 (0100), wherein the system is divided into two cooperating mechanisms comprising a computer control system (CCS) (0110) and a plural network of asynchronously cooperating modular audio modules (MAM) (0121, 0122, 0123, 0124, 0125) (collectively referred to herein as MAM (0120)) and/or plural network of drone delivery aircraft (DDA) (0131, 0132) (collectively referred to herein as DDA (0130)). The CCS (0110) typically comprises a digital computer system (DCS) (0111) executing machine instructions from a computer readable medium (0112) and controlled by a graphical user interface (GUI) (0113) by an operator (0114). Within this context the DCS (0111) also has read/write access to a digital audio database (DAD) (0115) that may contain digitized audio, music, or text that will be distributed wirelessly (0116) to the MAM (0120) and/or DDA (0130). The DAD (0115) may also contain control information regarding dissemination of data to the MAM (0120) and/or DDA (0130) and playback of audio on the MAM (0120). The DAD (0115) may also contain inventory identification information on the various MAM (0120) and/or DDA (0130) as well as current GPS location of the various MAM (0120) and/or DDA (0130). Data within the DAD (0115) may also initiate a synchronized playback of the recorded audio on each of the MAM (0120) such that the recorded playback is synchronized in time based on an audio time reference (ATR) that may be located in the CCS (0110) and/or the MAM (0120)/DDA (0130).

The system as depicted provides for mobile audio mesh distribution within the context of the depicted MAM (0120)/DDA (0130) in that communication between the (CCS) (0110) RF transceiver (0116) and each of the depicted MAM (0120)/DDA (0130) need not be direct, but can be accomplished indirectly by having intermediate depicted MAM (0120)/DDA (0130) store/forward updated audio information to a given depicted MAM (0120)/DDA (0130) that is not in direct communication with the CCS) (0110) RF transceiver (0116). This is accomplished by having a CONFIG file on each MAM (0120)/DDA (0130) that may be compared with a received CONFIG file from an adjacent MAM (0120)/DDA (0130). If this comparison indicates that the received CONFIG file is newer than that present on a given MAM (0120)/DDA (0130), the given MAM (0120)/DDA (0130) replaces its CONFIG file with the newer file and downloads any additional appropriate data from an adjacent MAM (0120)/DDA (0130) to ensure that each member of the mesh network maintains a "fresh" audio configuration control as determined by the CCS (0110). The CONFIG file may optionally indicate a unique MAM ID to ensure that updates to the MAM (0120)/DDA (0130) are authorized by the CCS (0110) and not "spoofed" by an unauthorized third party.

Within this context it may be useful in some instances to deploy DDA (0130) over the spatial field of MAM (0120) to cover areas in which direct MAM/MAM communication is impossible due to wireless faults or broken wireless links. In these circumstances a DDA (0130) may be deployed aerially to bridge the gap between the outer boundaries of a mesh network and then fly over to another mesh network that has been severed from a network that has mesh connectivity with the CCS (0110) RF transceiver (RFT) (0116). By flying from a mesh that has connectivity with the CCS (0110) via the RFT (0116) to another isolated mesh not having connectivity with the CCS (0110), the DDA (0130) may transfer CONFIG data and audio files to the isolated mesh network. The DDA (0130) may also be configured to fly to a certain location and "nest" while updating one or more MAM, thus saving battery power by not requiring the DDA (0130) to be in continuous flight. The present invention anticipates many preferred embodiments will incorporate dual-band RF transceivers (RFT) (0116) supporting WiFi (for high speed local RF communication) and 900 MHz (for long distance low speed RF communication) communication methodologies.

With this modular mesh approach to audio distribution, the mechanical setup of speakers is simplified in that it is not necessary to have massively large bulky speakers in order to provide audio coverage for a spatially diverse venue such as a running race or large outdoor gathering spanning square miles of area. Instead, individual MAMs are programmed with audio that is synchronized by the CCS (0110) and simultaneously broadcast in either assemblies of MAMs (0120) and/or spatially diverse MAMs (0120).

Computer Control System (CCS) Overview (0200)

Figure 2:
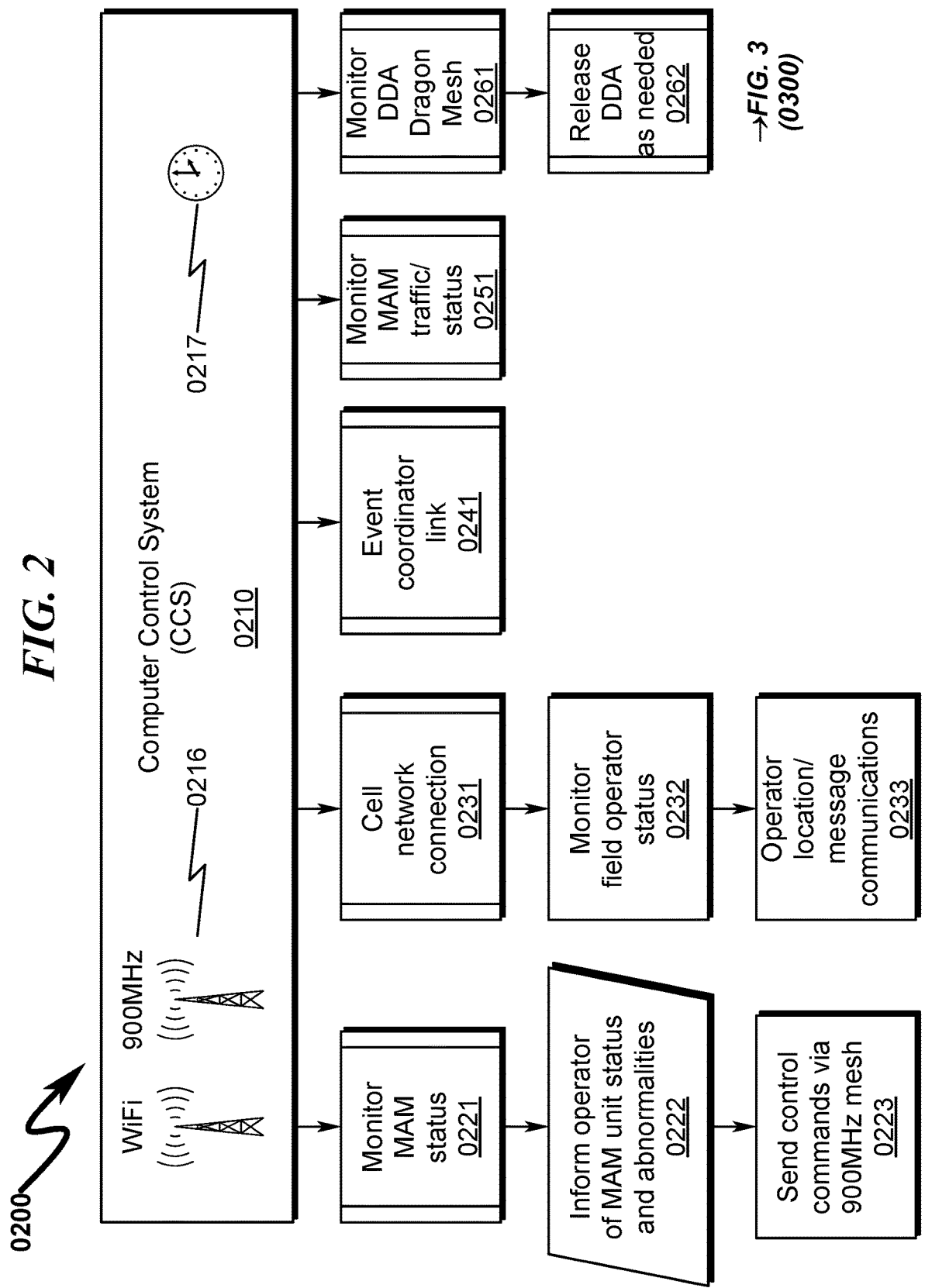
FIG. 2 illustrates a block diagram of a preferred exemplary system embodiment a computer control system (CCS) useful in some preferred embodiments of the present invention.

The computer control system (CCS) (0110, 0220) depicted in FIG. 1 (0100) is described in further detail in FIG. 2 (0200) as comprising a digital computer system (DCS) (0220) having a plurality of wireless RF transceivers (RFT) (0216) and real-time clock (0217) capabilities. Within this context the CCS (0210) provides for a number of simultaneous monitoring and data transfer capabilities. These may include the following:

Monitoring the status (0221) of MAM connected to the wireless network (0216) and informing operators of MAM unit status and abnormalities (0222) while permitting commands to the MAM to be transmitted using a 900 MHz wireless network (0223).

Operating a cellular network (0231) that allows monitoring of field operator status (0232) and determining the location of MAM and providing for message communication to the MAM (0233).

Providing for a link to an event coordinator to allow overall control of the mobile audio mesh distribution system to be centrally controlled remotely (0241).

Monitoring MAM data communications traffic and physical status (0251) to troubleshoot communication failures and determine the physical environment surrounding the MAM. This may include a wide variety of physical event detectors (PED) that monitor the environment in which the MAM is located.

Figure 3:
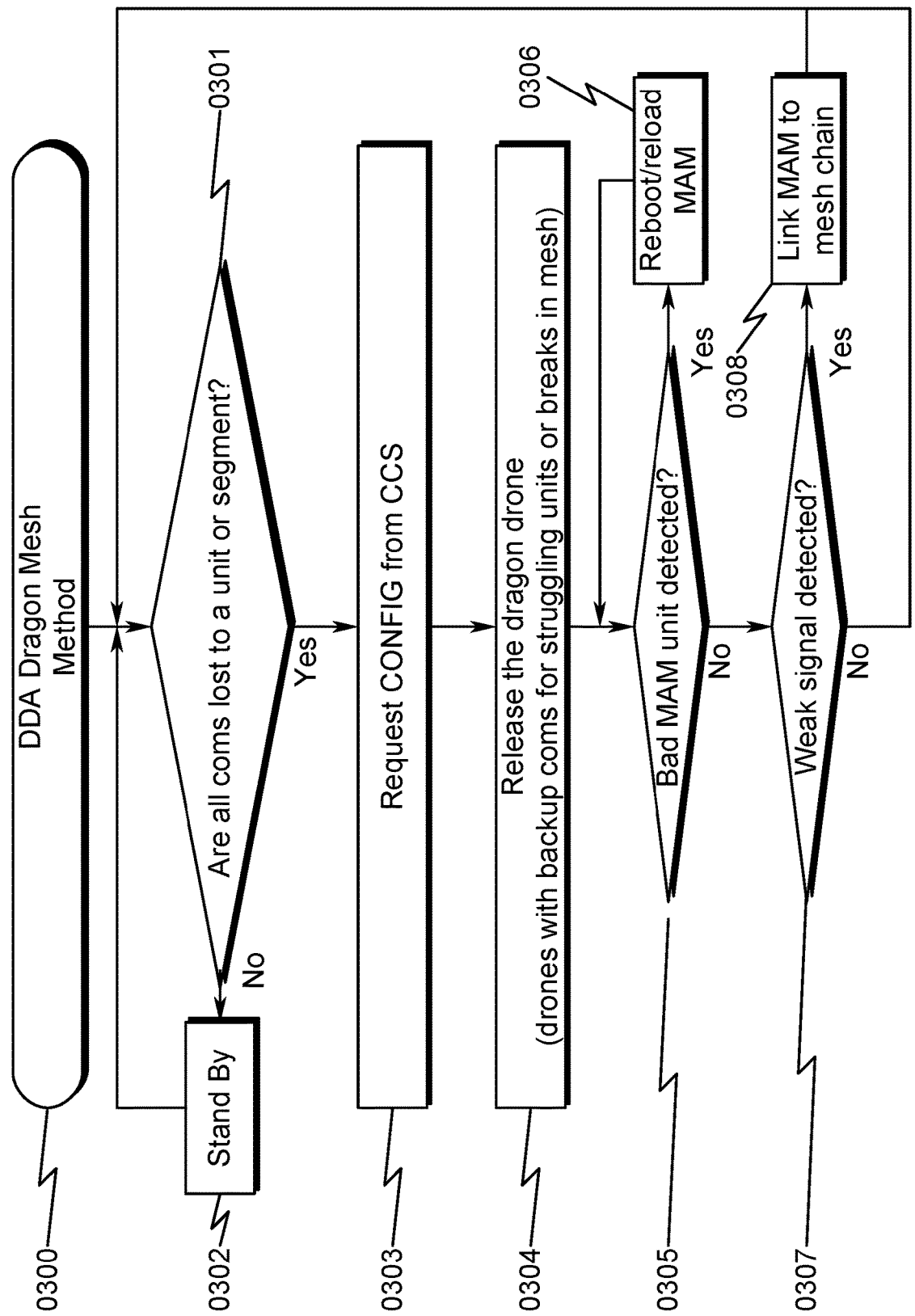
FIG. 3 illustrates a flowchart of a preferred exemplary DDA Dragon Mesh method useful in some preferred embodiments of the present invention.

Controlling and monitoring one or more drone delivery aircraft (DDA) that operate an aerial mesh network (0261) to allow bridging of mesh networks that are not connected but wish to be controlled by the CCS (0210) and releasing DDA as needed (0262). Additional detail of this functionality is provided in FIG. 3 (0300).

One skilled in the art will recognize that these monitoring and control functions are not limitive of the scope of the claimed invention.

Drone Delivery Aircraft (DDA) Overview (0300)

As depicted in FIG. 2 (0200), the CCS (0210) may incorporate support to control a DDA (0261) that communicates with MAM while flying over an area of separated MAM mesh networks. More detail of how this DDA function operates is generally depicted in the DDA dragon mesh method flowchart of FIG. 3 (0300). This method generally involves the following steps:

(1) Determining if all communication is lost to a unit or a mesh network segment, and if so, proceeding to step (3) (0301);
(2) Entering a standby state and proceeding to step (1) (0302);
(3) Requesting a CONFIG file from the CCS (0302);
(4) Requesting a CONFIG file from the CCS (0303);
(5) Releasing the DDA dragon drone containing backup communications for use with struggling MAMs or breaks in the audio mesh network (0304);
(6) Determining if a MAM is defective or not operational, and if not, proceeding to step (7) (0305);
(7) Rebooting and/or reloading the MAM that has been detected as defective or not operational and proceeding to step (5) (0306);
(8) Determining if a weak signal is detected from a MAM, and if not, proceeding to step (1) (0307); and
(9) Linking the MAM to the mesh network and proceeding to step (1) (0308).

One skilled in the art will recognize that these method steps may be augmented or rearranged without limiting the teachings of the present invention. This general method overview may be augmented by the various elements described herein to produce a wide variety of invention embodiments consistent with this overall design description.

This methodology allows a DDA to be deployed over a wide area and permits the DDA to bridge gaps between audio mesh networks that are spatially separated such that communication between MAM at the edges of these networks is not possible. Deployment of the DDA also permits GPS coordinates of disparate audio mesh networks to be determined and relayed back to the CCS.

MAM Overview (0400)

Figure 4:
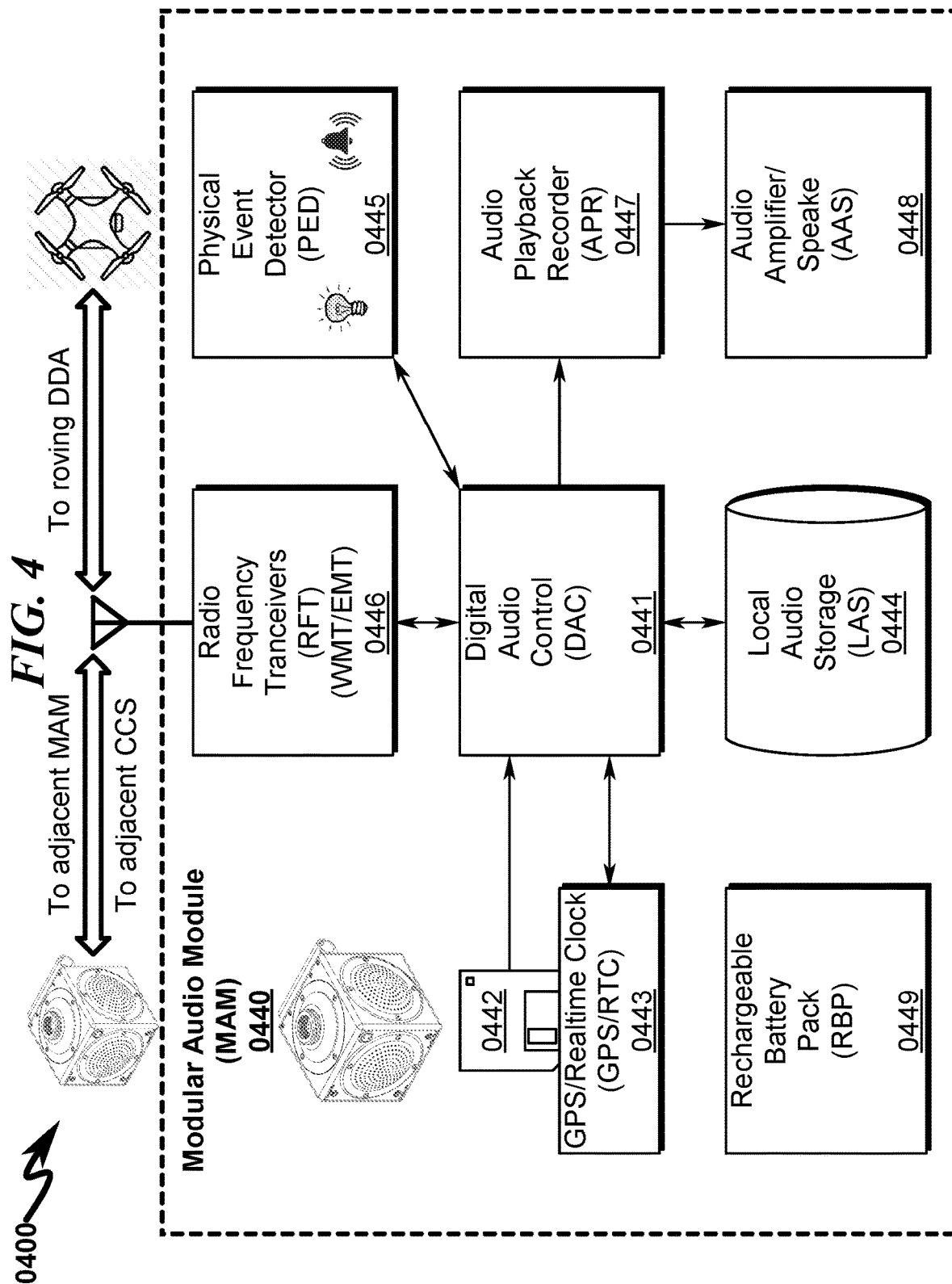
FIG. 4 illustrates a block diagram of a preferred exemplary system embodiment a mobile audio module (MAM) useful in some preferred embodiments of the present invention.

An overview of a preferred exemplary mobile audio module (MAM) (0440) embodiment is depicted generally in FIG. 4 (0400). The MAM (0440) operation is coordinated by a digital audio control (DAC) (0441) (typically a microcontroller or microprocessor) executing machine instructions retrieved from a tangible computer readable medium (0442) and may incorporate use of a global positioning system (GPS)/real-time clock (RTC) (0443) to synchronize playback of audio files retrieved from a local audio file storage (LAS) (0444) based on an absolute time reference and/or log a time reference stamp contained within data stored on the LAS (0444).

The MAM (0440) may also incorporate a wide variety of physical event detectors (PED) (0445) including but not limited to: indicator light alarm; audio signal alarm; 900 MHz signal strength detector; WiFi signal strength detector; battery capacity detector; battery voltage detector; ambient temperature detector; internal temperature detector; GPS coordinate detector; GPS real-time clock (RTC) timebase reference detector; audio output volume detector; ambient sound volume detector; RFID tracking identifier detector; humidity detector; motion detector; wind speed detector; vibration detector; beta radiation detector; gamma radiation detector; neutron radiation detector; photo cell detector; visual image recording detector; infrared image recording detector; ultraviolet image recording detector; visual video recording detector; infrared video recording detector; and ultraviolet video recording detector.

These PED (0445) may detect a wide variety of physical events that may be recorded locally and/or transmitted as messages back to the CCS via the mesh network. The present invention specifically anticipates that some of these physical events and messages may relate to the detection of events that are associated with acts of terrorism and terrorist activity. The PED detectors anticipated may also provide for audible/visual signal indicators to permit additional information to be presented to the public at the location of the MAM.

Communication with the CCS and other MAM/DDA is accomplished with a plurality of frequency transceivers (RFT) (0446) that generally include a WiFi radio frequency transceiver (WRT) and an emergency radio frequency transceiver (ERT). This communication with the CCS and other MAM/DDA may utilize one or more wireless frequencies or communication methodologies and allows updating of the LAS (0444) (including a CONFIG file) to be accomplished by communicating with other MAM/DDA and retrieving updated LAS (0444) from these adjacent nodes in the mesh audio network.

The LAS (0444) may schedule or immediately present for playback one or more audio files (and/or text-to-speech conversions) to an audio playback recorder (APR) (0447), the output of which is fed to an audio amplifier/speaker (0448) for presentation to the spatial area surrounding the MAM (0440). A rechargeable battery pack (RBP) (0449) may be provided to power the systems within the MAM (0440) or in some circumstances the MAM (0440) may be powered using a conventional AC power cord.

Multi-Band Audio Mesh Network Overview (0500)

Figure 5:
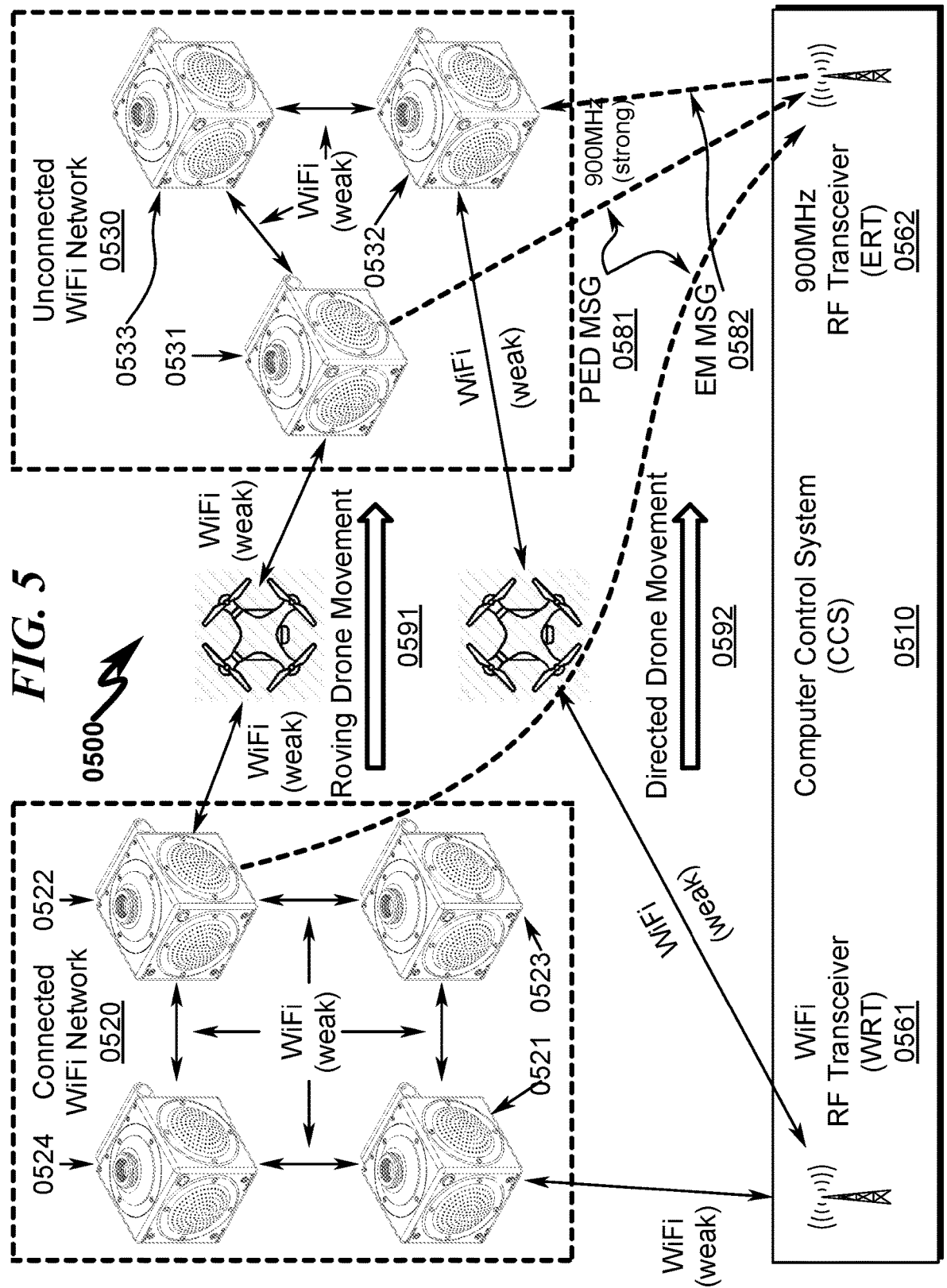
FIG. 5 illustrates a block diagram of a preferred exemplary system embodiment of the present invention incorporating the use of aerial drones to transport information among a plurality of MAMs that may be contained within different and distinct mesh audio networks.

The present invention anticipates in many preferred invention embodiments a multi-band audio mesh network will be utilized to affect a plurality of spatially diverse audio mesh networks that can be bridged using either direct or indirect wireless communication with the CCS. An overview of this methodology is generally depicted in FIG. 5 (0500). In this example of a preferred exemplary embodiment, the computer control system (CCS) (0510) is equipped with a WiFi RF transceiver (WRT) (0561) for local high speed communications and a 900 MHz RF transceiver (ERT) (0562) for long-range low speed communications.

Supporting both of these RF transceivers (0561, 0562) permits web-based high speed data transfers within localized WiFi networks (0520, 0530) whether or not they have wireless connectivity with the CCS (0510). As depicted here, there is one connected audio mesh network (0520) that has WiFi connectivity with the CCS (0510) via the WRT (0561) and one isolated audio mesh network (0530) that does not have WiFi connectivity with the CCS (0510).

With respect to the connected audio mesh network (0520), the CCS (0510) may communicate with the mesh using the WRT (0561) either directly as with the MAM (0521) illustrated, or indirectly by updating a connected MAM (0521) and then having the remaining MAMs (0522, 0523, 0524) communicate among themselves using WiFi communications to perform CONFIG file and related audio file updates. As indicated in FIG. 5 (0500), the WiFi communications are considered "weak" in that they have limited signal strength and thus a limited distance of spatial connectivity.

The present invention anticipates that a stronger signal strength RF transceiver incorporating 900 MHz transmission (ERT) (0562) may also be incorporated for use by the CCS (0510) for the transmission of physical event detection (PED) (0581) and/or emergency messages (0582) to/from the MAM. This 900 MHz RF transceiver (ERT) (0562) incorporates greater signal strength and thus a greater distance over which the MAMs may be connected. While the data transmission speed of this link is limited, it allows communication with a wider span of MAMs (0522, 0531, 0532) as generally depicted in the example provided. The reduced data transfer speed is mitigated by the use of either predefined message codes sent to the MAMs (triggering predefined MAM audio playback) or the use of text-to-audio conversion on the MAMs for the dissemination of emergency messages sent by the CCS (0510) to the MAMs. The use of this link to transmit physical event detector (PED) status information does not require large bandwidth and may trigger automated audio on the MAMs within and without the mesh network (0520, 0530) in response to a PED event or detected terrorist threat.

As depicted in FIG. 5 (0500), the present invention anticipates that audio mesh networks may include connected (0520) and unconnected (0530) WiFi networks. In the case of unconnected WiFi networks (0530), several methods are anticipated for use to accomplish data transfers to these unconnected networks for the purpose of updating CONFIG files and related audio data files. In one scenario, a drone delivery aircraft (0591) may roam between one connected WiFi network (0520) to an unconnected WiFi network (0530) and in the process either act as a WiFi bridge between the connected (0520) and unconnected network (0530) or gather/retrieve data from the connected network (0520) and then transport this data to the unconnected network (0530). This roving pattern may be preprogrammed based on the GPS locations of the various MAMs in the connected (0520) and unconnected (0530) WiFi networks. In another scenario, the DDA may fly a directed path (0592) and controlled by the CCS (0510) and transport predefined/preloaded data from the CCS (0510) to the unconnected WiFi network (0530). In each of these scenarios the weak WiFi signal is utilized to bridge communications between the unconnected WiFi network (0530) and either an actively connected WiFi network (0520) or direct communication with the CCS (0510).

MAM Wireless Method (0600)-(0800)

The present invention incorporates WiFi and 900 MHz mesh networks to enable wireless communication with a plurality of MAM units to a CCS. The WiFi network is configured to support file sharing and high bandwidth data transfers of audio files and CONFIG files. The 900 MHz mesh network operates at a lower bit rate and operates to transmit emergency messages that reference predefined messages on the MAMs or the transmission of text messages that are then converted to audio on the MAM using a text-to-audio converter resident on the MAM. Each MAM may incorporate a local web server that is activated by either of these emergency message types. This dual-band mesh network allows the 900 MHz network to operate over a wider range than permitted by the WiFi network, albeit at a lower data rate.

Thus, it is possible for a plurality of widely distributed MAM units to be in communication using one or both of the dual-band mesh networks and thus allow operation of a group of widely dispersed MAM under degraded wireless communication conditions.

Figure 6:
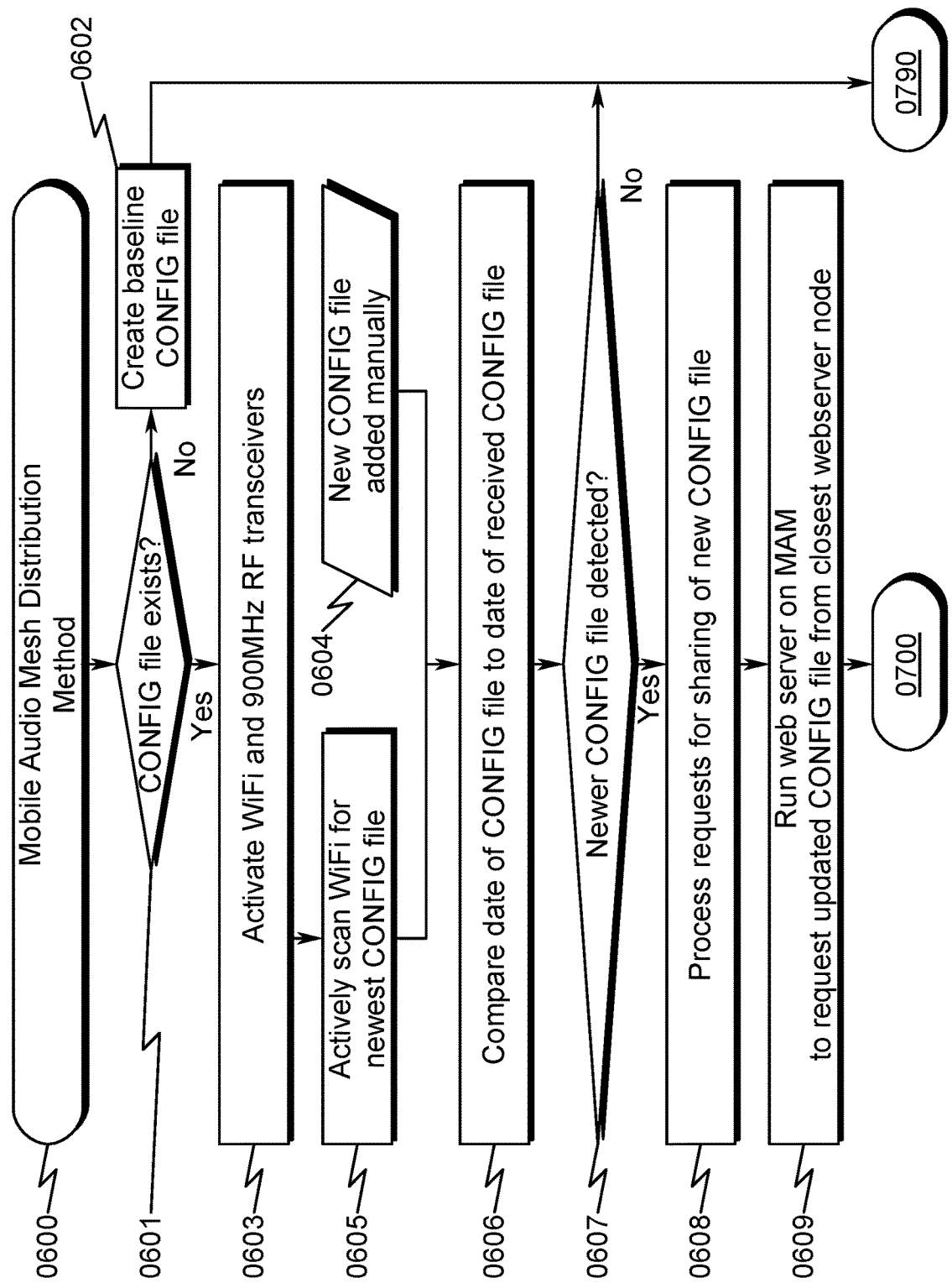
FIG. 6 illustrates a flowchart depicting an exemplary method embodiment of the present invention (page 1/3)
Figure 7:
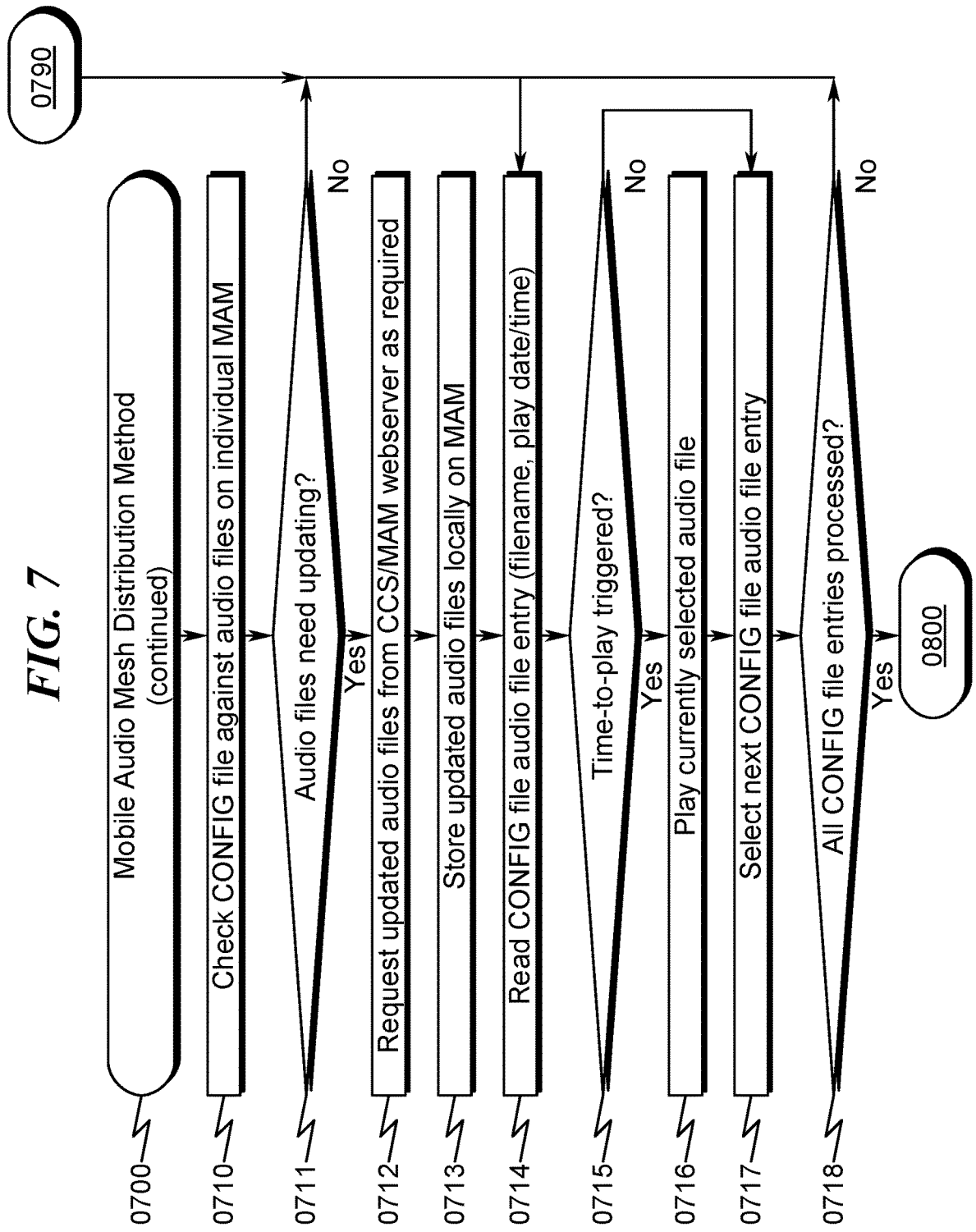
FIG. 7 illustrates a flowchart depicting an exemplary method embodiment of the present invention (page 2/3)
Figure 8:
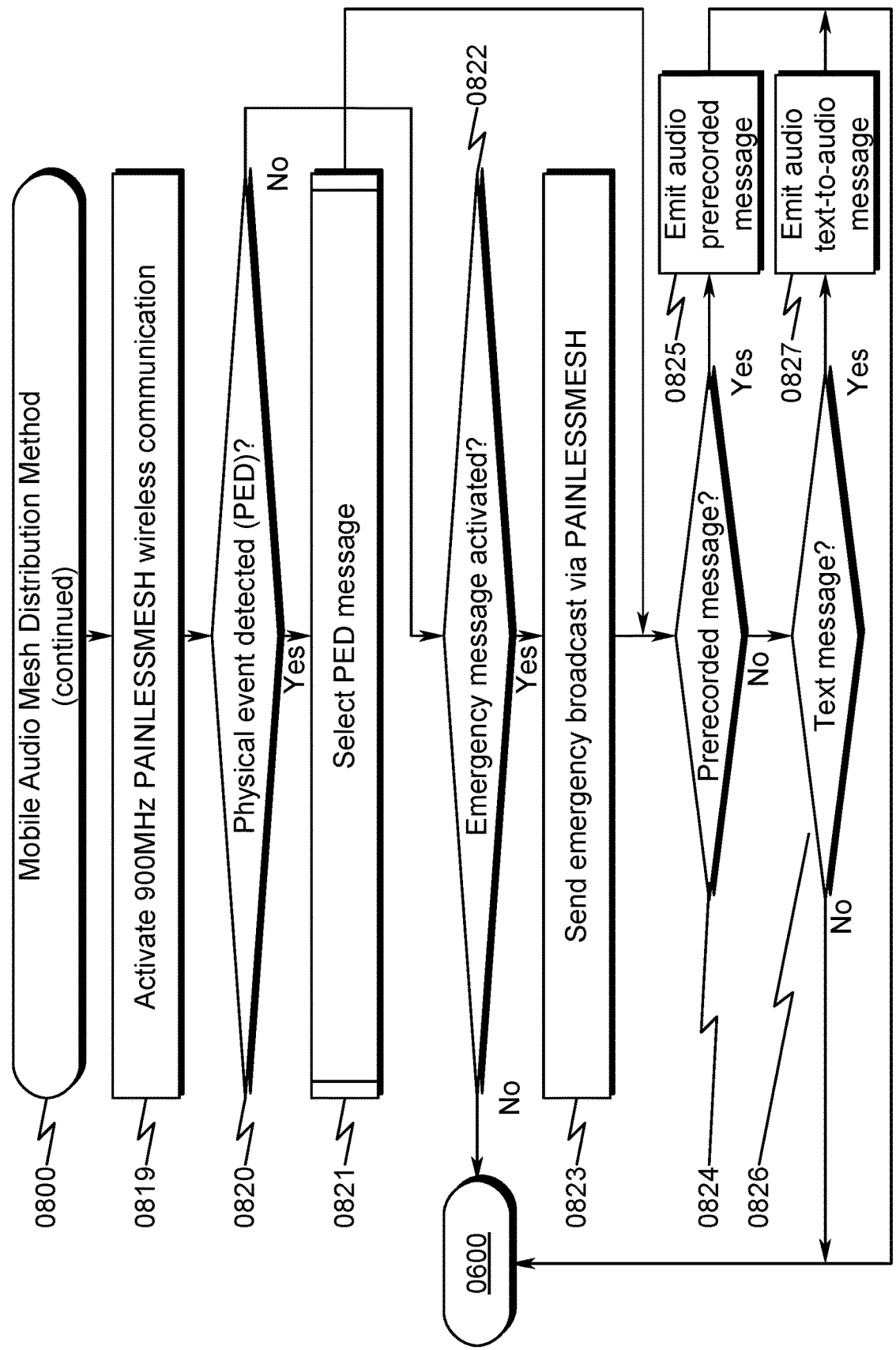
FIG. 8 illustrates a flowchart depicting an exemplary method embodiment of the present invention (page 3/3)

A general method that may operate this dual-band mesh network scenario is generally depicted in FIG. 6 (0600)-FIG. 8 (0800) and operates as a mobile audio mesh distribution method operating on a plurality of MAMs having the following steps:

(1) Determining if a CONFIG file exists, and if so, proceeding to step (3) (0601);
(2) Creating a baseline CONFIG file on the MAM and proceeding to step (14) (0602);
(3) Activating the WiFi and 900 MHz transceivers on the MAM (0603);
(4) Allowing a new CONFIG file to be manually added to the MAM, and if so added, proceeding to step (6) (0604);
(5) Actively scanning the WiFi for a newest CONFIG file and loading it on the MAM (0605);
(6) Comparing the date of the local MAM CONFIG file to the date of the CONFIG file received via WiFi (0606);
(7) Determining if a new CONFIG file has been detected based on the date comparison, and if not, proceeding to step (19) (0607);
(8) Processing request for sharing of the newer CONFIG file (0608);
(9) Running a web server on the MAM to request the updated CONFIG file from the closest webserver node in the mesh (0609);
(10) Checking the CONFIG file against audio files on each individual MAM (0710);
(11) Determining if the MAM audio files need updating, and if not, proceeding to step (14) (0711);
(12) Requesting updated audio files from the CCS or adjacent MAM webserver as required (0712);
(13) Storing the updated audio files locally on the MAM (0713);
(14) Reading a first or next CONFIG file audio file entry consisting of an audio filename and play date/time (0714);
(15) Determining if the play date/time has been triggered, and if not, proceeding to step (17) (0715);
(16) Playing the currently selected audio file and emitting audio from the MAM (0716);
(17) Selecting the next CONFIG file audio file entry (0717);
(18) Determining if all CONFIG audio file entries have been processed, and if not, proceeding to step (14) (0718);
(19) Activating the 900 MHz PAINLESSMESH wireless communication transceiver (0819);
(20) Determining if a physical event detector (PED) has been triggered by either threshold data received from the PED or data logged from the PED, and if not, proceeding to step (22) (0820);
(21) Selecting a PED message as the emergency broadcast message (EBM) for presentation and proceeding to step (24) (0821);
(22) Determining if an emergency message has been activated by the CCS, and if not, proceeding to step (1) (0822);
(23) Sending an emergency broadcast message (EBM) to the MAM via the CCS 900 MHz PAINLESSMESH network (0823);
(24) Determining if the EBM is a prerecorded audio message, and if not, proceeding to step (26) (0824);
(25) Emitting a prerecorded audio message from the MAM and proceeding to step (1) (0825);
(26) Determining if the EBM is a text audio message, and if not, proceeding to step (1) (0826); and
(27) Emitting a text-to-audio audio message from the MAM and proceeding to step (1) (0827).

One skilled in the art will recognize that these method steps may be augmented or rearranged without limiting the teachings of the present invention. This general method summary may be augmented by the various elements described herein to produce a wide variety of invention embodiments consistent with this overall design description.

CONFIG File Prototype (0900)

Figure 9:
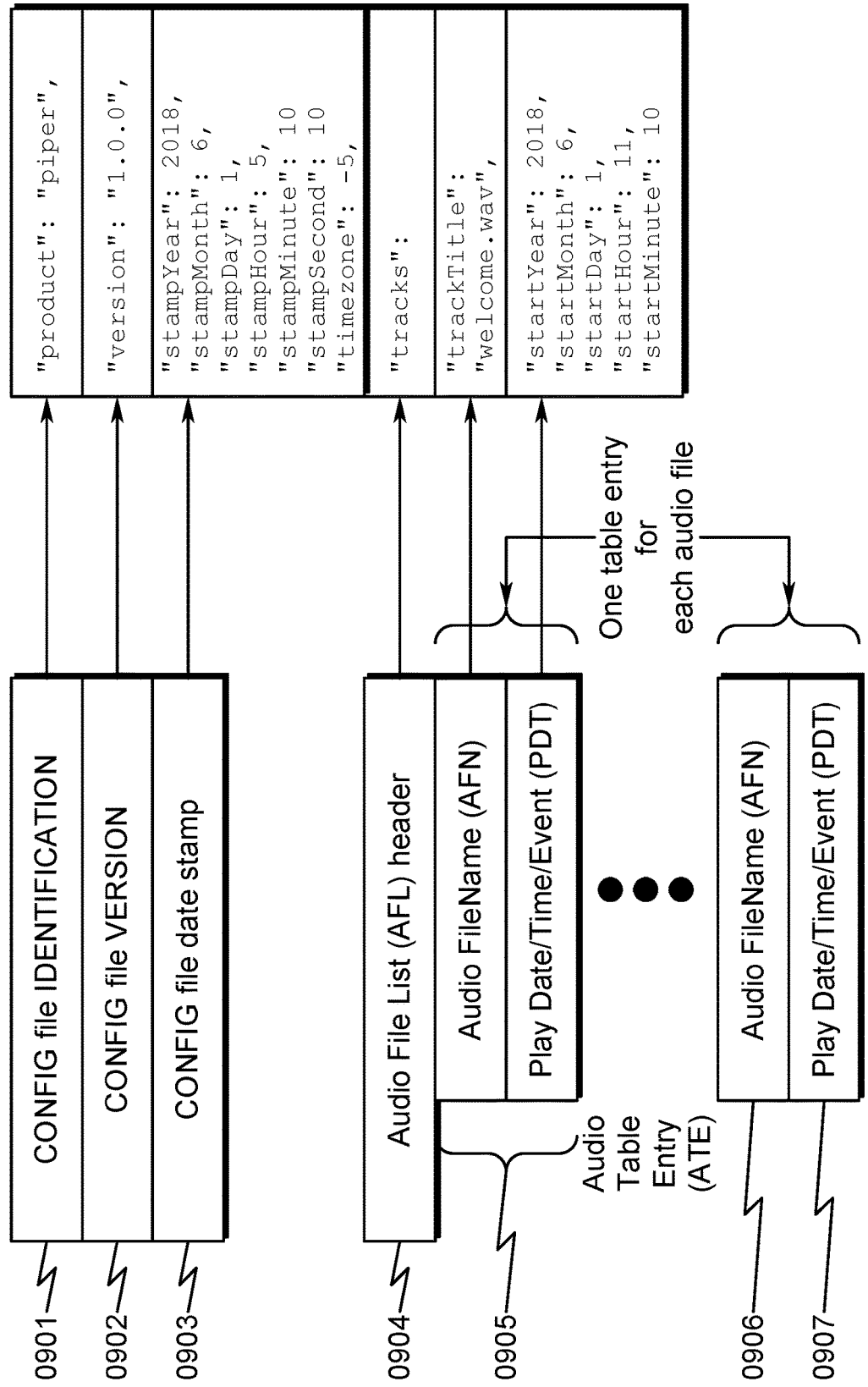
FIG. 9 illustrates an exemplary CONFIG file format used in some preferred invention embodiments to trigger audio playback based on event time triggers.

While the present invention anticipates that the MAMs may be controlled and operate on a variety of CONFIG file forms, an exemplary CONFIG file prototype is generally depicted in FIG. 9 (0900). Here the CONFIG file is structured with CONFIG file identification (0901), CONFIG file version (0902), and CONFIG file date stamp (0903) that serve to identify the overall CONFIG file state as either being newer or older than a CONFIG file that may be resident on an individual MAM. Should the MAM determine that any of these fields is different from and/or older than the CONFIG file resident on the MAM, then the MAM will request an updated CONFIG file from a nearby MAM that may have such an updated CONFIG file.

Each CONFIG file will contain a list of audio files to be played and emitted as audio and an event that may trigger this playback. This list of audio files is generally preceded by an identifying header (0904) followed by a duplex list (0905) (audio table entry (ATE)) of audio files (0906) and associated play date/time/event (0907) triggering values. Each of the audio filenames (0906) generally has associated a play date/time at which time the audio file is played. This playback triggering example is depicted in the provided figure.

Physical Event Detection (PED) Audio Playback (1000)

The present invention audio triggering event may also incorporate an event or range of events as determined by a physical event detector (PED). In this situation the audio playback may be determined by the detection of a physical event such as a detected terrorist event or some other physical event detected by the MAM. These detected events may also trigger other features of the MAM to coordinate movement of crowds to safe harbors as determined by PED detectors at other MAMs. For example, if in a group of MAMs several radiation detectors are triggered, the MAMs may interrogate other MAMs to determine which of the MAMs in the audio mesh are NOT triggering radiation alarms and thus issue audio messages that direct crowd traffic to these safe harbors to avoid radiation surrounding the contaminated MAMs. Other types of detectors may detect explosions or other events that would necessitate the movement of crowds to a directed path to a variety of safe harbor locations.

Figure 10:
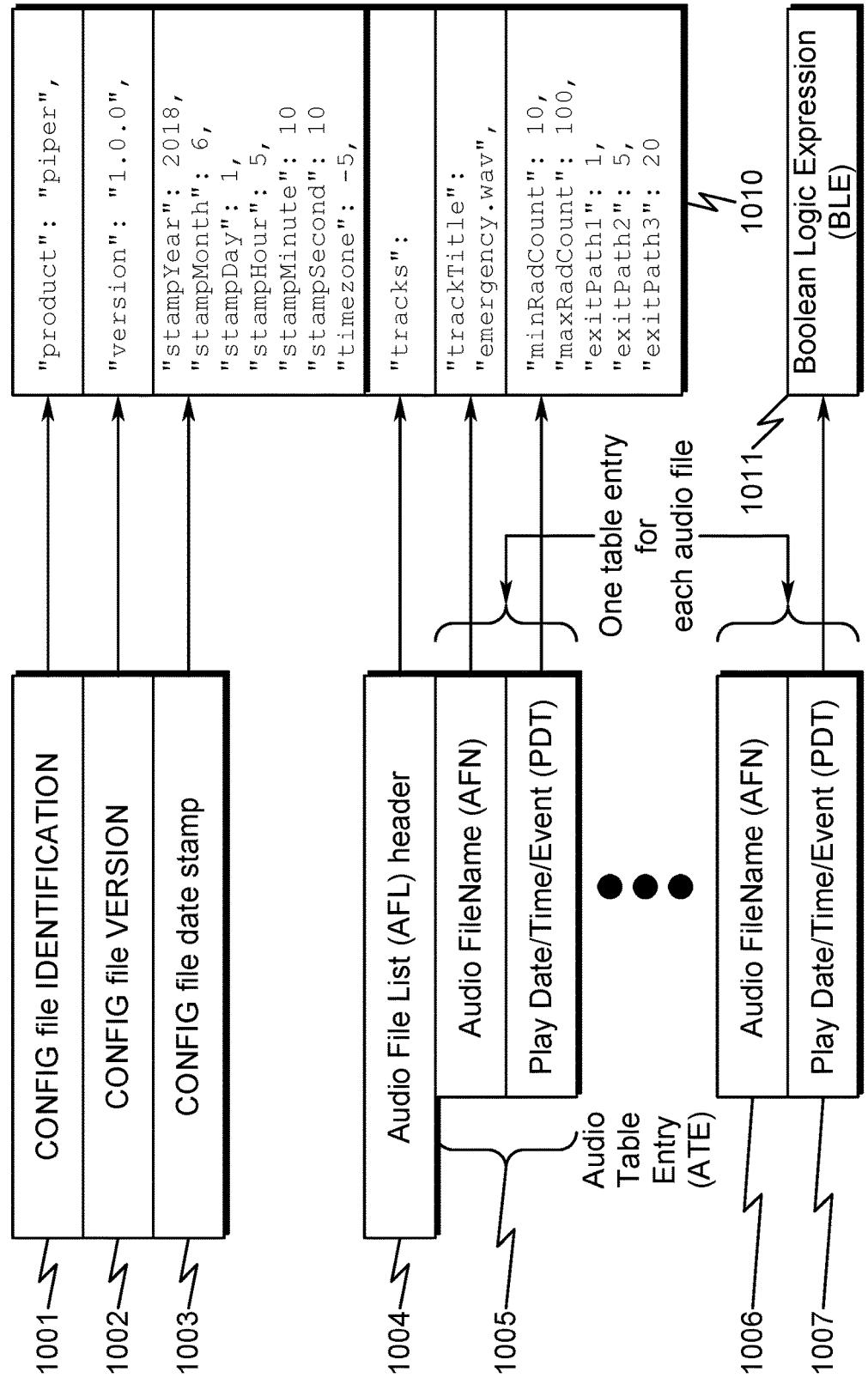
FIG. 10 illustrates an exemplary CONFIG file format used in some preferred invention embodiments that incorporate physical event detection (PED)

An example of this is provided in FIG. 10 (1000) wherein a PED event trigger (1010) is provided in which an EMERGENCY.WAV audio file is triggered for playback on the detection of a physical event associated with a radiation detector. Here the PED event trigger (1010) is triggered on a minimum radiation count value of 10 and a maximum of 100. Various sub-elements of the PED trigger allow for one of three predetermined exit paths (1, 5, 20) to be selected based on available information from surrounding MAMs. One skilled in the art will recognize that these parameters may vary based on application context but provide a powerful and dynamic audio response to an emergency event. Given that the MAM may be operated on battery power, this also eliminates the possibility that loss of the power line infrastructure would impede the ability of the MAM to properly direct the public to a safe exit path during the event of an emergency event. This autonomous operation also allows the MAM to detect unauthorized movement and emit audio messages indicating a possible theft scenario.

Note that the PED may be used to condition a variety of events on a particular MAM. For example the audio file may be conditioned on a Boolean logic expression (BLE) (1011) combination of events at a given MAM, such as the triggering of a date/time from the RTC in combination with the RFID associated with the MAM and a specific GPS coordinate area of selected MAMs. This would allow a particular audio message to be played only in a specific geographic area at a given date/time (or range of date/times) in conjunction with only specific MAMs in the particular audio mesh. The present invention anticipates that the BLE may incorporate an expression containing any condition or range of conditions presented by any of the PEDs and/or RTC data.

Emergency Safe Passage PED Example (1100)

Figure 11:
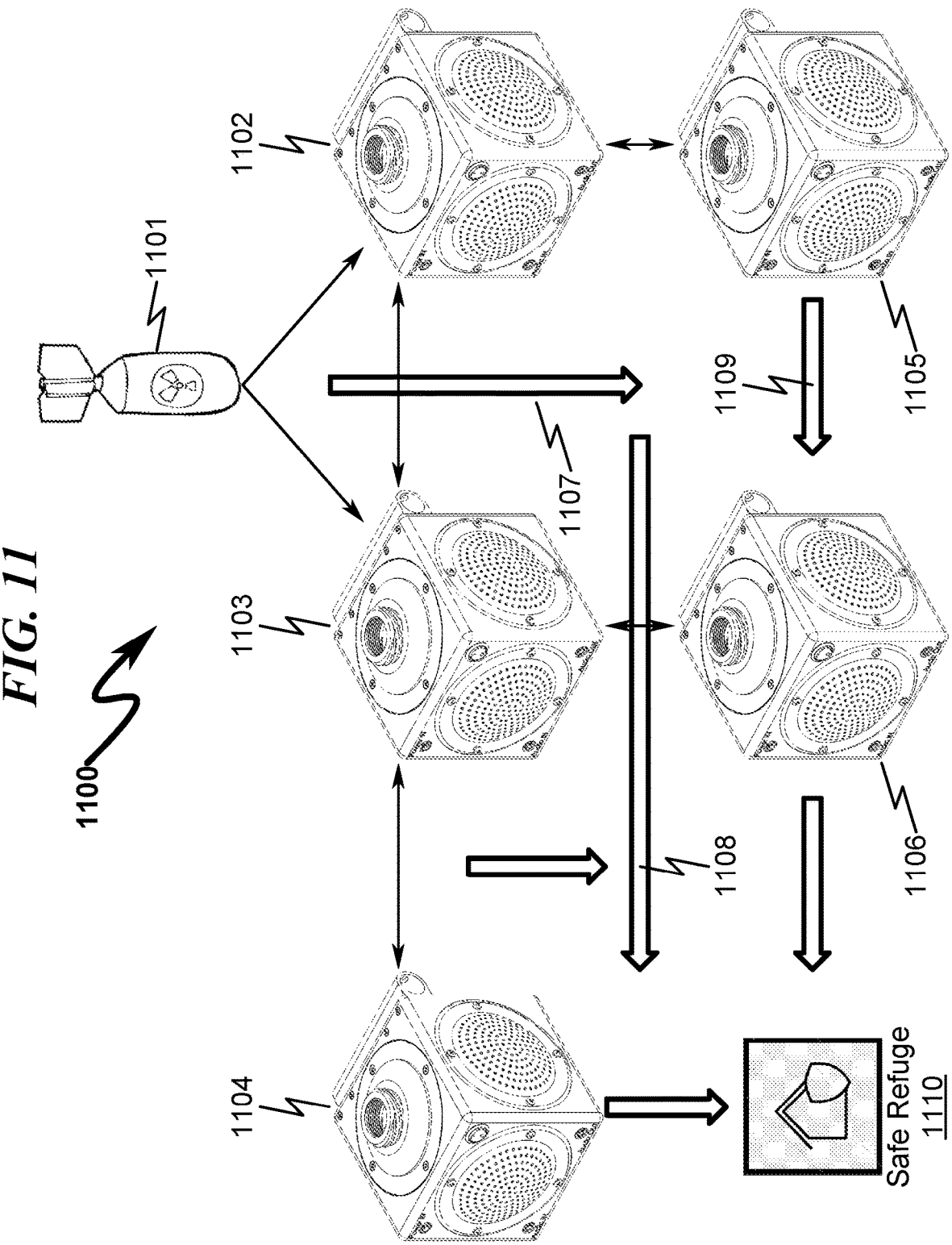
FIG. 11 illustrates a diagram depicting an exemplary emergency safe passage triggered by a physical event detector (PED) on a MAM.

FIG. 11 (1100) depicts a scenario in which a MAD system comprising a plurality of MAMs detects a terrorist event (1101) and using PED provides for audio to the public to MOBILE AUDIO MESH DISTRIBUTION SYSTEM AND METHOD provide safe passage of the public. Here the terrorist event depicted is a bomb (1101) whose radiation is detected by several MAMs (1102, 1103). These PED detection MAMs (1102, 1103) are in communication with other MAMs (1104, 1105, 1106) within the audio mesh and have spatial awareness of their GPS positions. As such, safe pathways (1107, 1108, 1109) can be calculated to allow audio messages to be emitted that guide the public along a safe passage to a safe rally point or structure (1110). All of this can be accomplished automatically and without the need for human interaction with the MAMs.

MAM Operational Details (1200)-(2400)

Figure 12:
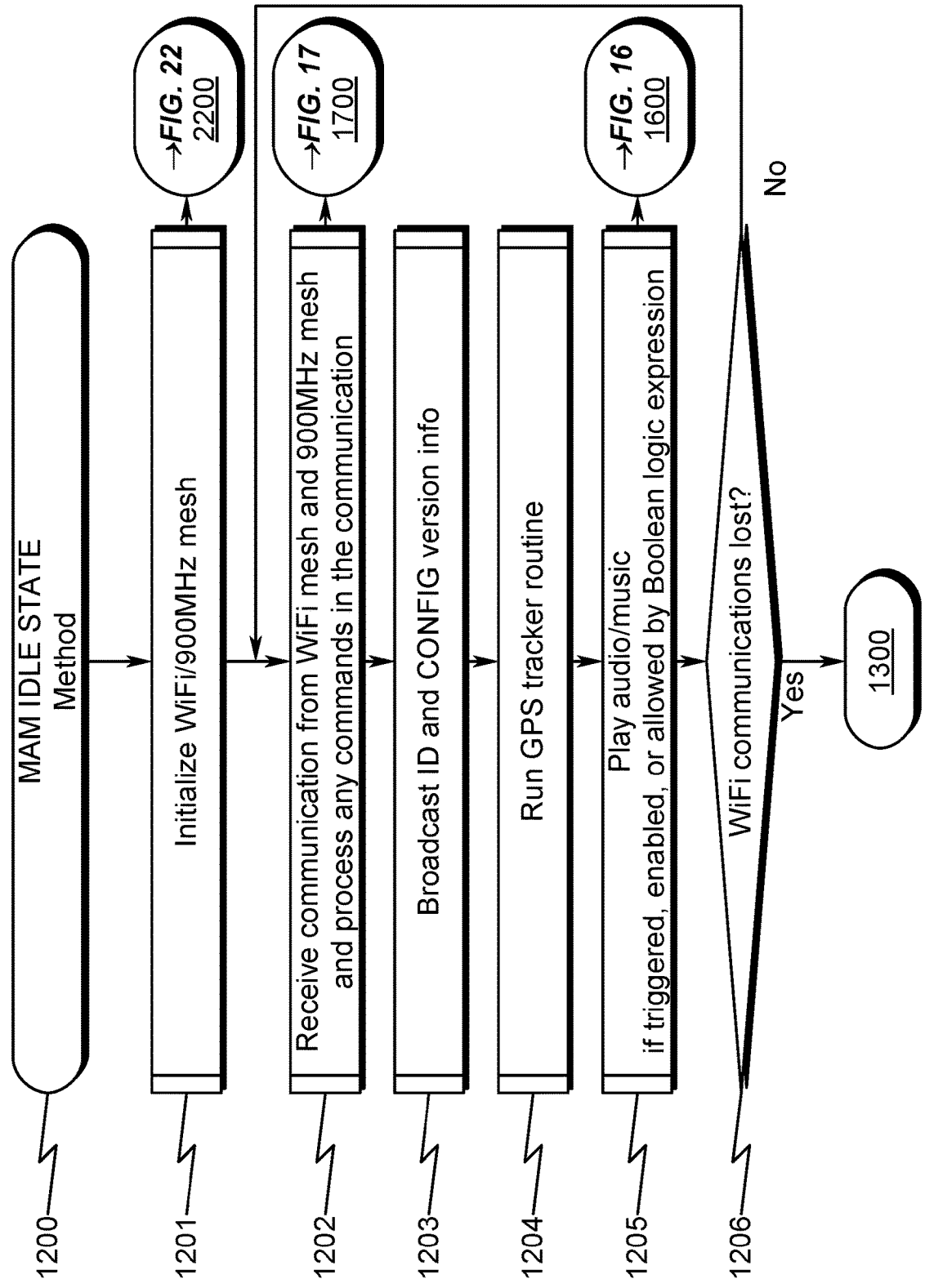
FIG. 12 illustrates a flowchart depicting an exemplary IDLE state processing method useful in some preferred invention embodiments.
Figure 13:
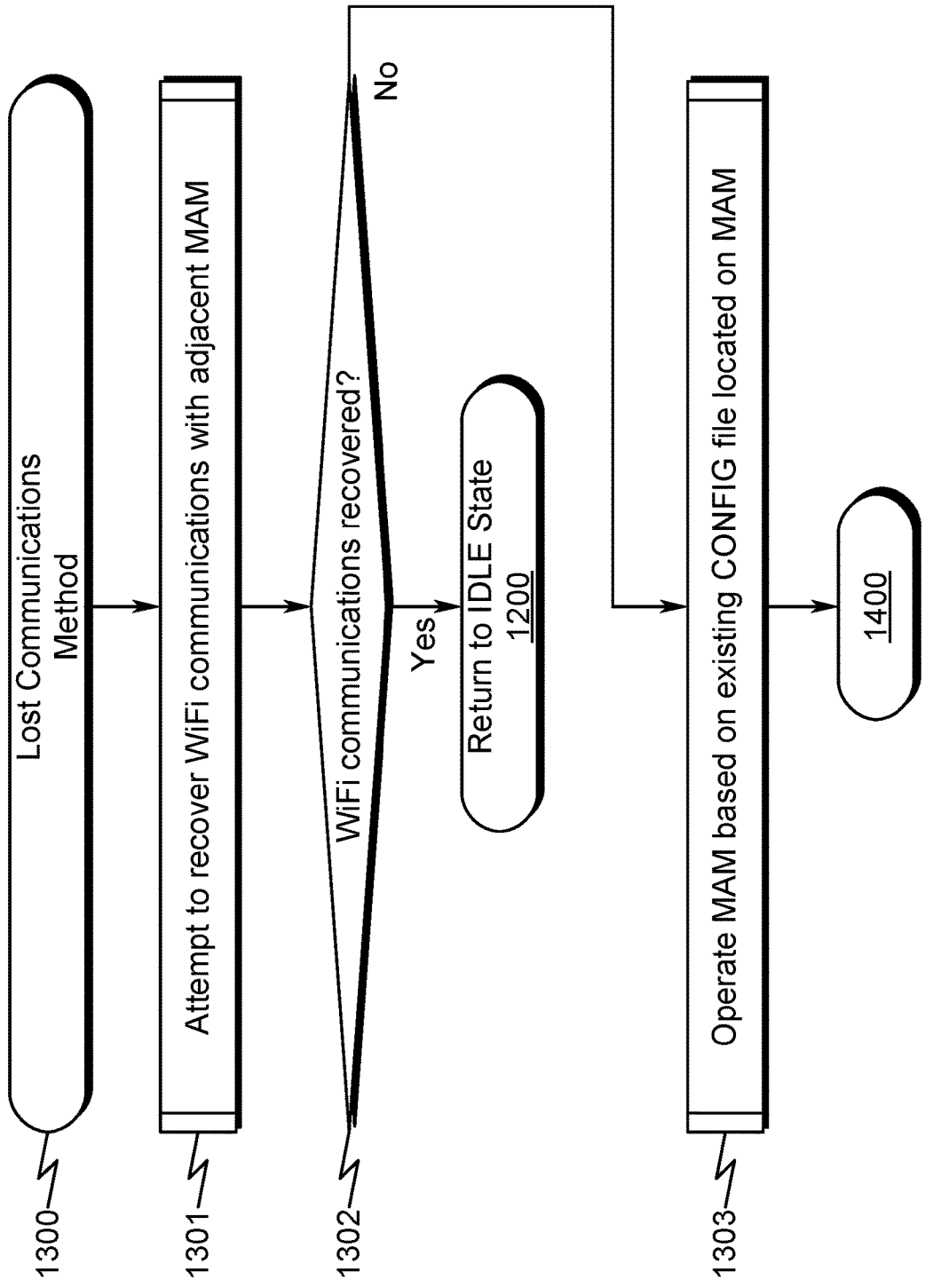
FIG. 13 illustrates a flowchart depicting an exemplary lost communications processing method useful in some preferred invention embodiments.
Figure 14:
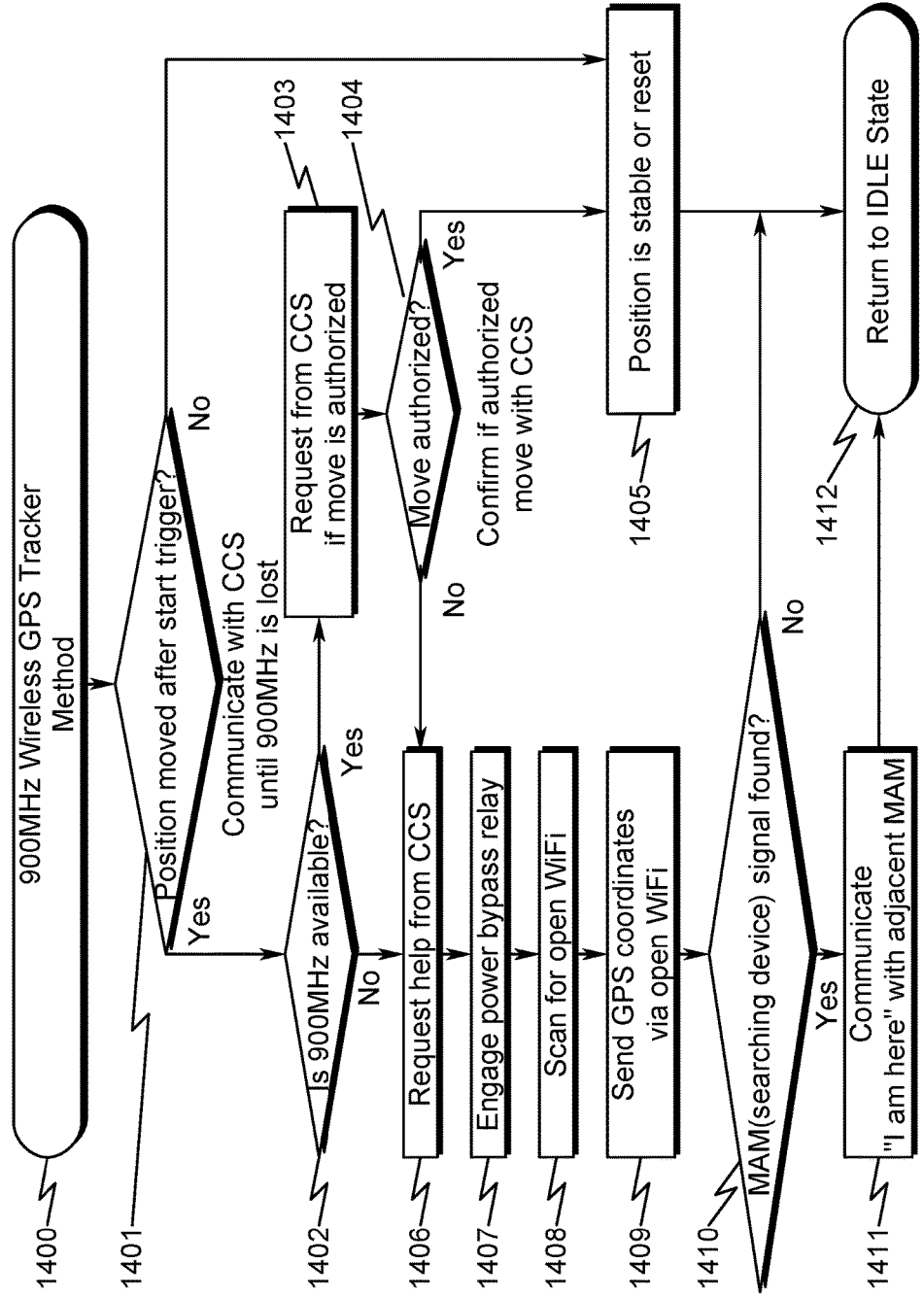
FIG. 14 illustrates a flowchart depicting an exemplary 900 MHz wireless communications method useful in some preferred invention embodiments.
Figure 15:
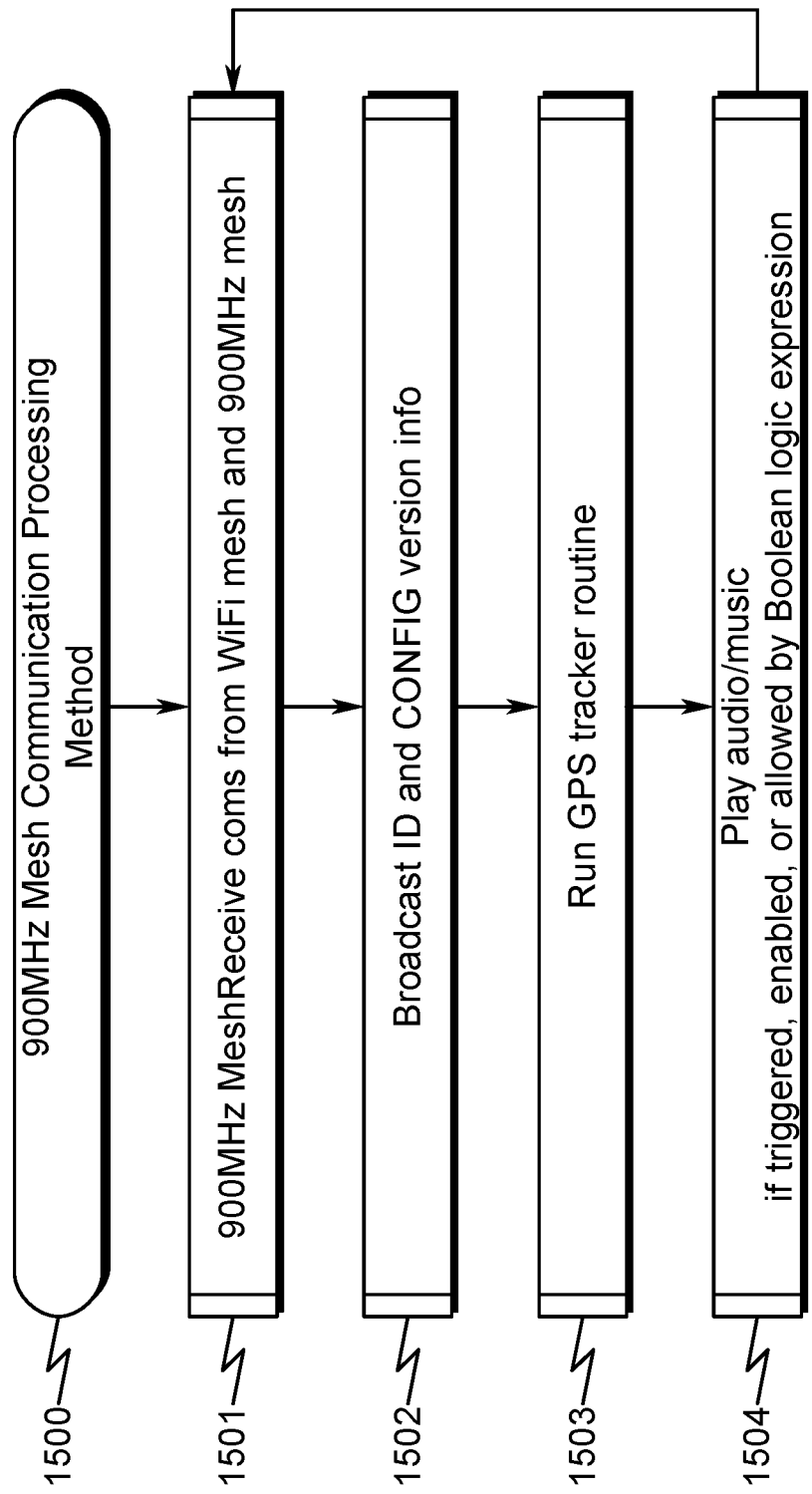
FIG. 15 illustrates a flowchart depicting an exemplary 900 MHz mesh communication processing method useful in some preferred invention embodiments.
Figure 16:
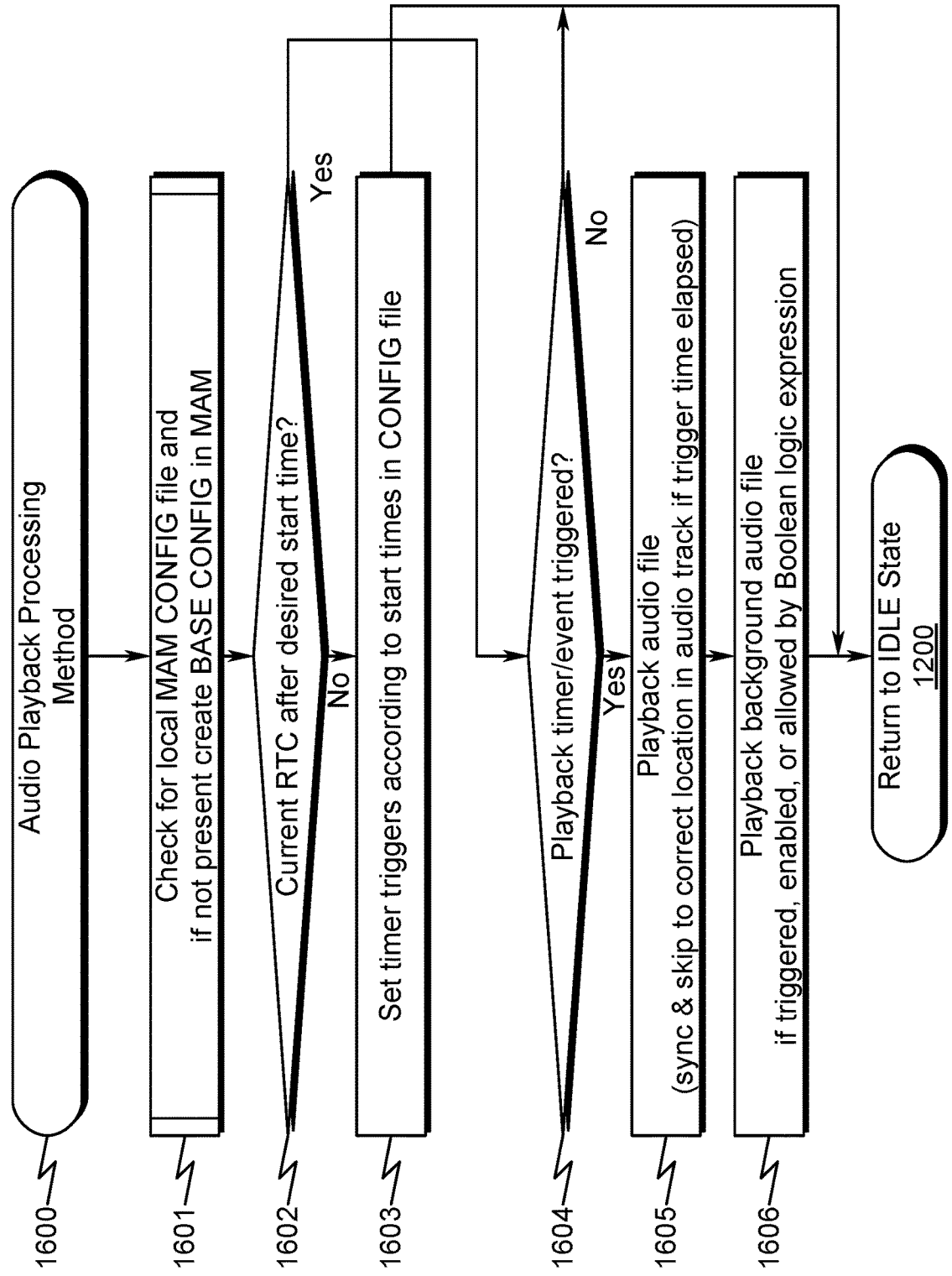
FIG. 16 illustrates a flowchart depicting an exemplary audio playback processing method useful in some preferred invention embodiments.
Figure 17:
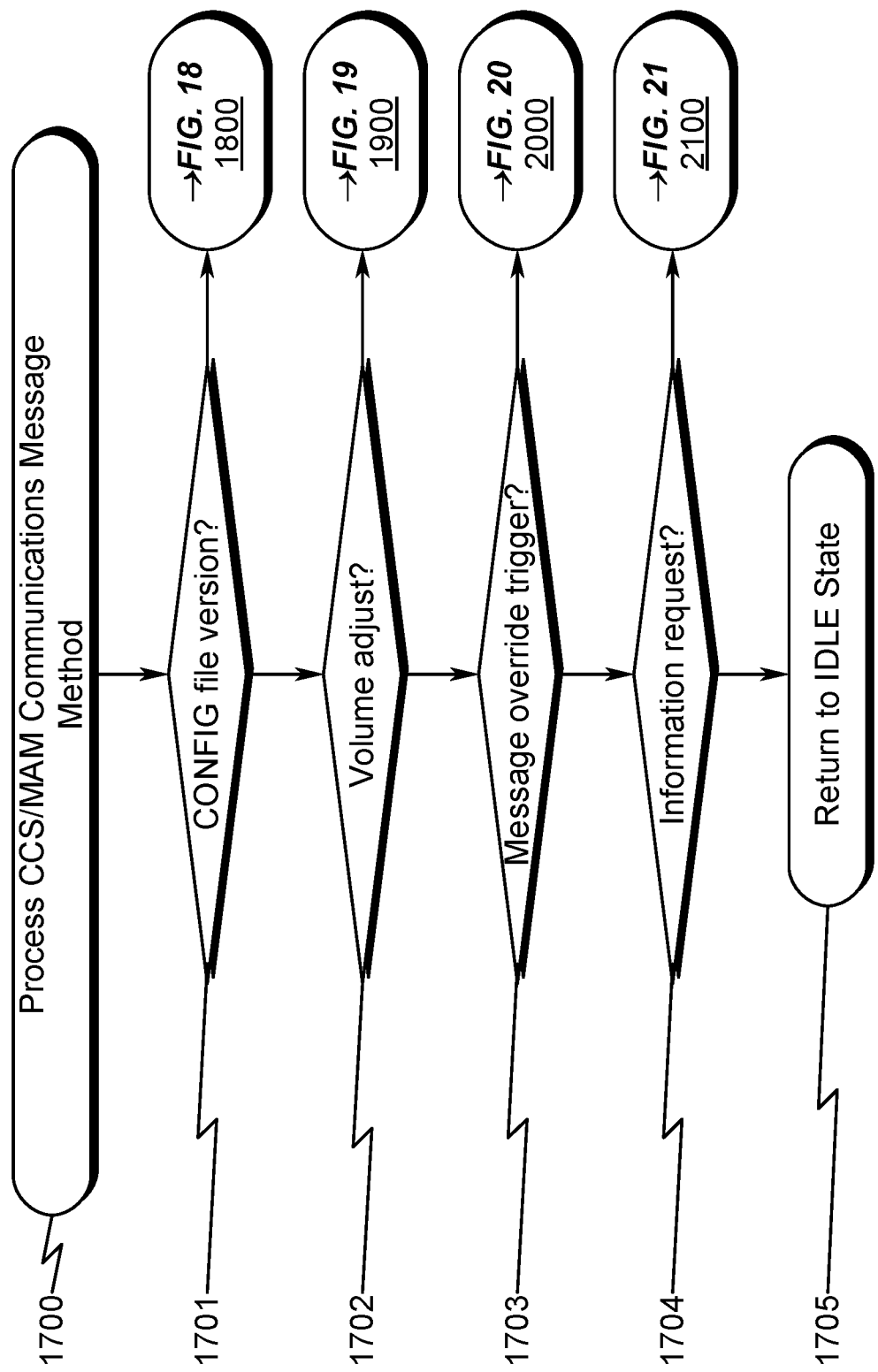
FIG. 17 illustrates a flowchart depicting an exemplary CCS/MAM message processing method useful in some preferred invention embodiments.
Figure 18:
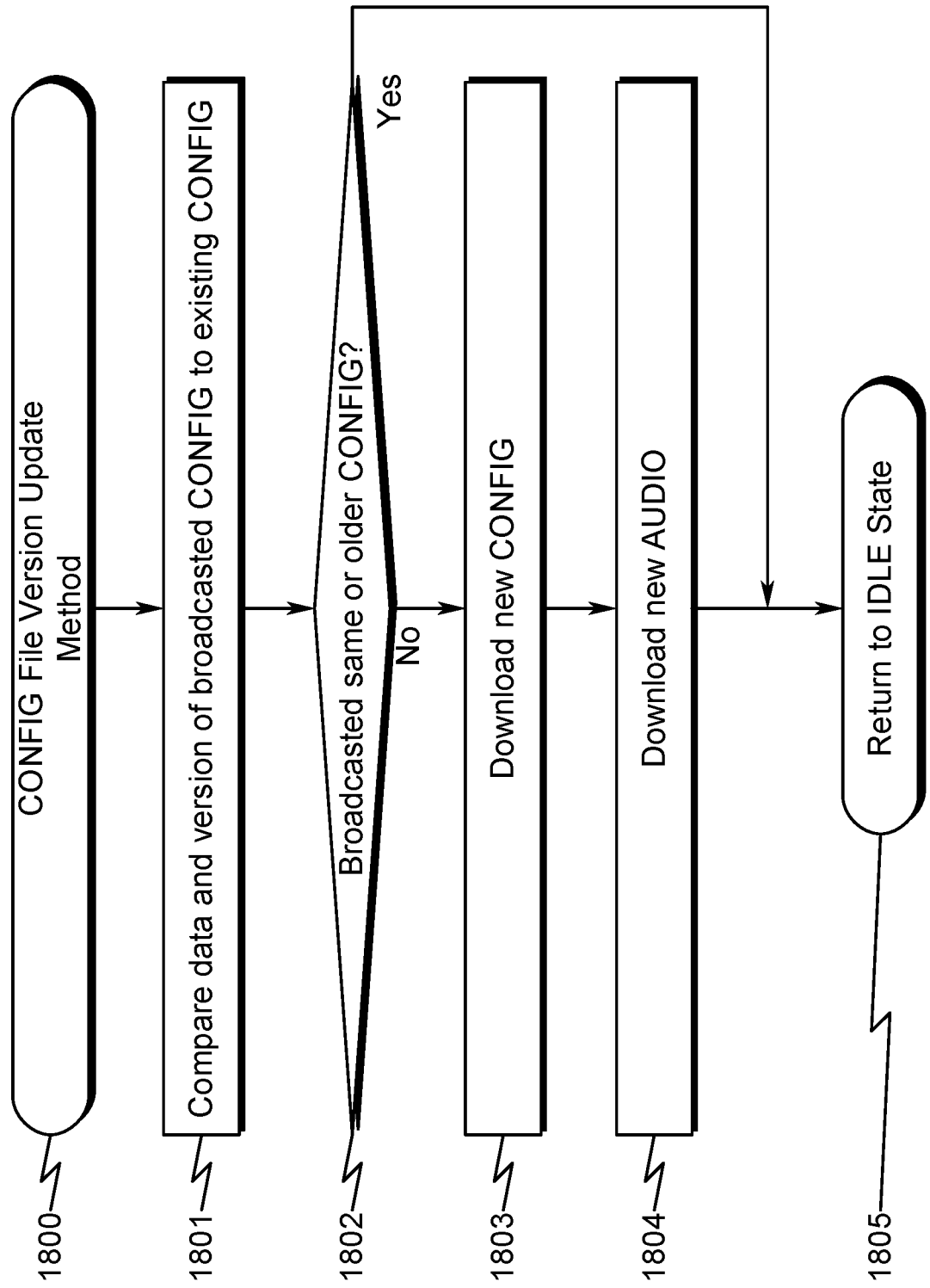
FIG. 18 illustrates a flowchart depicting an exemplary CONFIG file version updating method useful in some preferred invention embodiments.
Figure 19:
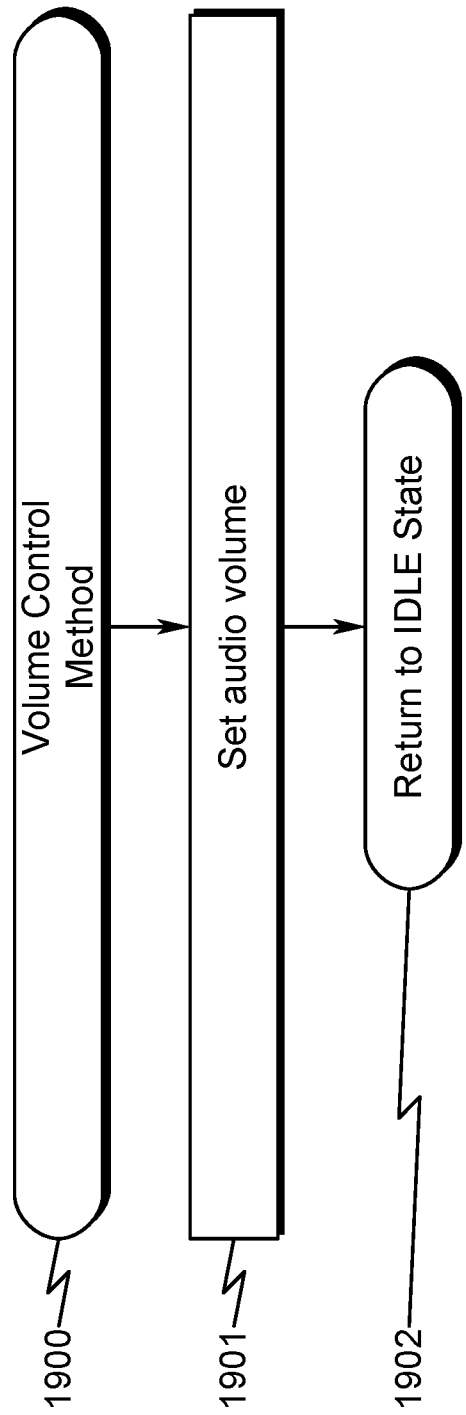
FIG. 19 illustrates a flowchart depicting an exemplary volume control method useful in some preferred invention embodiments.
Figure 20:
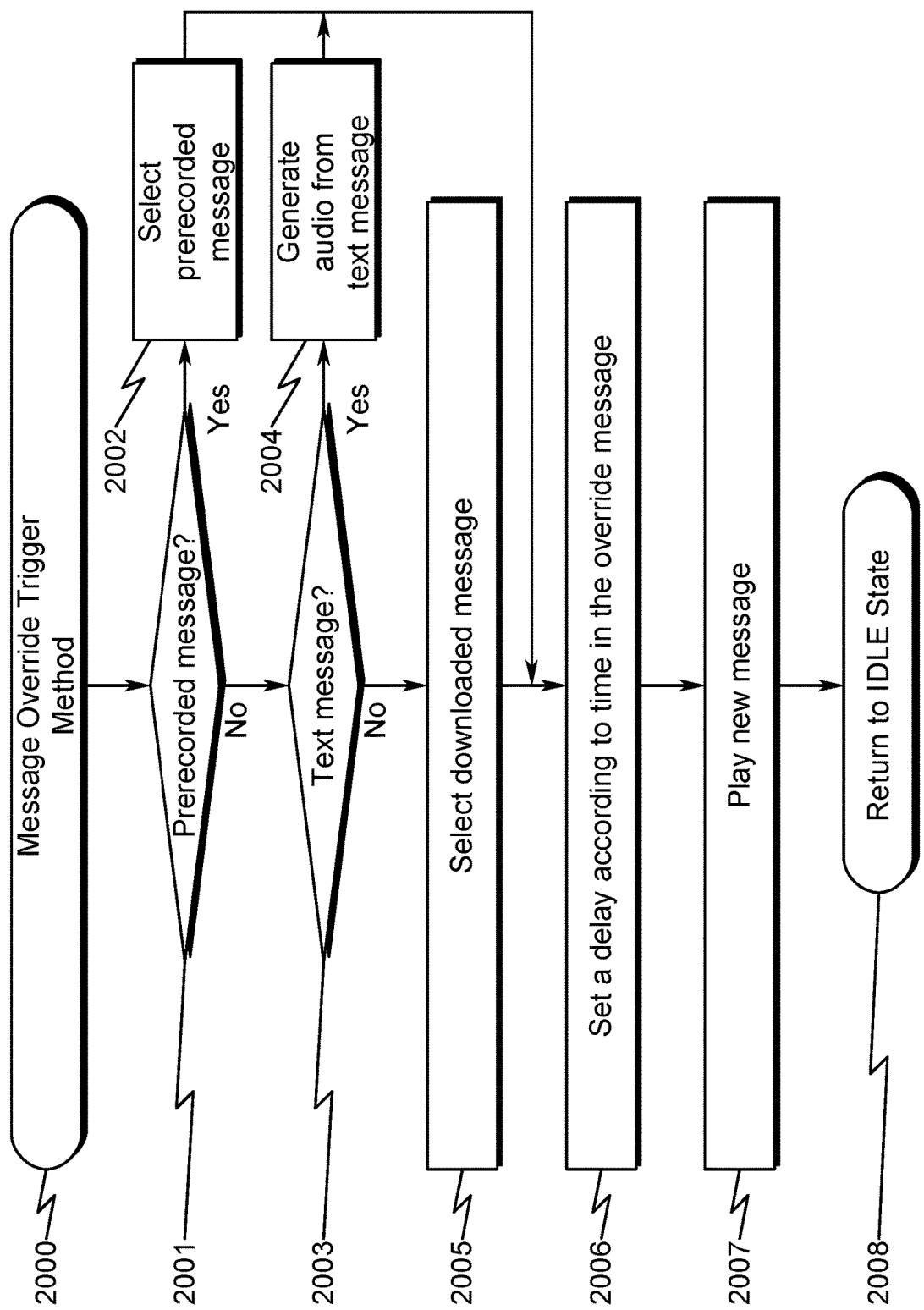
FIG. 20 illustrates a flowchart depicting an exemplary message override trigger method useful in some preferred invention embodiments.
Figure 21:
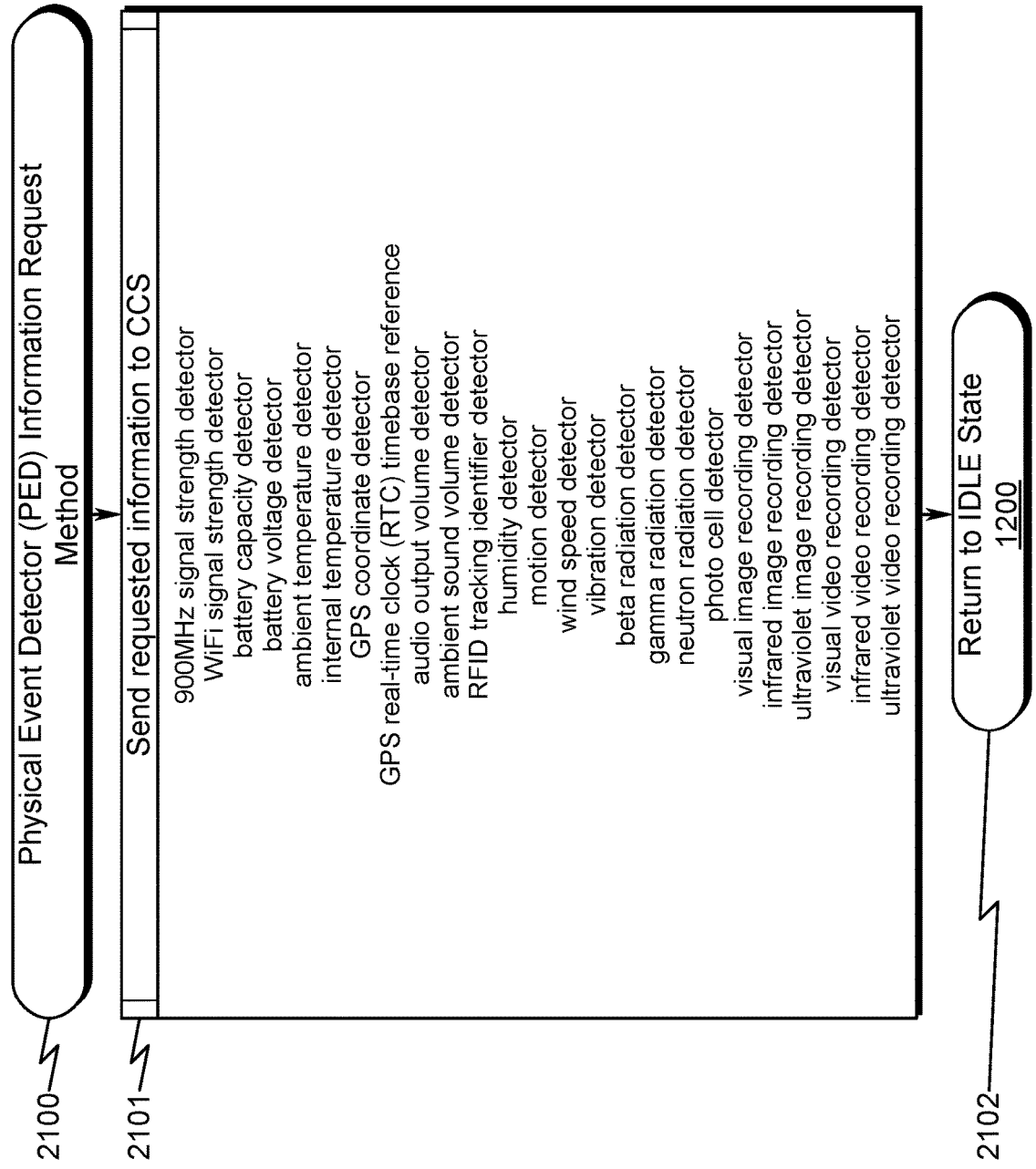
FIG. 21 illustrates a flowchart depicting an exemplary PED information request method useful in some preferred invention embodiments.
Figure 22:
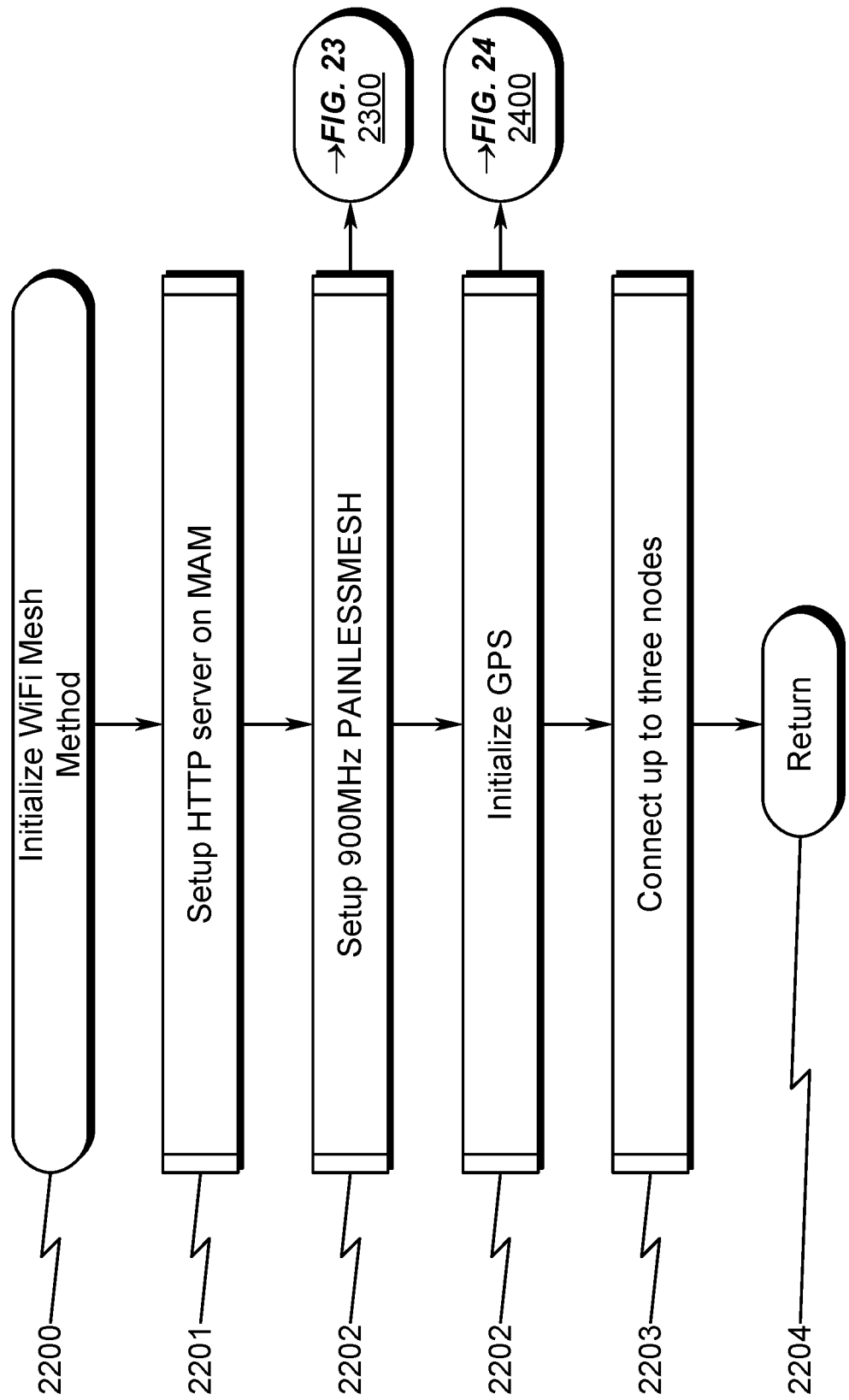
FIG. 22 illustrates a flowchart depicting an exemplary WiFi/900 MHz mesh initialization method useful in some preferred invention embodiments.
Figure 23:
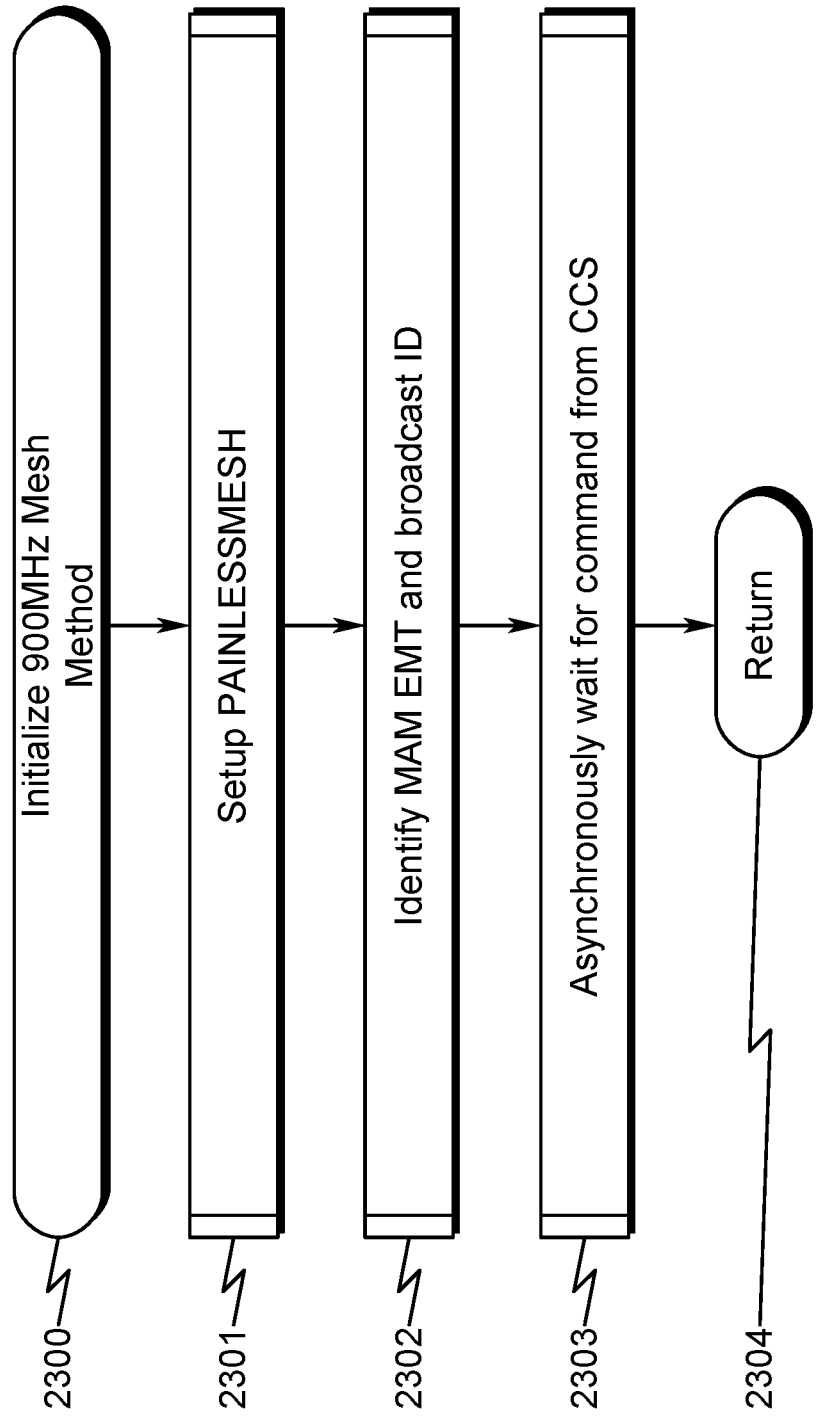
FIG. 23 illustrates a flowchart depicting an exemplary 900 MHz mesh initialization method useful in some preferred invention embodiments.
Figure 24:
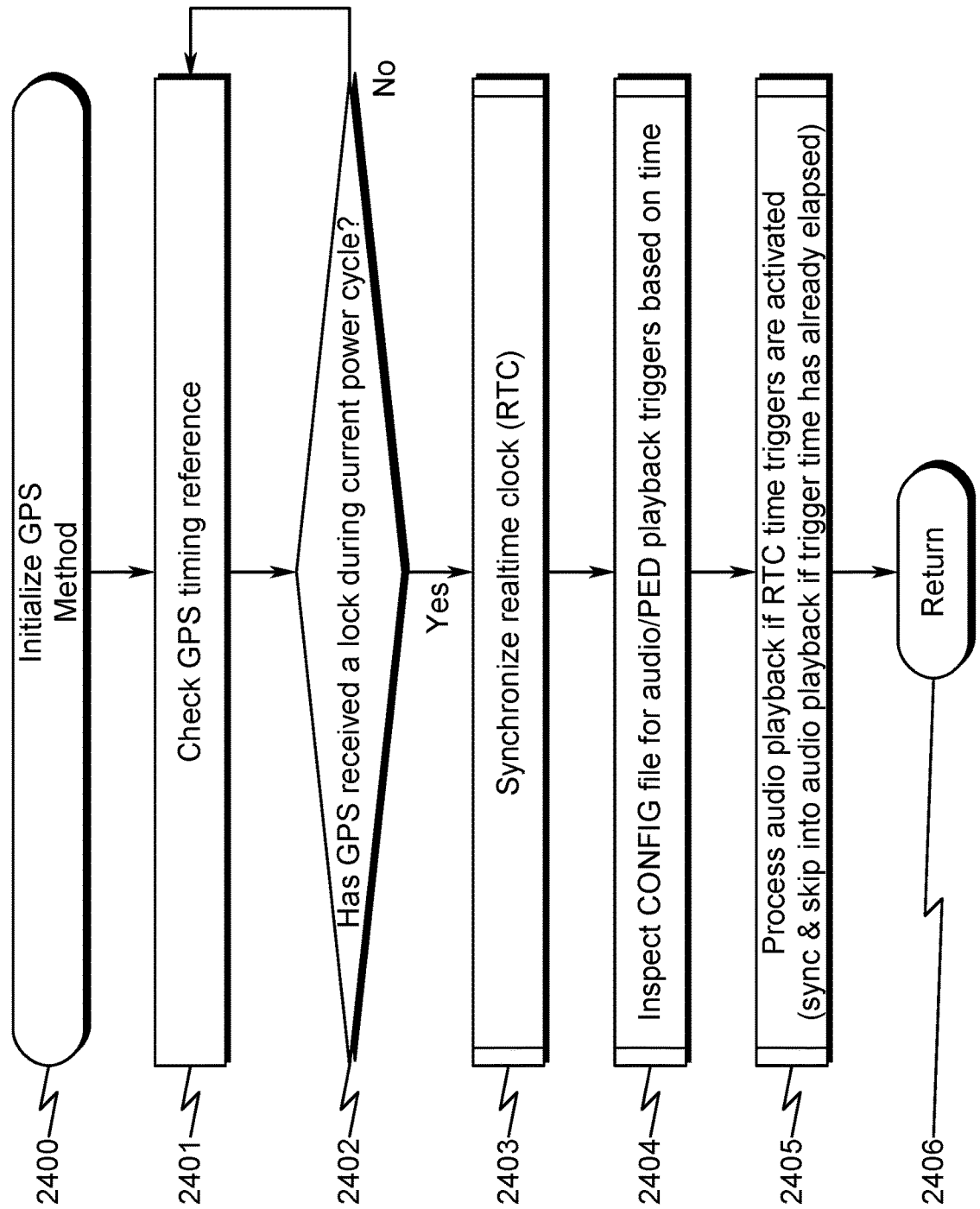
FIG. 24 illustrates a flowchart depicting an exemplary GPS initialization method useful in some preferred invention embodiments.
Figure 25:
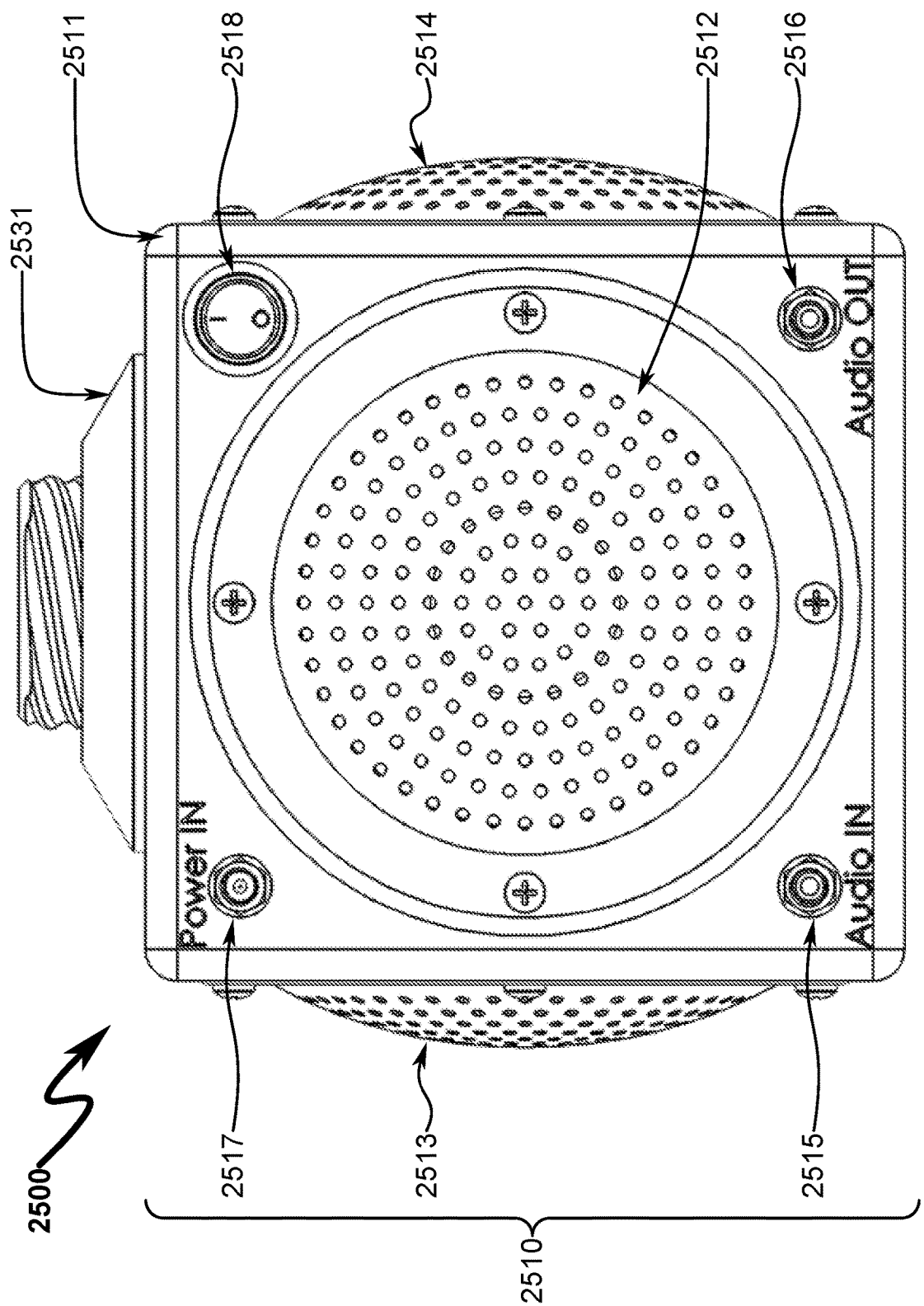
FIG. 25 illustrates a front view of a preferred exemplary system embodiment depicting a modular audio module (MAM)
Figure 26:
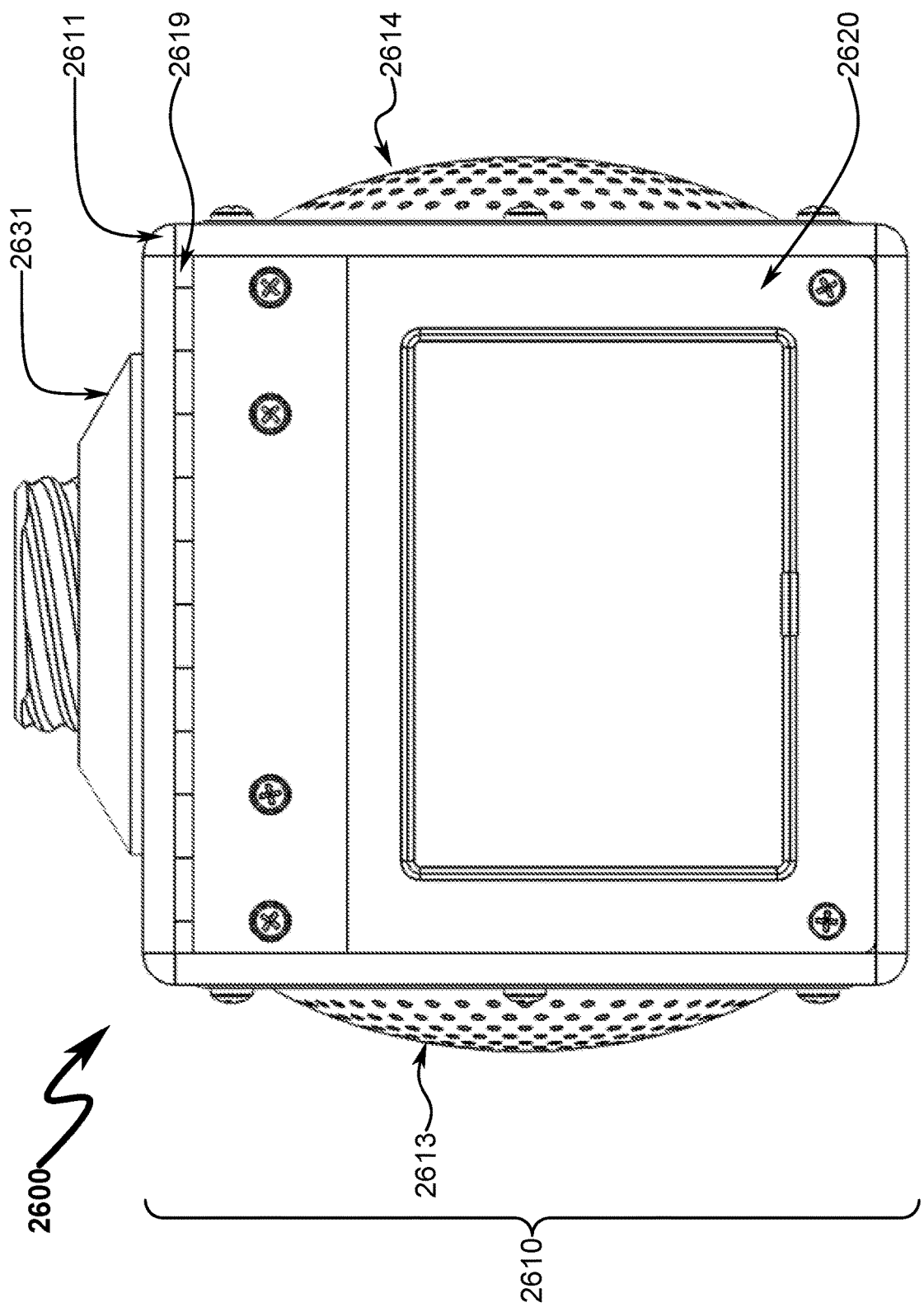
FIG. 26 illustrates a back view of a preferred exemplary system embodiment depicting a modular audio module (MAM)
Figure 27:
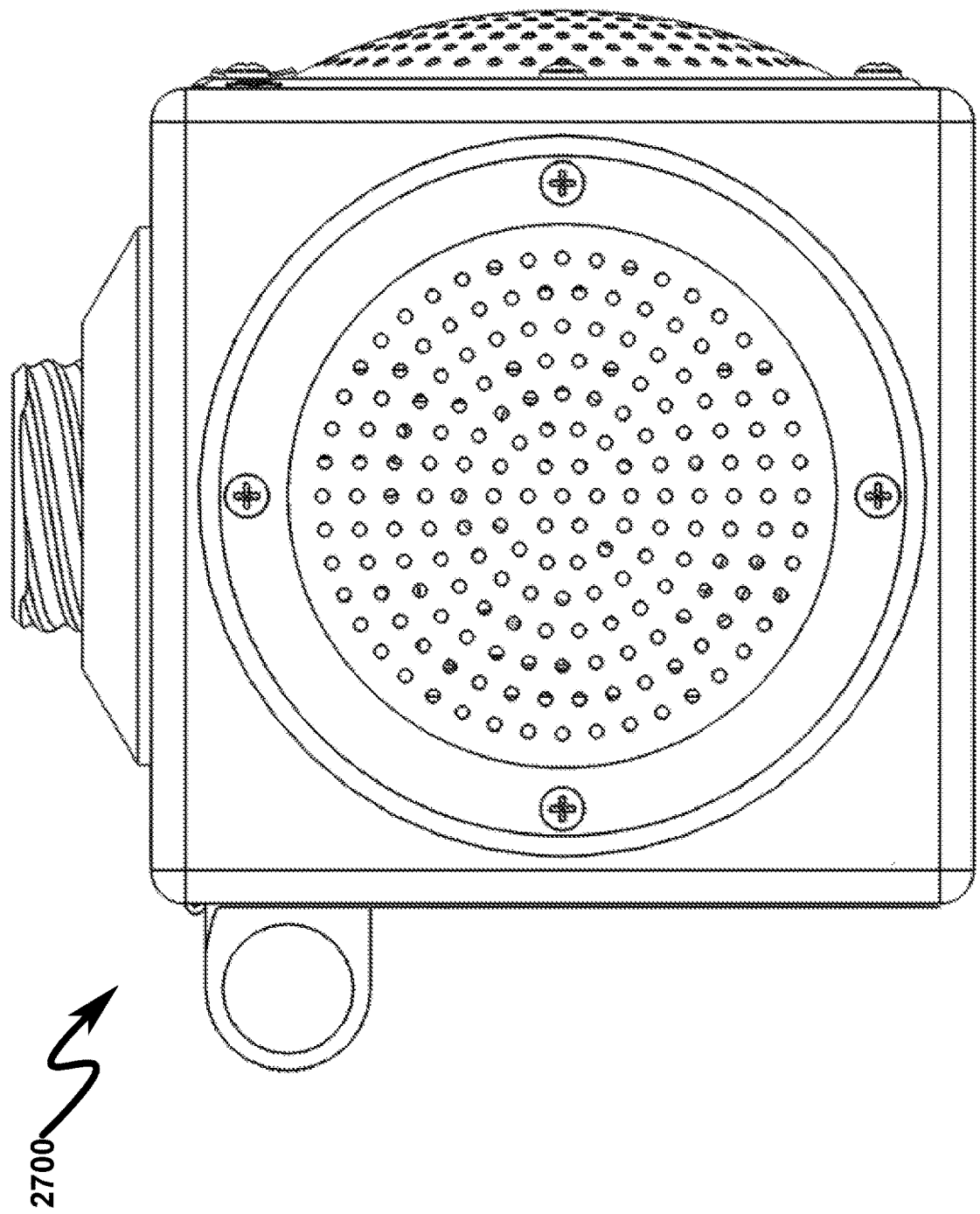
FIG. 27 illustrates a left side view of a preferred exemplary system embodiment depicting a modular audio module (MAM)
Figure 28:
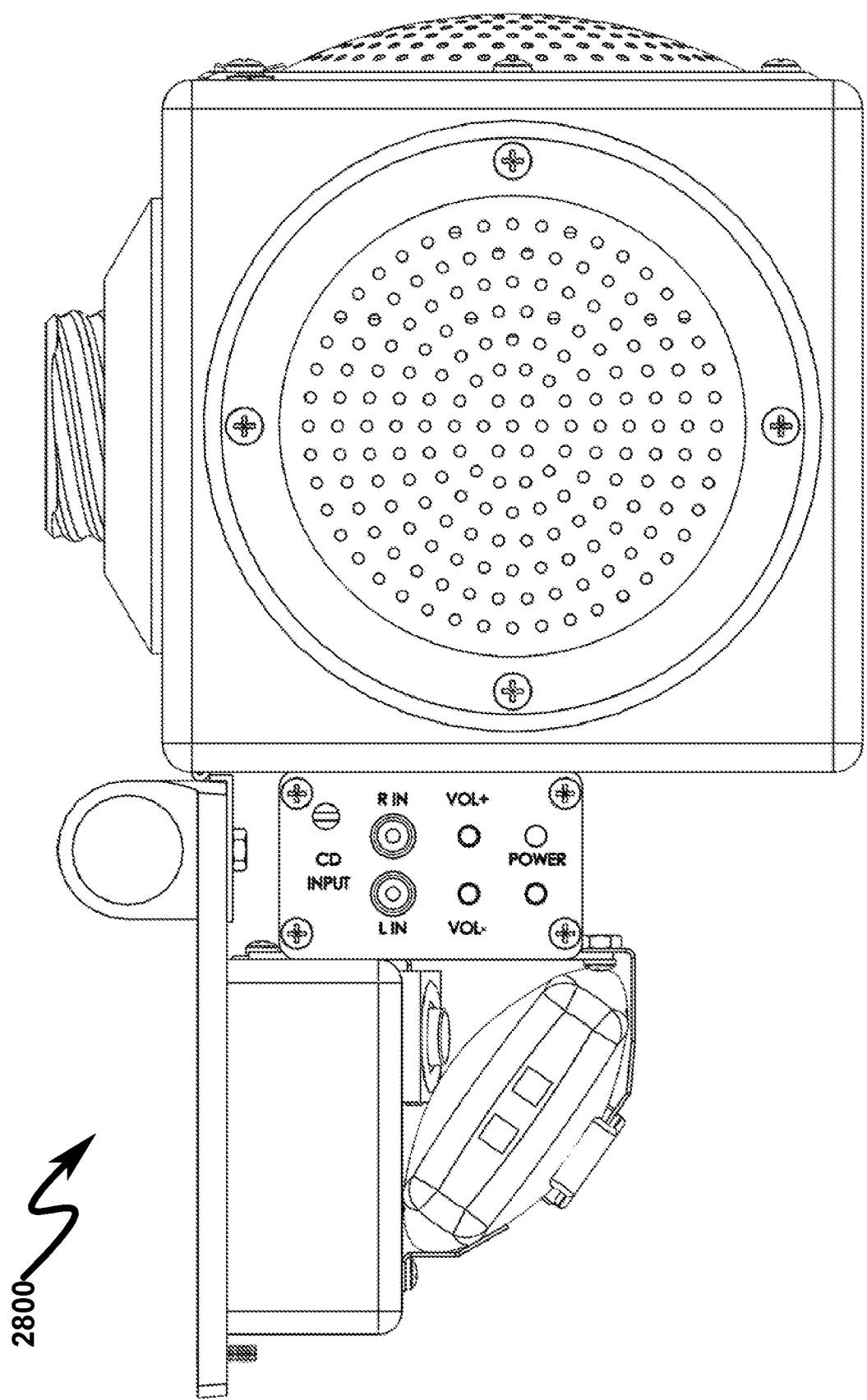
FIG. 28 illustrates a left side view of a preferred exemplary system embodiment depicting a modular audio module (MAM) with rear opening lid (ROL) extended.
Figure 29:
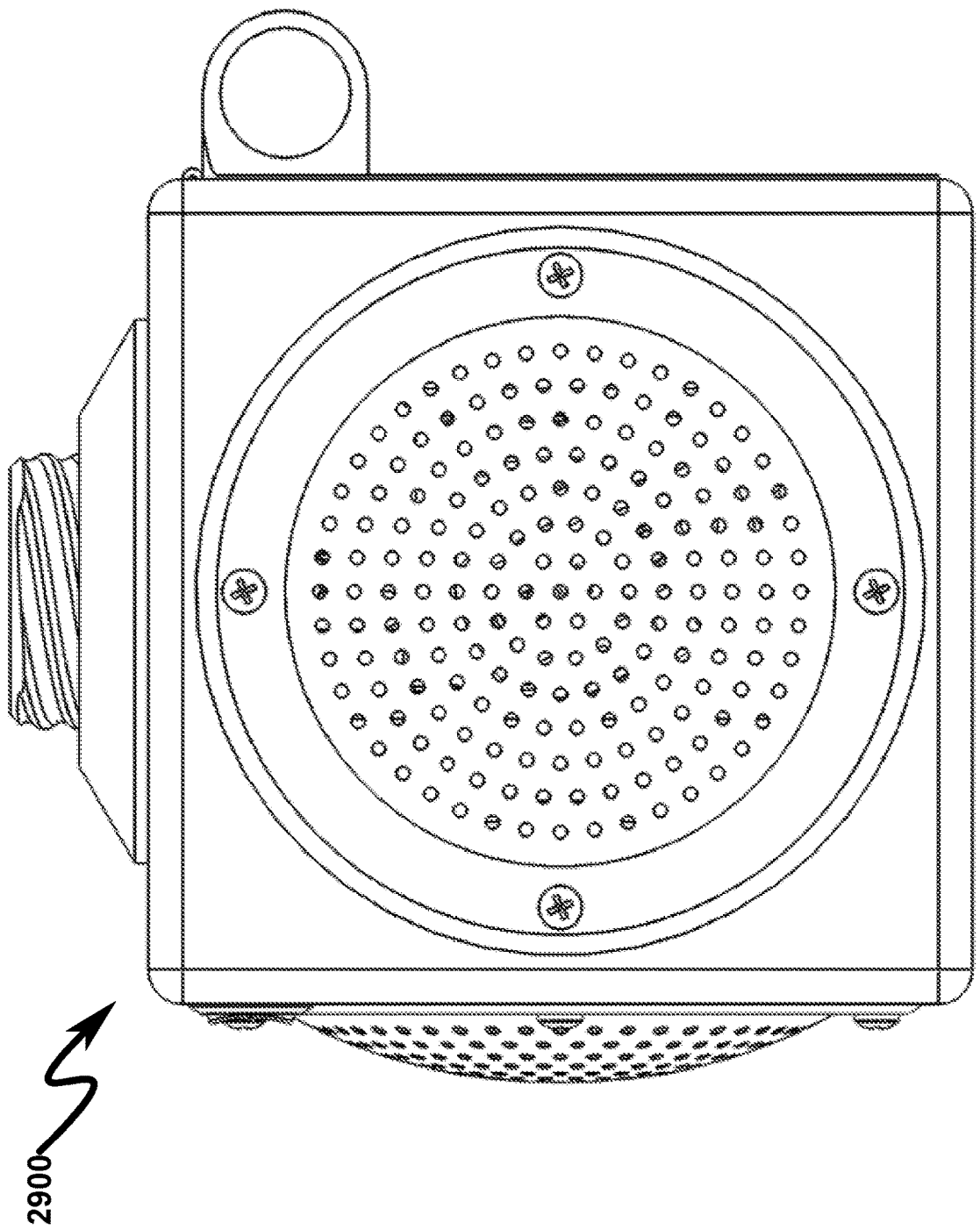
FIG. 29 illustrates a right side view of a preferred exemplary system embodiment depicting a modular audio module (MAM)
Figure 30:
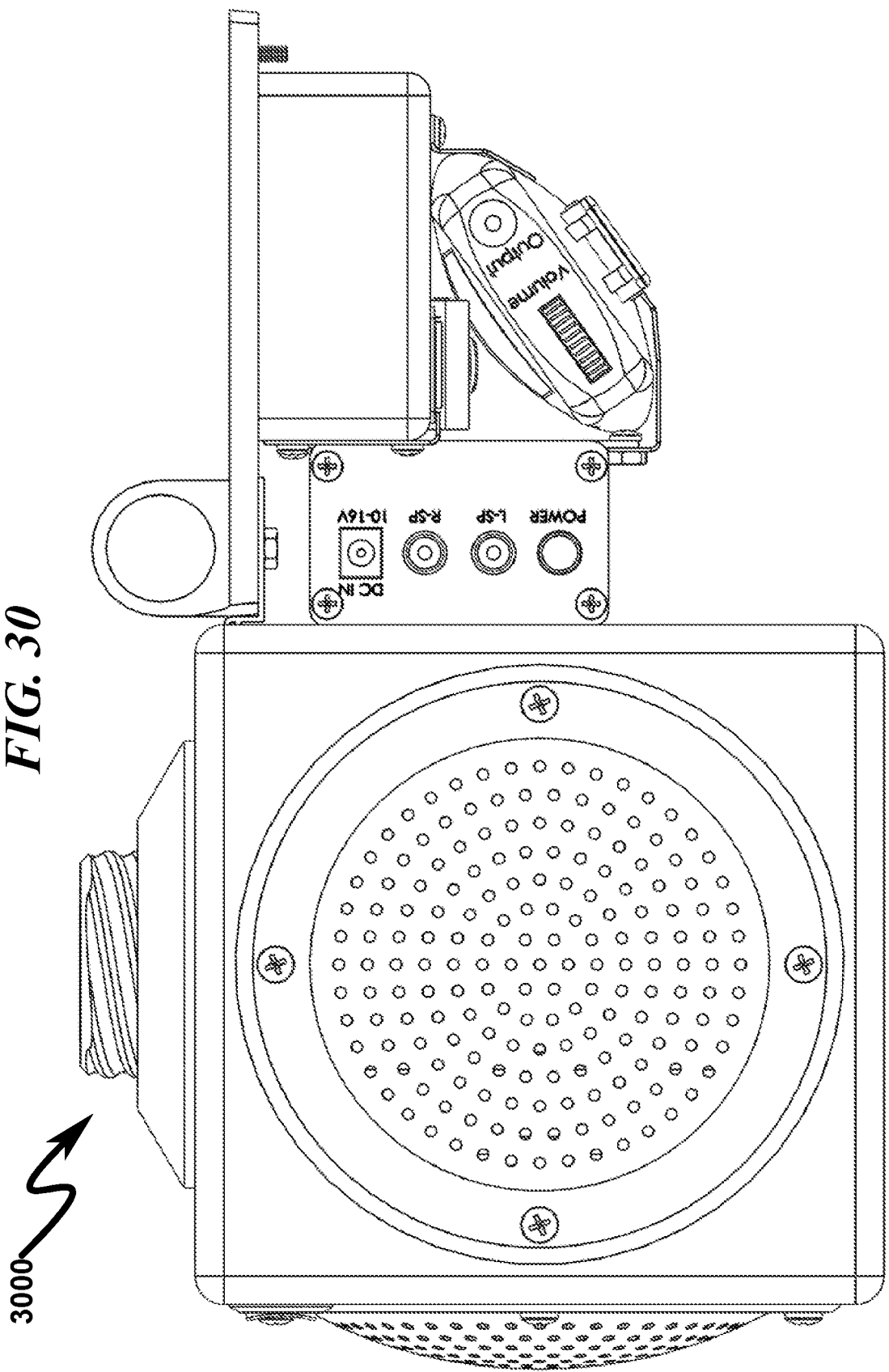
FIG. 30 illustrates a right side view of a preferred exemplary system embodiment depicting a modular audio module (MAM) with rear opening lid (ROL) extended.
Figure 31:
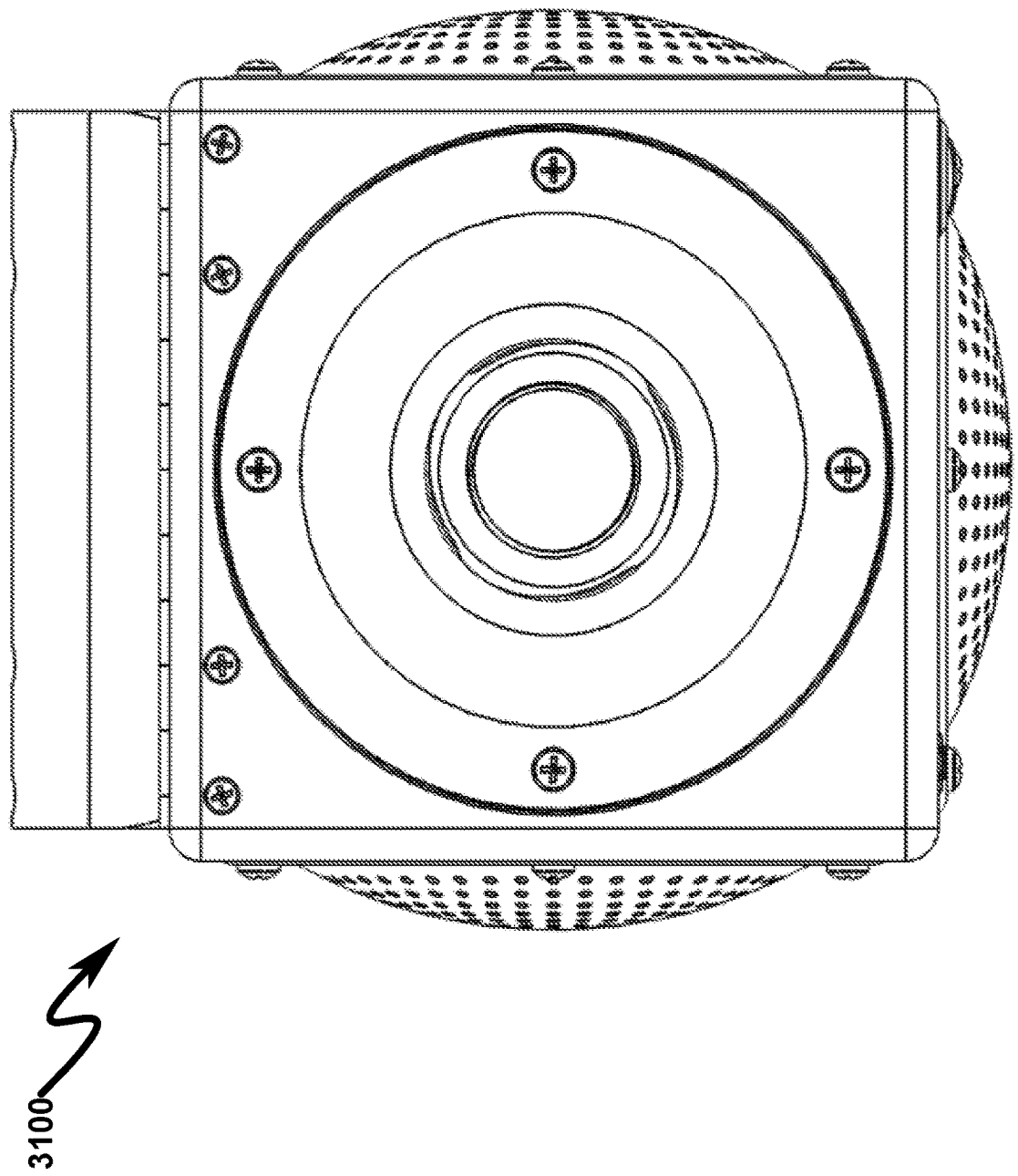
FIG. 31 illustrates a top view of a preferred exemplary system embodiment depicting a modular audio module (MAM)
Figure 32:
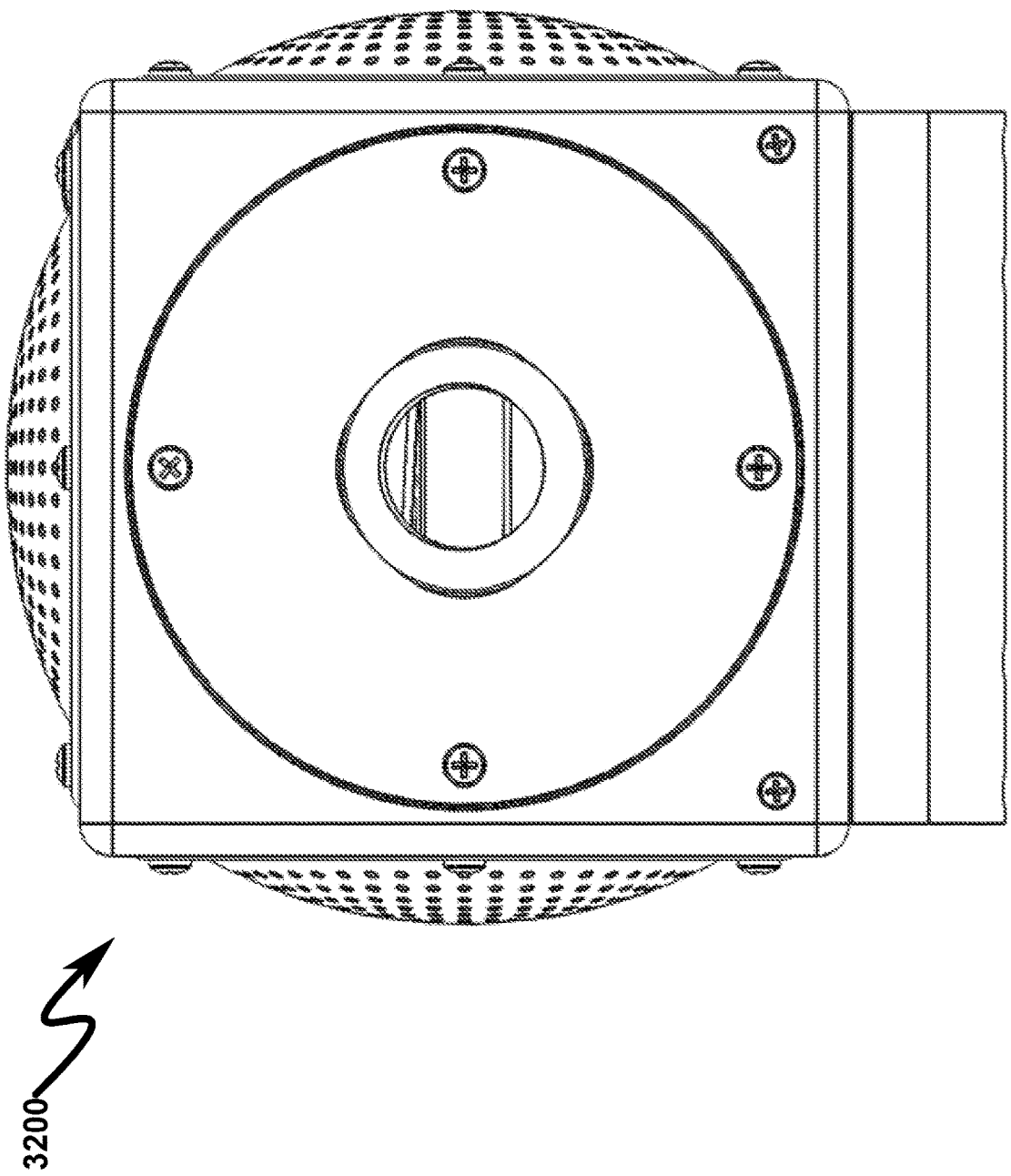
FIG. 32 illustrates a bottom view of a preferred exemplary system embodiment depicting a modular audio module (MAM)
Figure 33:
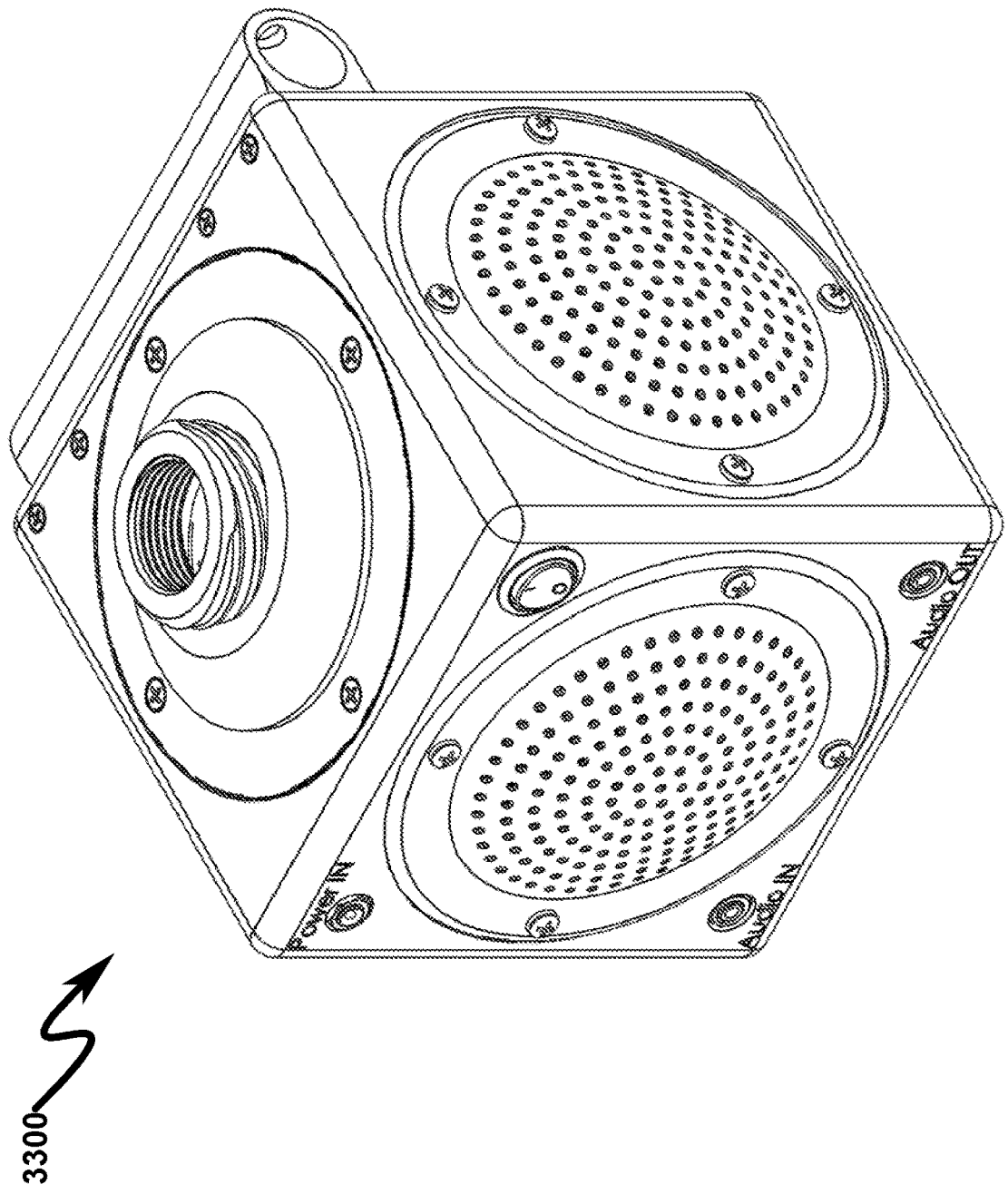
FIG. 33 illustrates a top right front perspective view of a preferred exemplary system embodiment depicting a modular audio module (MAM)
Figure 34:
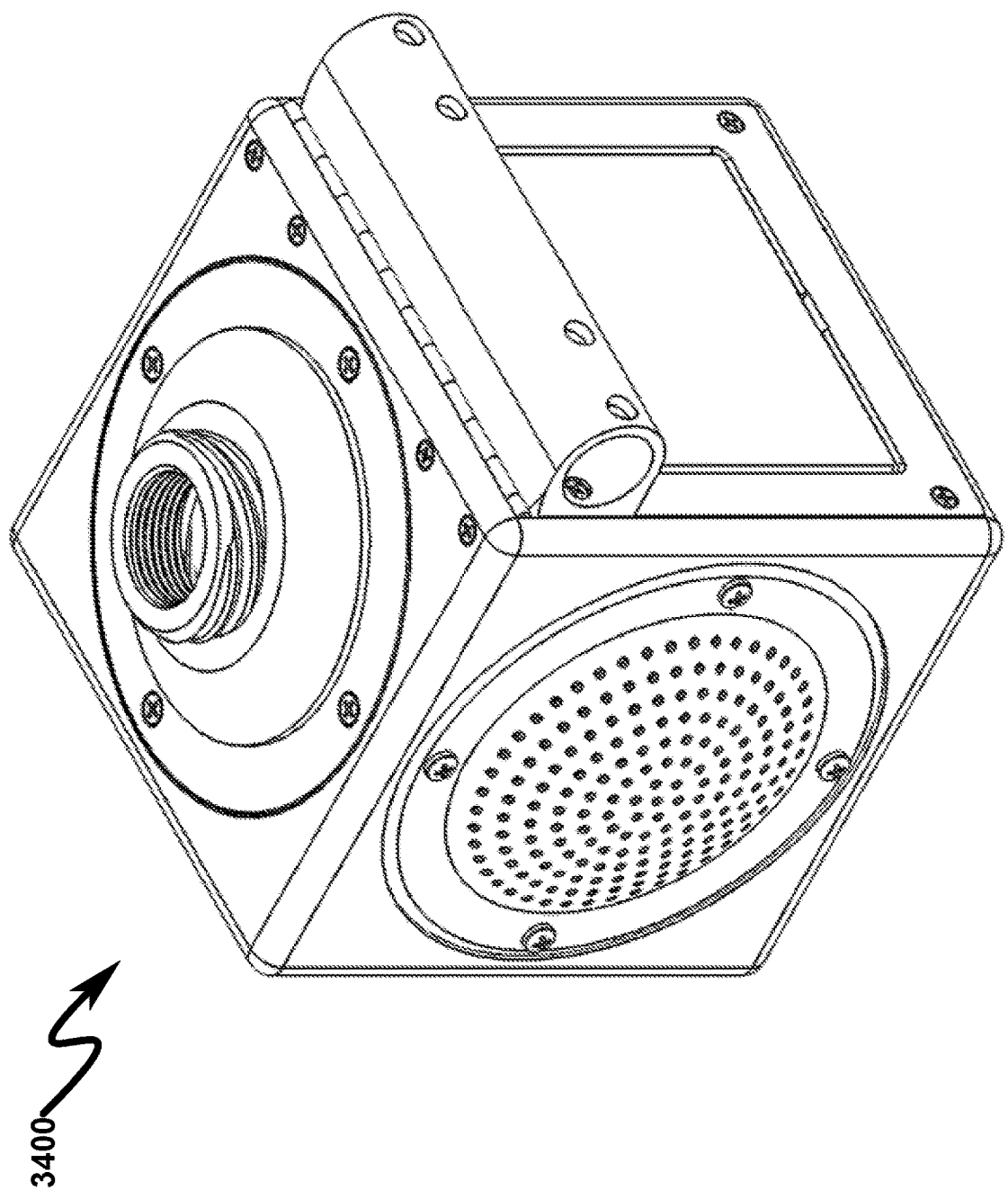
FIG. 34 illustrates a top right rear perspective view of a preferred exemplary system embodiment depicting a modular audio module (MAM)
Figure 35:
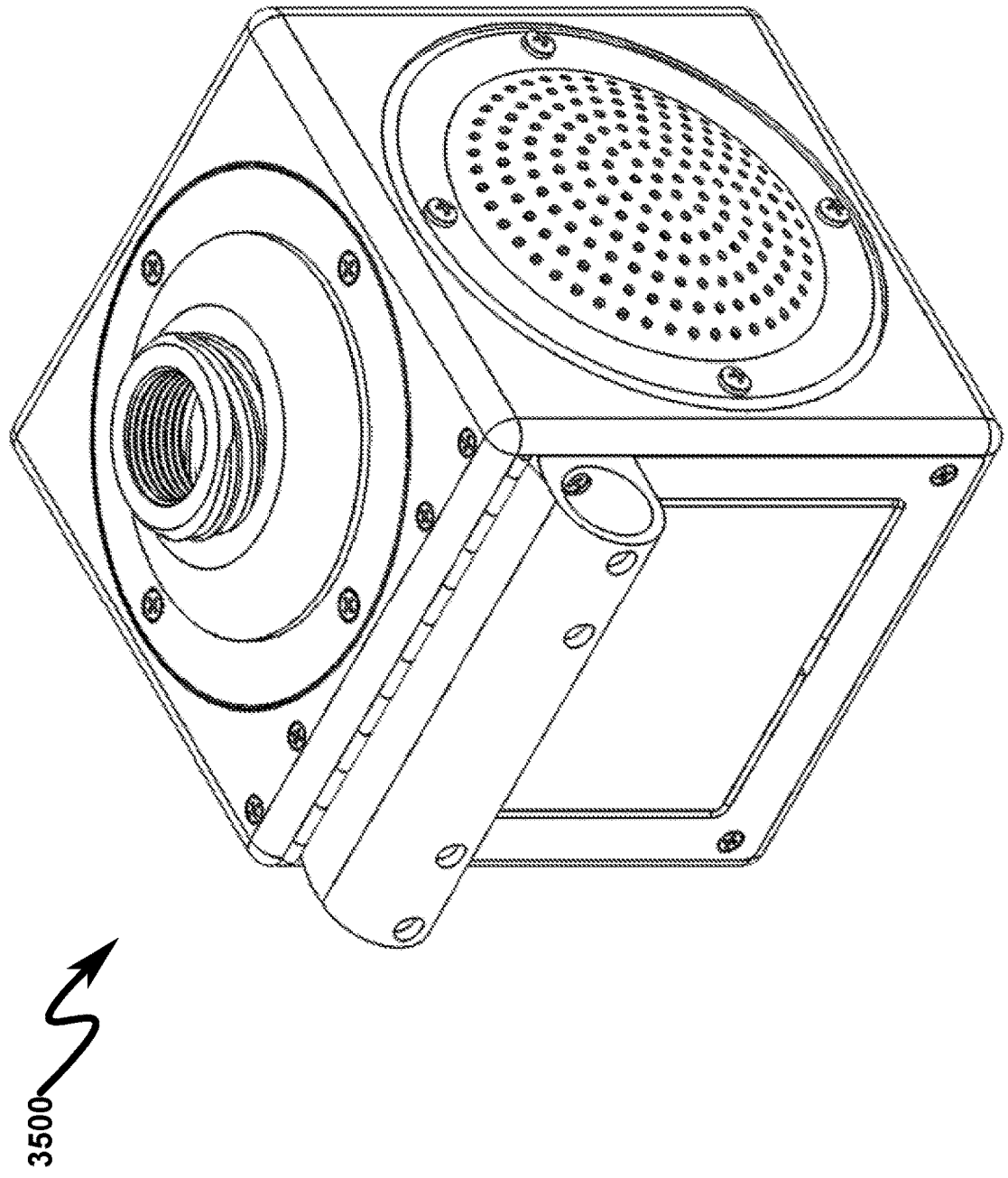
FIG. 35 illustrates a top left rear perspective view of a preferred exemplary system embodiment depicting a modular audio module (MAM)
Figure 36:
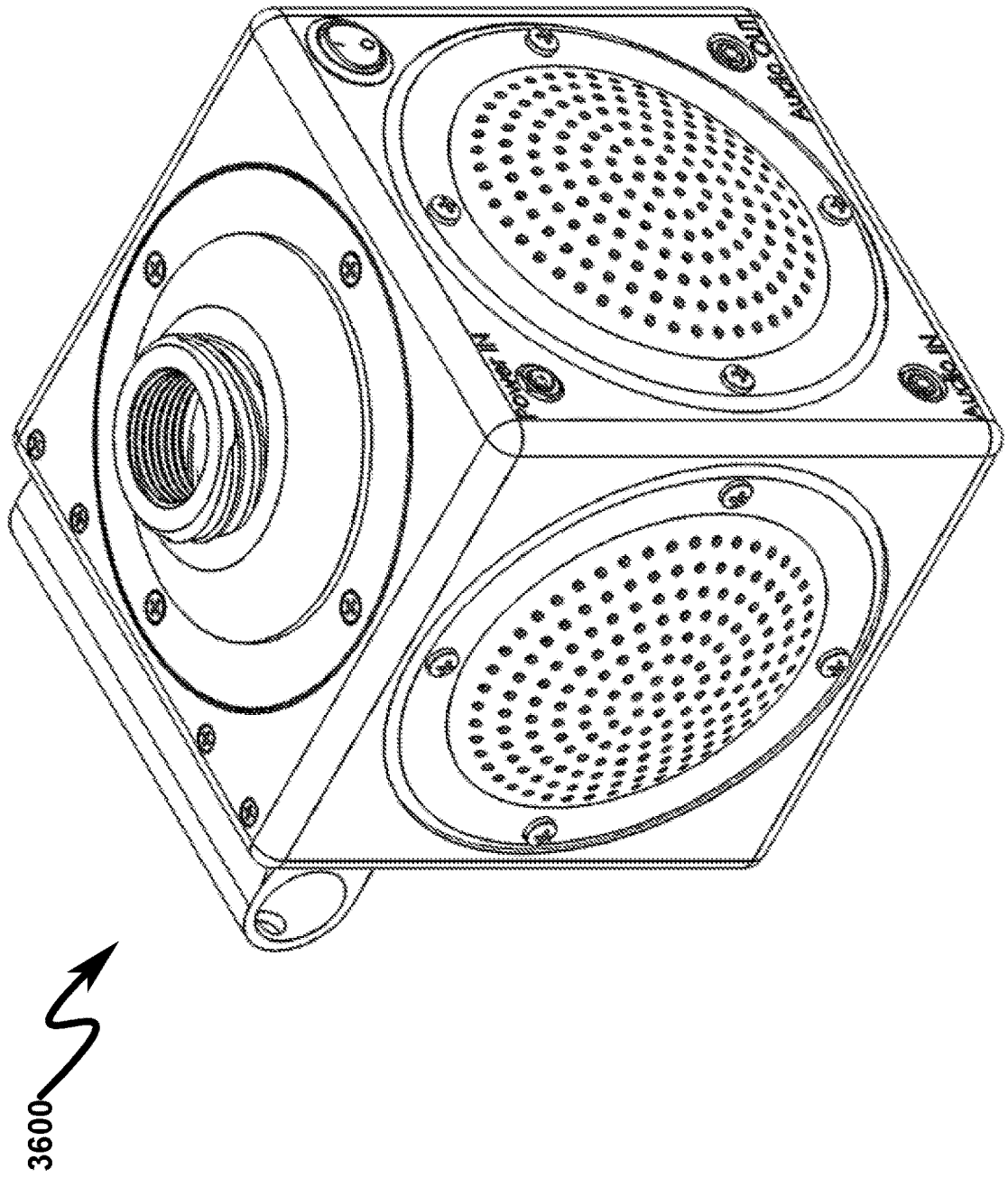
FIG. 36 illustrates a top left front perspective view of a preferred exemplary system embodiment depicting a modular audio module (MAM)
Figure 37:
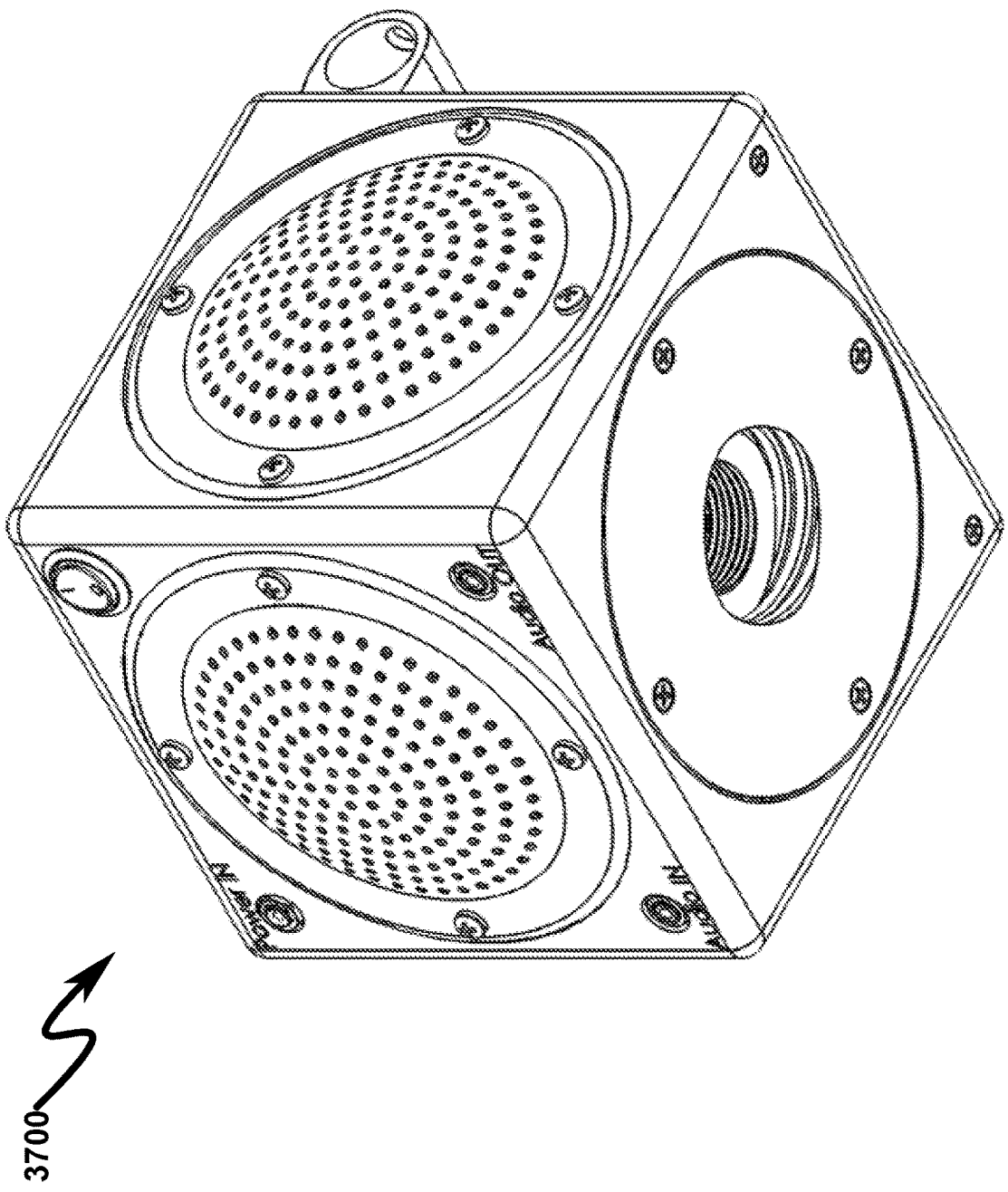
FIG. 37 illustrates a bottom right front perspective view of a preferred exemplary system embodiment depicting a modular audio module (MAM)
Figure 38:
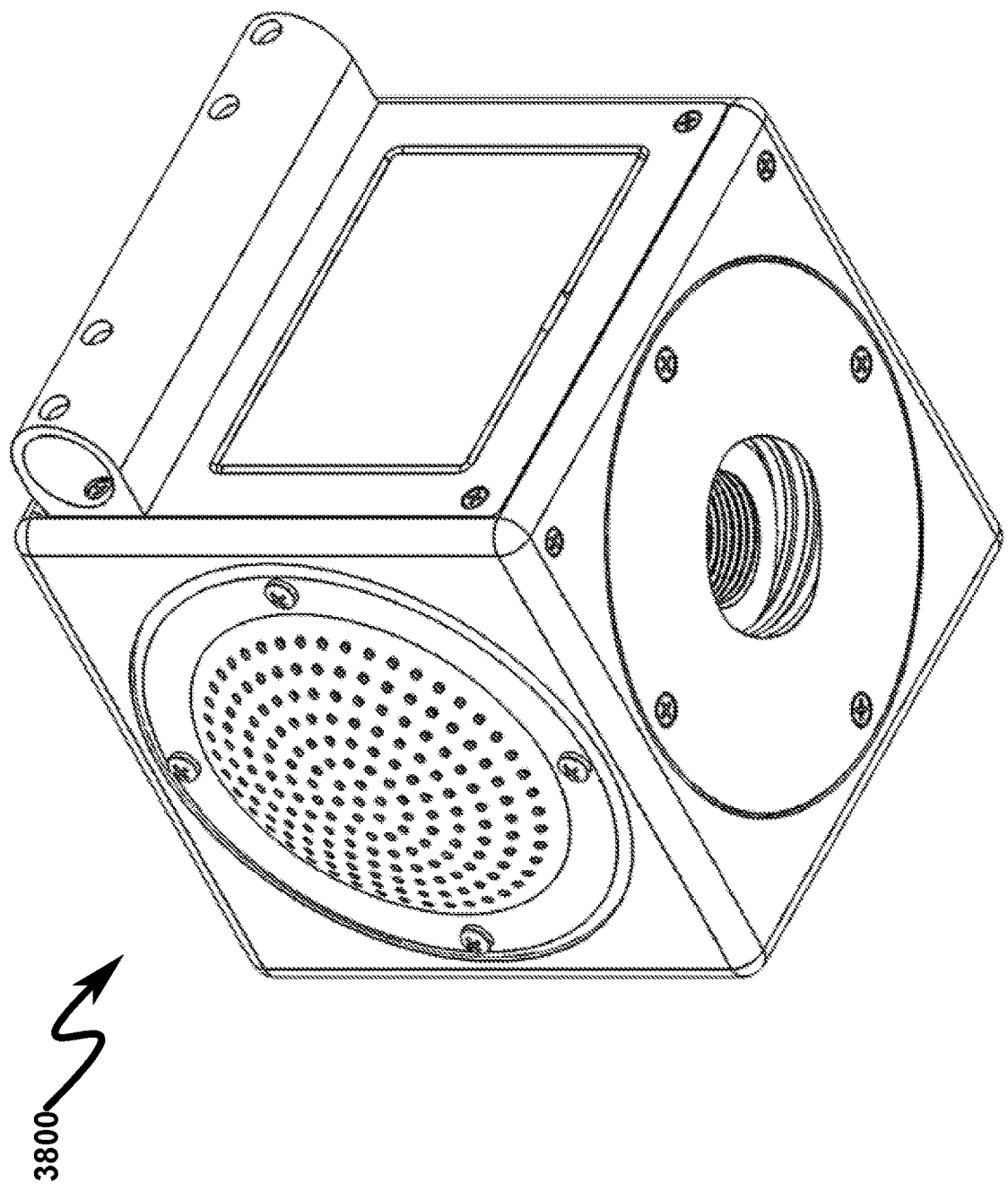
FIG. 38 illustrates a bottom right rear perspective view of a preferred exemplary system embodiment depicting a modular audio module (MAM)
Figure 39:
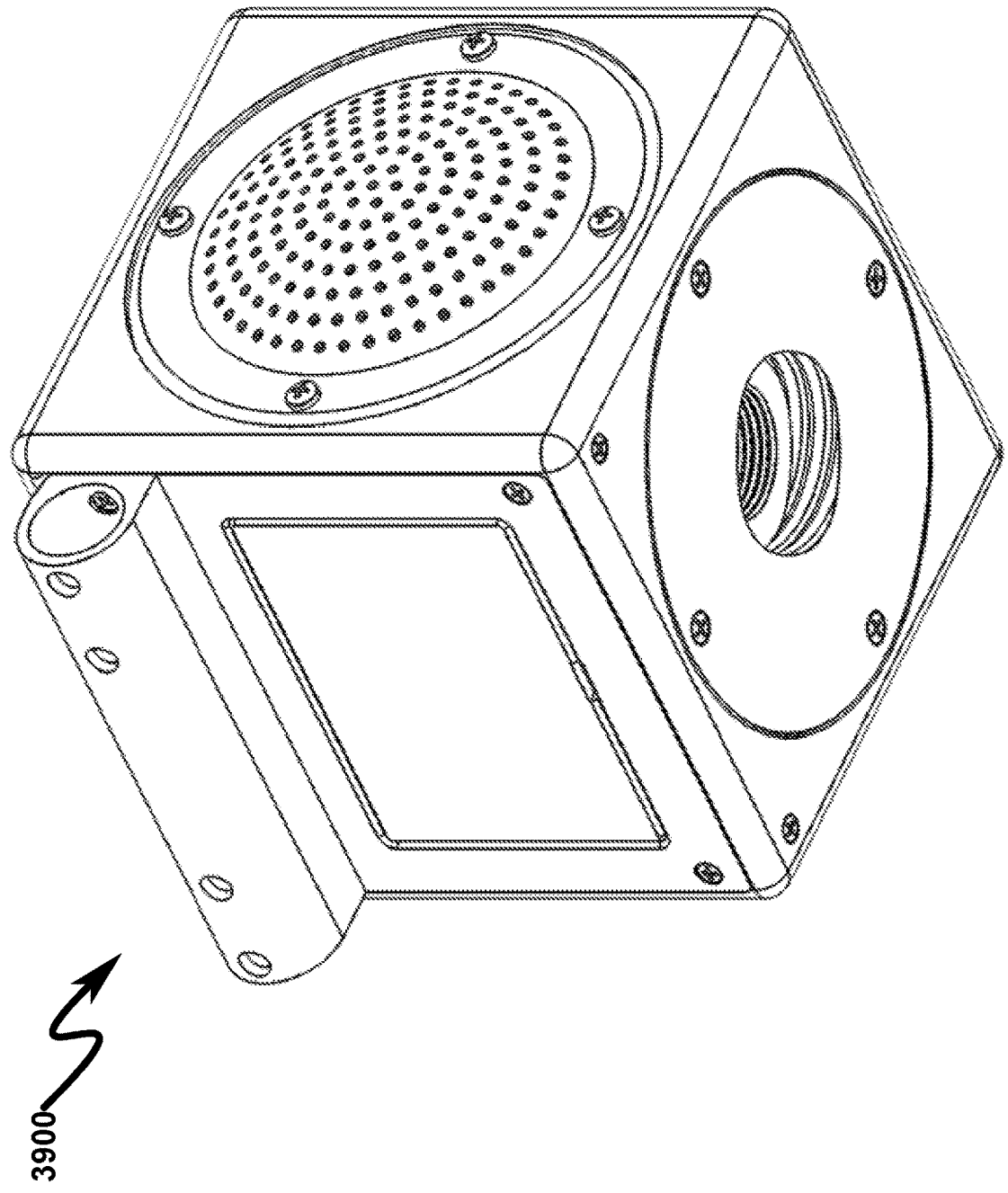
FIG. 39 illustrates a bottom left rear perspective view of a preferred exemplary system embodiment depicting a modular audio module (MAM)

Operational details of the MAM are depicted in FIG. 12 (1200)-FIG. 25 (2500). One skilled in the art will recognize the functions depicted in these flowcharts and have sufficient information to implement the claimed invention. The MAM IDLE state processing depicted in FIG. 12 (1200) represents the root of all operation processing by the MAM and references the remaining flowcharts in FIG. 13 (1300)-FIG. 24 (2400). Note that these flowcharts involve the use of GPS to track the individual MAM units and a dual-band RF communications network that serves to support local WiFi as well as longer-range 900 MHz emergency communications between the CCS and the individual MAM. Within this context there are several methods illustrated to provide for communications fallback in the event of a WiFi mesh failure, including power bypass relays to scan for available communications from nearby MAM units as well as the CCS.

This communication network also permits the CCS to obtain positional information on the individual MAMs as well as to obtain data from PED events or status that are associated with the MAMs. In this manner it is possible for the CCS to specifically direct that only certain audio be played on a certain number of MAMs within their respective mesh network. This dual-band communication also permits the use of DDAs to fly over one or more of the audio mesh networks to deliver CONFIG files and associated audio playback files to the various MAMs.

Each MAM as it processes the CONFIG file may also be presented with a Boolean logic expression (BLE) that requires a logical combination of PED/RTC events to occur before a specific audio playback is generated. This permits the use of tailored audio to be emitted at a given MAM based on a plurality of PED events, spatial constraints, audio files, and RTC timing events. For example, an audio trigger may be generated to emit a first emergency message within one minute of a PED-detected bombing event, followed by an audio trigger to emit a second emergency message within five minutes of the PED-detected bombing event, followed by a GPS-restricted emergency message occurring at ten minutes after the detected terrorist event. In this manner the audio messages can be tailored to a range of detected events/times and generated automatically even if communication with the CCS has been lost due to disruptions in the mesh network.

Mobile Audio Module (MAM) Mechanical Detail (2500)-(4000)

Figure 40:
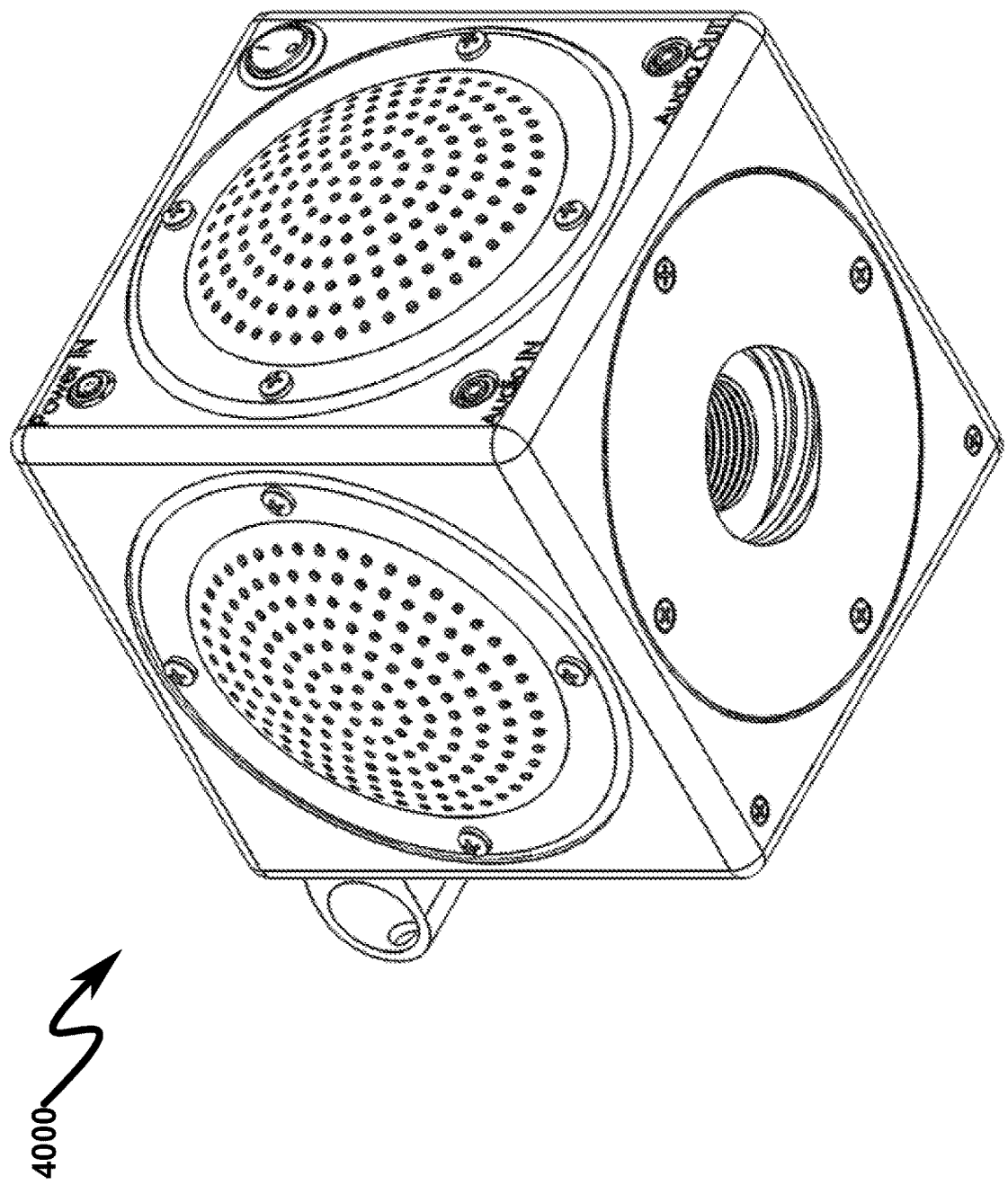
FIG. 40 illustrates a bottom left front perspective view of a preferred exemplary system embodiment depicting a modular audio module (MAM)
Figure 41:
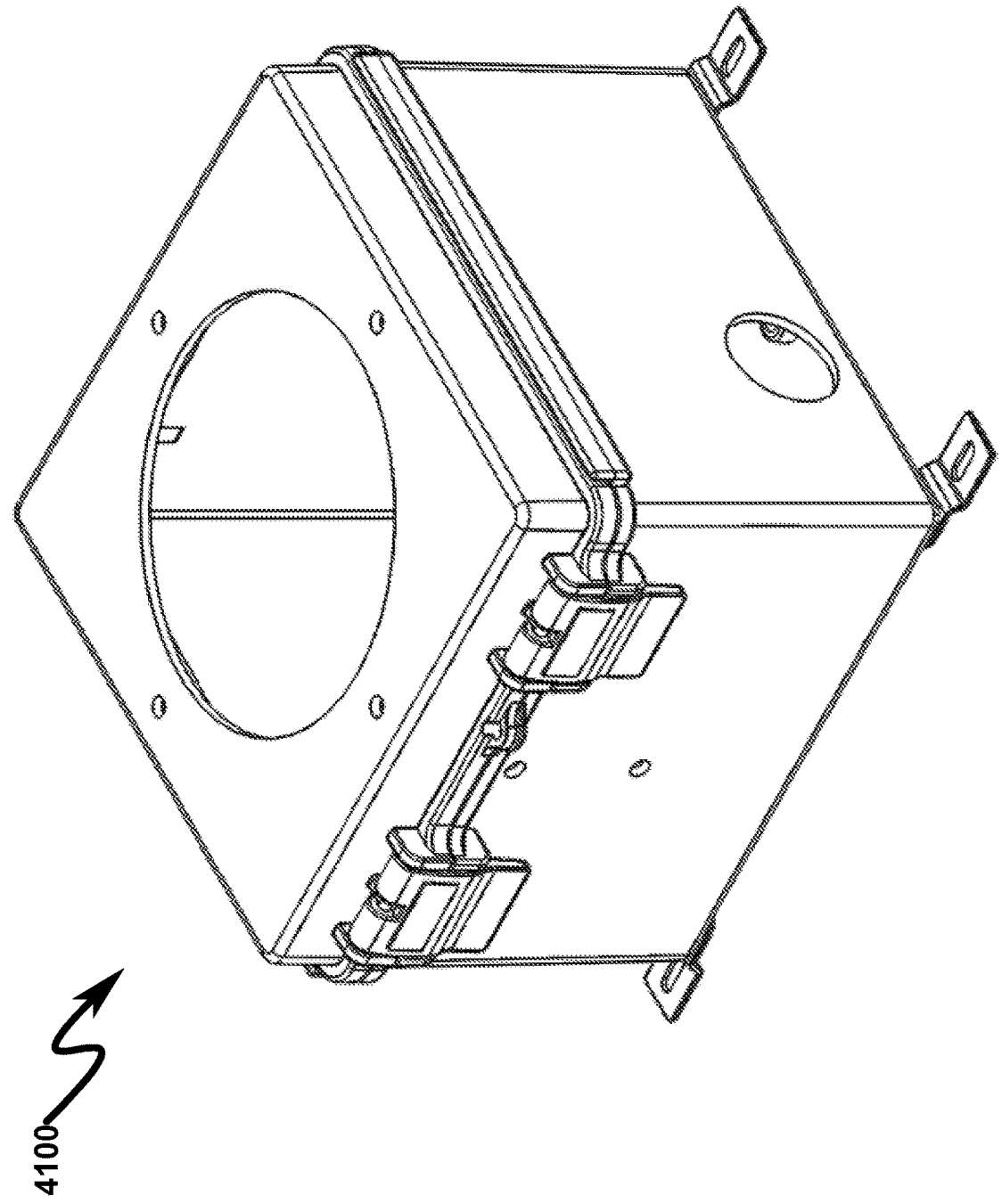
FIG. 41 illustrates a top right front perspective view of a preferred exemplary system embodiment depicting an alternative modular audio module (MAM) enclosure incorporating water-tight seals.
Figure 42:
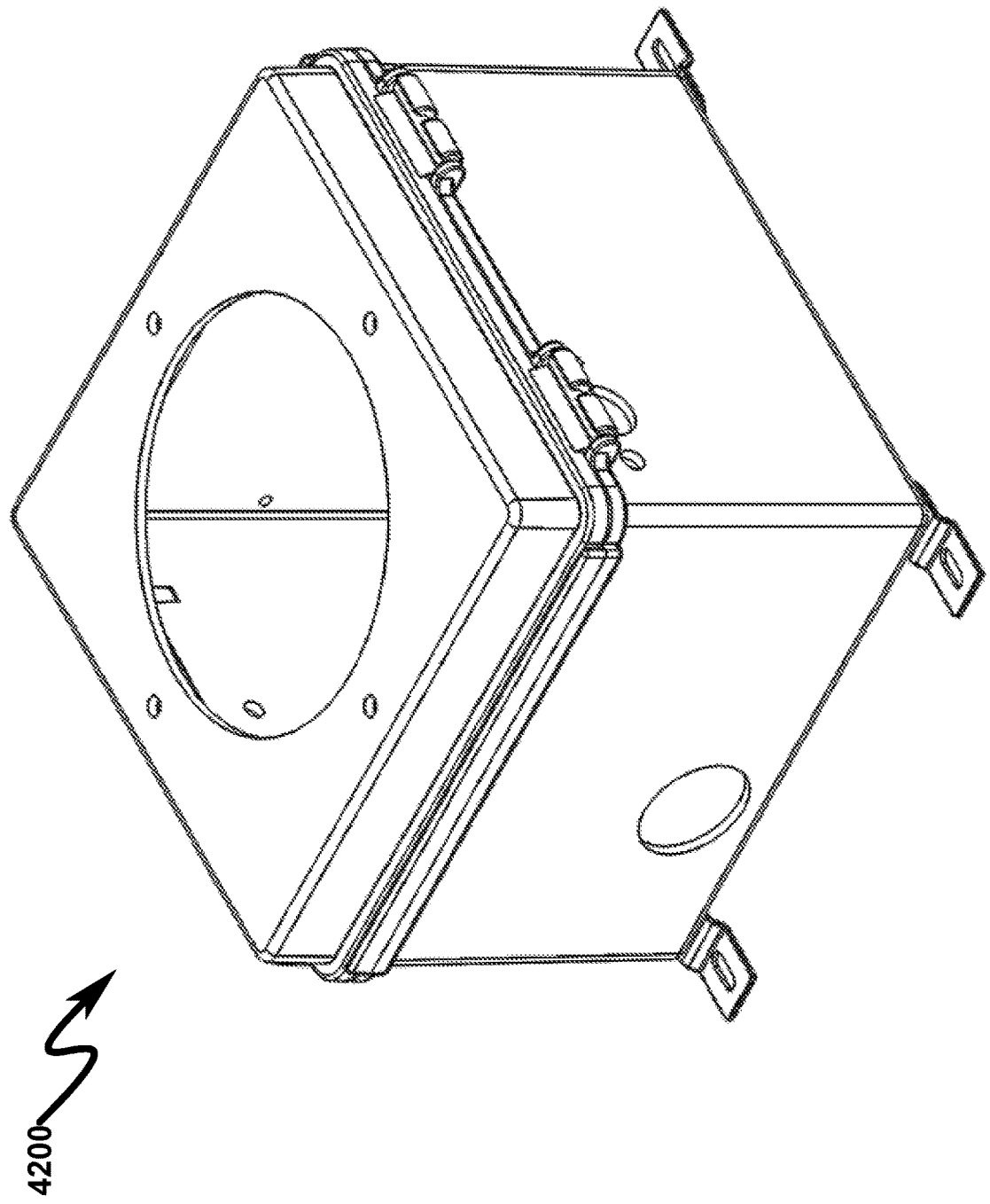
FIG. 42 illustrates a top right rear perspective view of a preferred exemplary system embodiment depicting an alternative modular audio module (MAM) enclosure incorporating water-tight seals.
Figure 43:
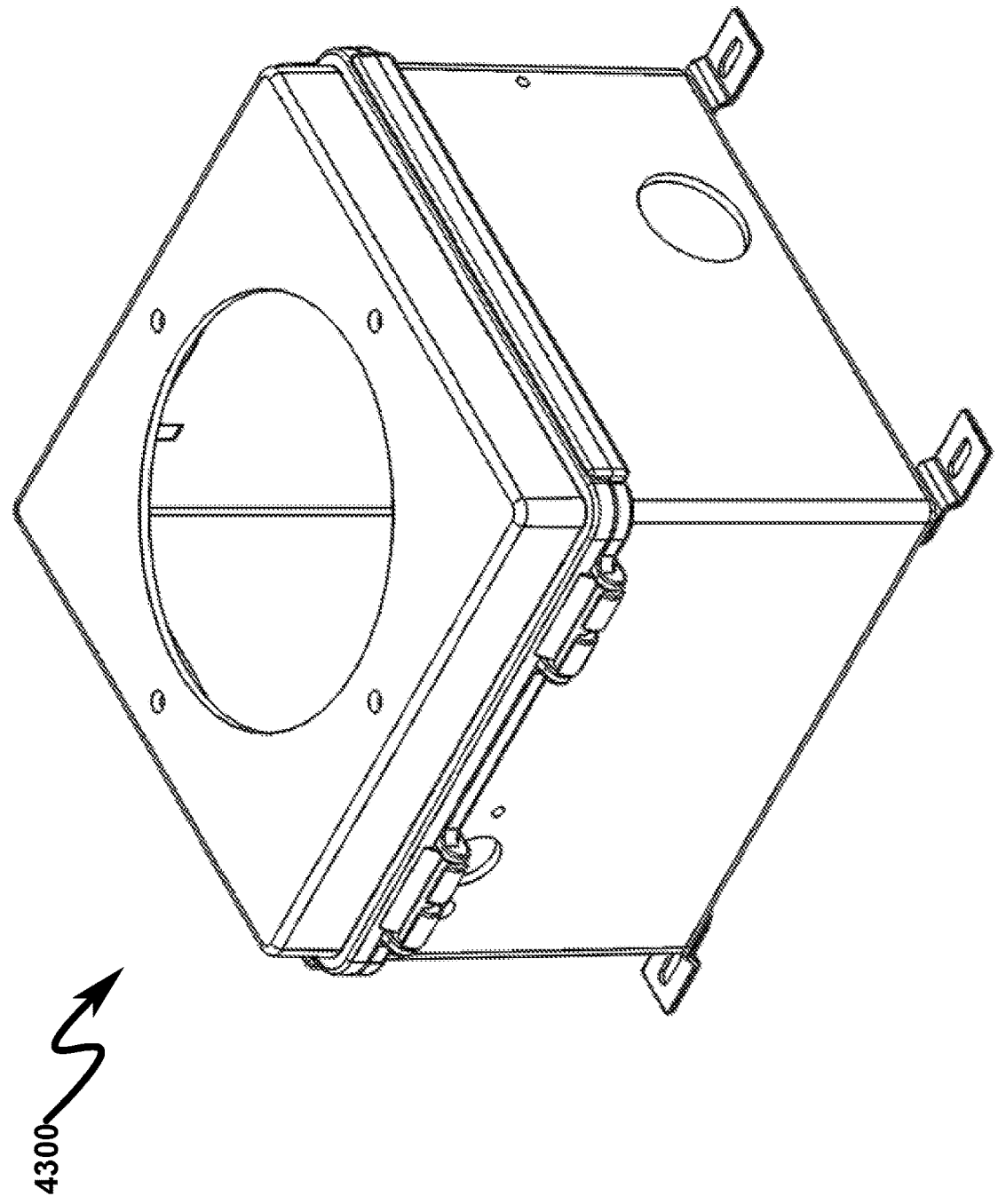
FIG. 43 illustrates a top left rear perspective view of a preferred exemplary system embodiment depicting an alternative modular audio module (MAM) enclosure incorporating water-tight seals.
Figure 44:
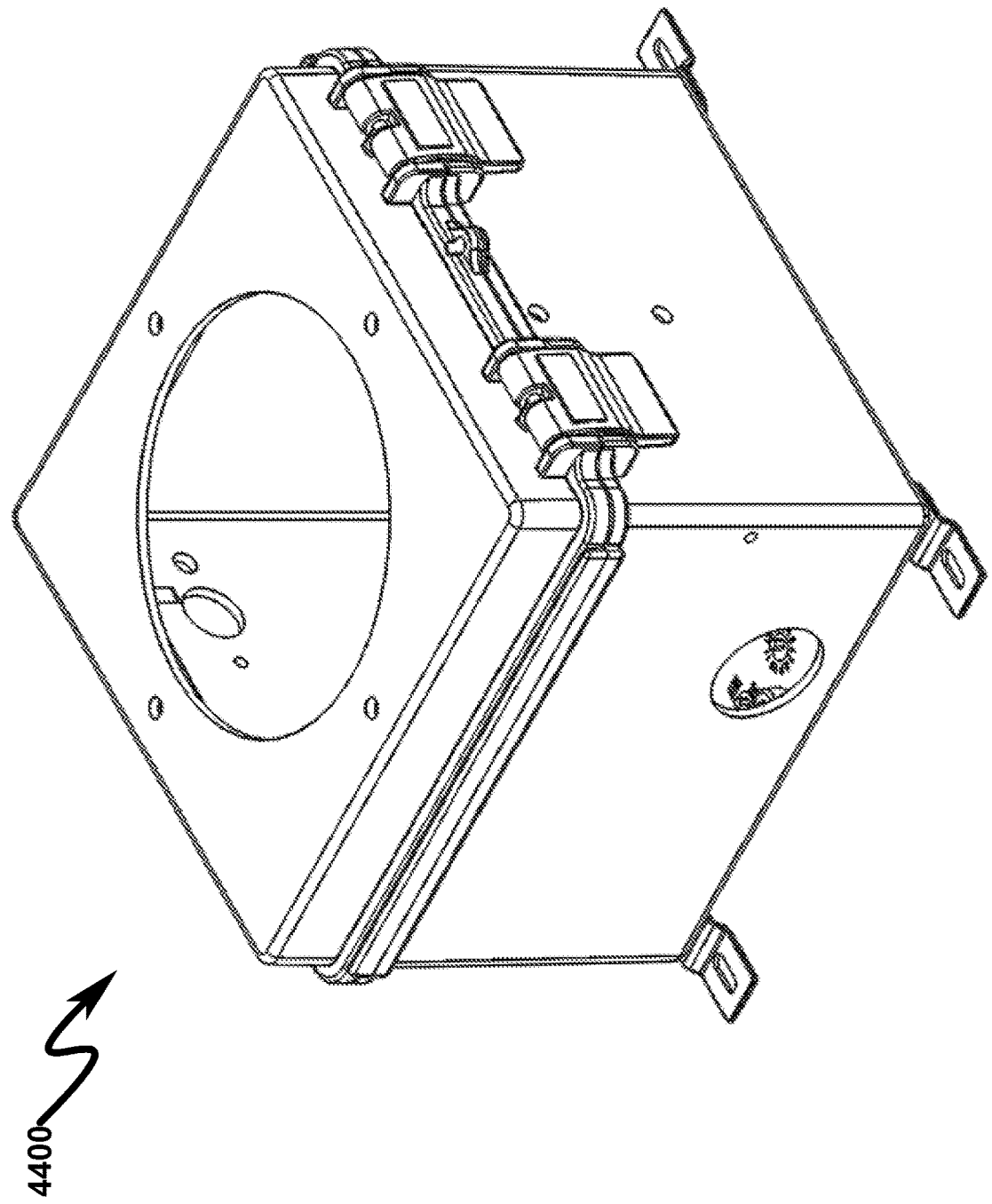
FIG. 44 illustrates a top left front perspective view of a preferred exemplary system embodiment depicting an alternative modular audio module (MAM) enclosure incorporating water-tight seals.
Figure 45:
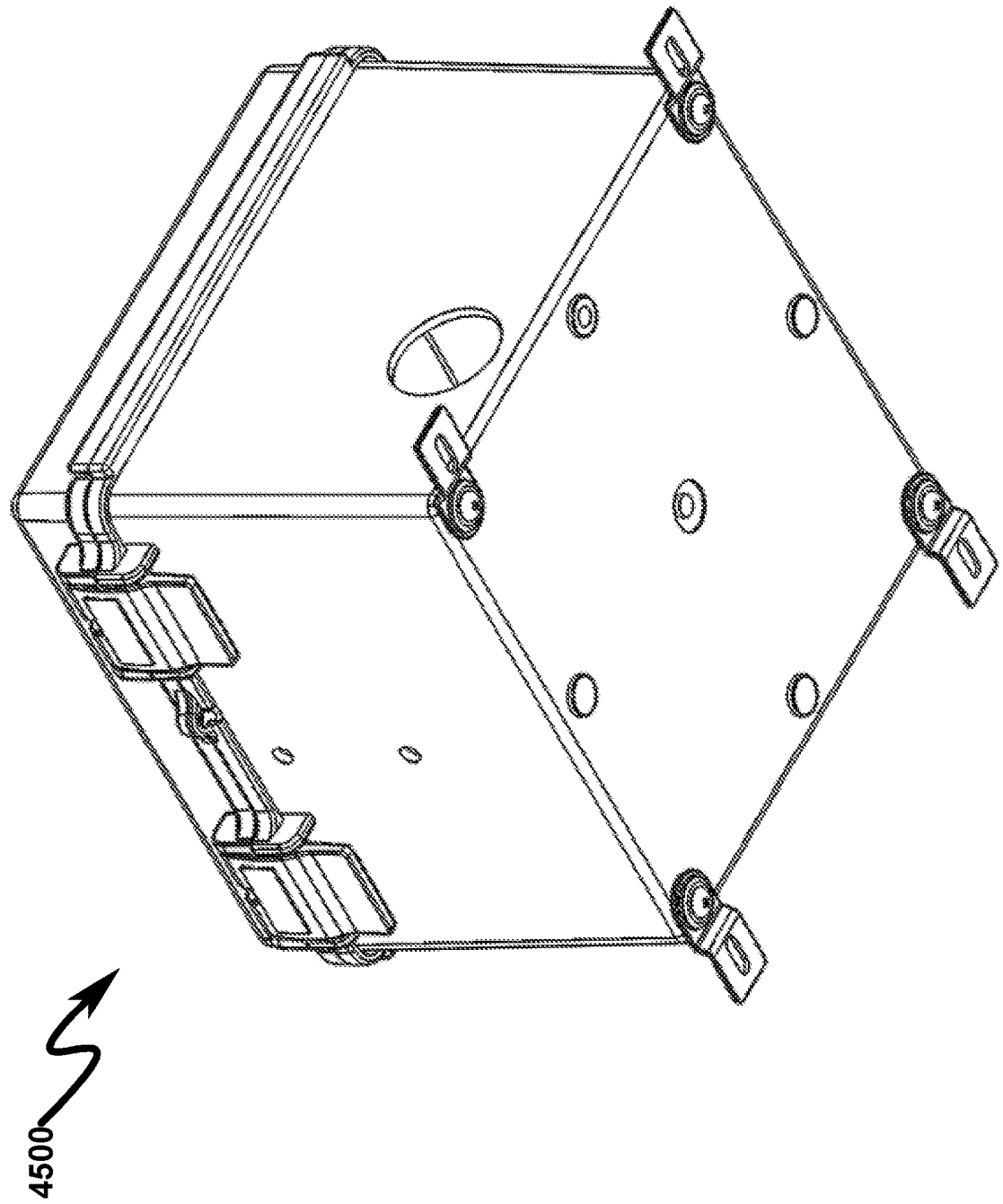
FIG. 45 illustrates a bottom right front perspective view of a preferred exemplary system embodiment depicting an alternative modular audio module (MAM) enclosure incorporating water-tight seals.
Figure 46:
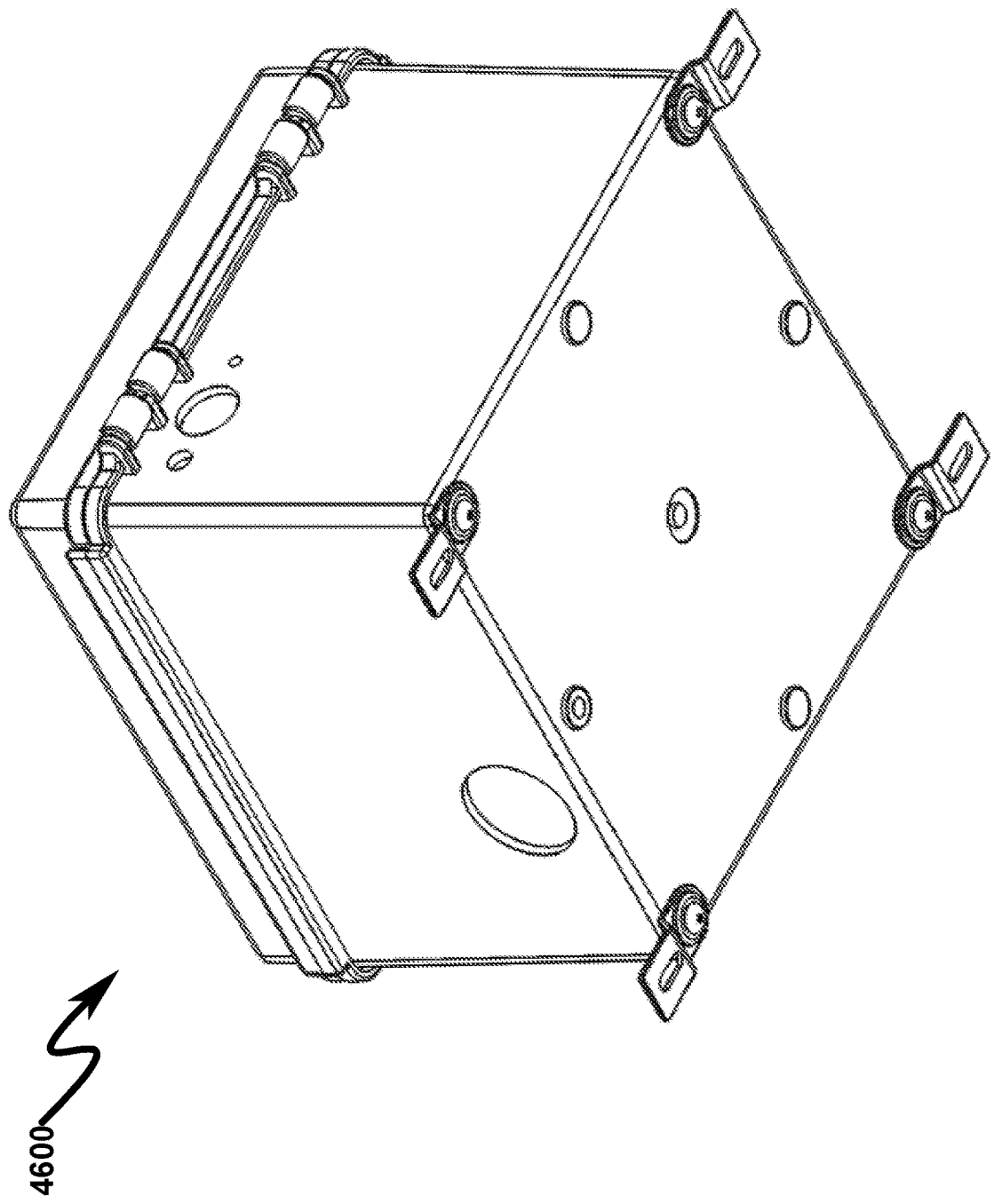
FIG. 46 illustrates a bottom right rear perspective view of a preferred exemplary system embodiment depicting an alternative modular audio module (MAM) enclosure incorporating water-tight seals.
Figure 47:
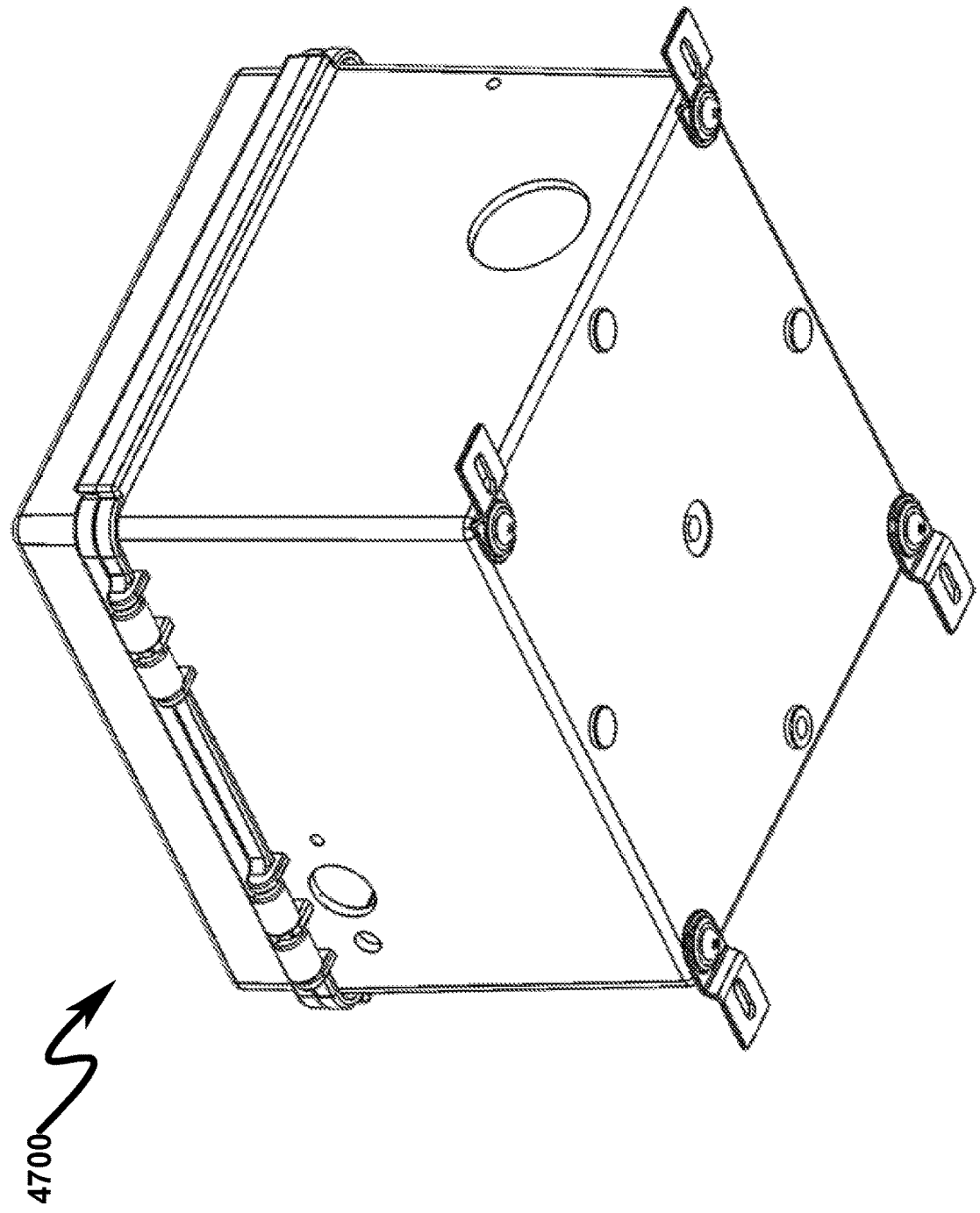
FIG. 47 illustrates a bottom left rear perspective view of a preferred exemplary system embodiment depicting an alternative modular audio module (MAM) enclosure incorporating water-tight seals.
Figure 48:
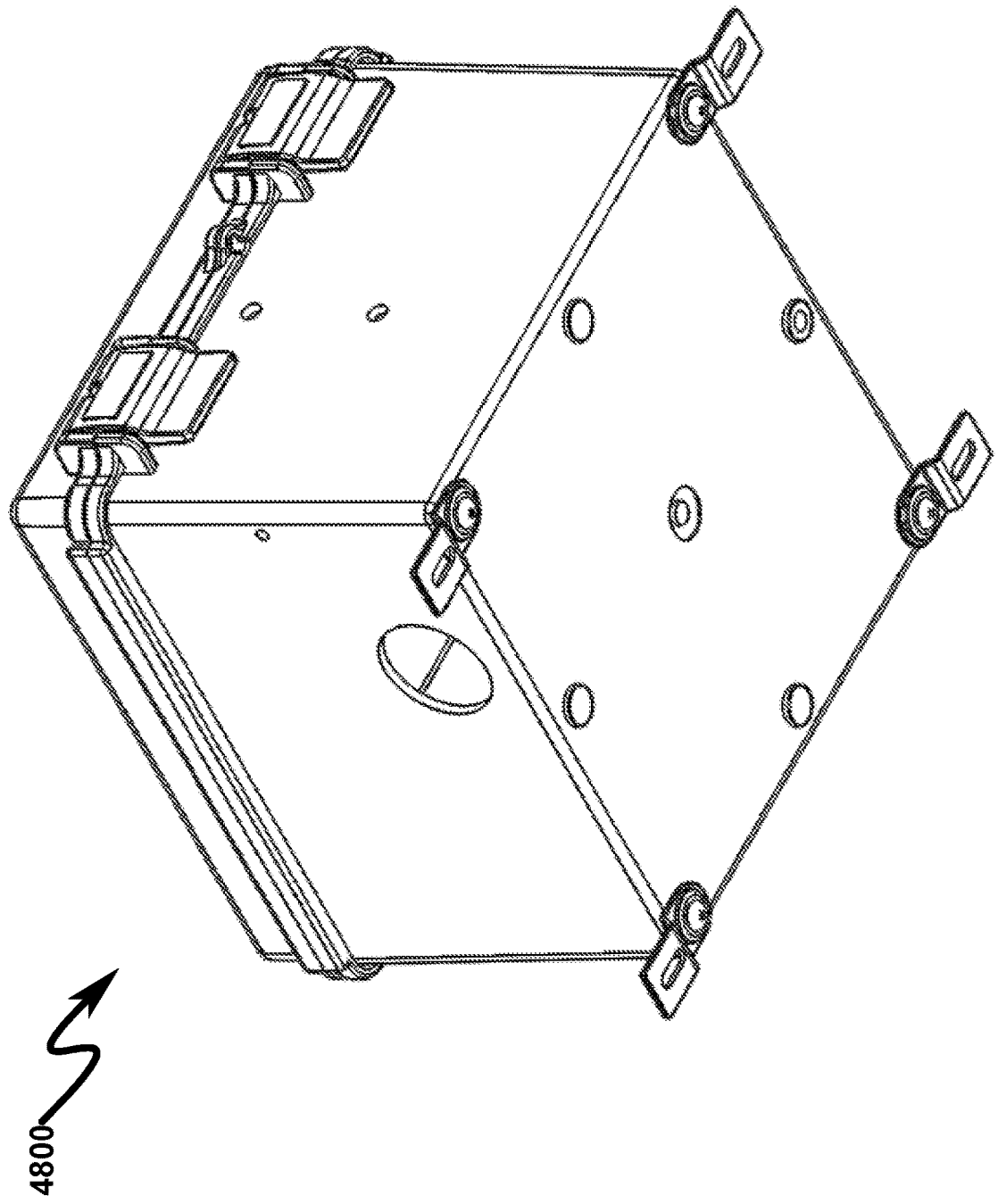
FIG. 48 illustrates a bottom left front perspective view of a preferred exemplary system embodiment depicting an alternative modular audio module (MAM) enclosure incorporating water-tight seals.

A preferred exemplary system embodiment of a mobile audio module (MAM) is generally depicted in FIG. 25 (2500)-FIG. 40 (4000). The MAM (2510, 2610) generally comprises a mobile containing enclosure (MCE) (2511, 2611) comprising a box having a front face (FF), right face (RF), left face (LF), top face (TF), and bottom face (BF), and a rear opening (RO). The FF typically incorporates an audio speaker grill (ASG) (2512, 2612) covering a mobile audio speaker (MAS). The RF and LF incorporate one or more audio speaker grill (ASG) (2513, 2514, 2613, 2614). The FF may incorporate AUDIO INPUT (2515), AUDIO OUTPUT (2516), and POWER INPUT (2517) jacks as well as a MASTER POWER ON/OFF switch (2518). Typical configurations of the MAM (2510, 2610) incorporate one or more hermaphroditic plate connectors (HPC) (2531, 2631) that can be used to support the MAM (2510, 2610) or interconnect one MAM (2510, 2610) with another MAM. The RO is covered with a rear opening lid (ROL) (2620) that is mechanically coupled to the mobile containing enclosure (2511, 2611) with a hinge (2619) or other equivalent articulating mechanical device.

Alternative MAM Enclosure and Assembly (4900)-(6400)

Figure 49:
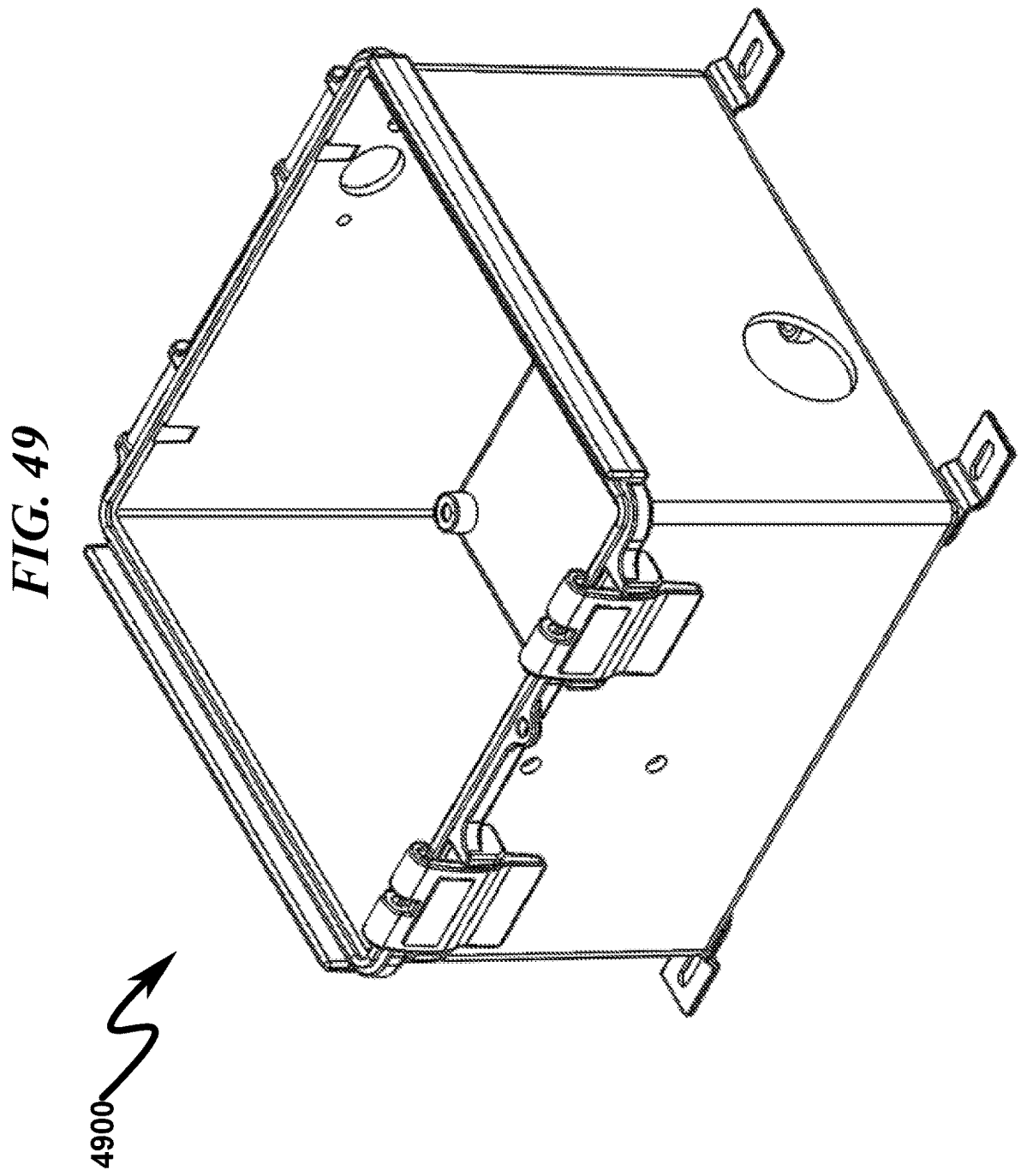
FIG. 49 illustrates a top right front perspective view of a preferred exemplary system embodiment depicting an alternative modular audio module (MAM) enclosure bottom shell incorporating water-tight seals.
Figure 50:
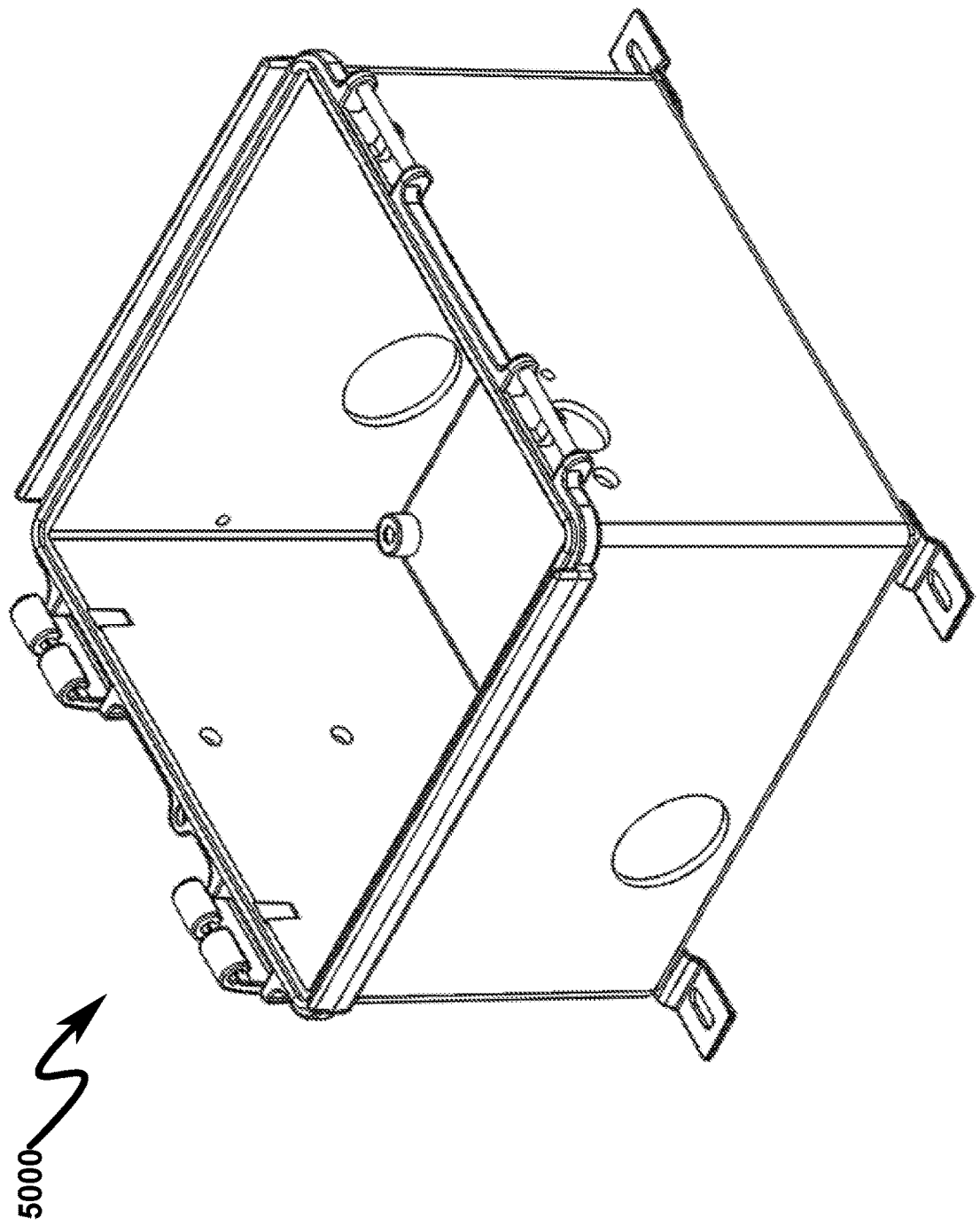
FIG. 50 illustrates a top right rear perspective view of a preferred exemplary system embodiment depicting an alternative modular audio module (MAM) enclosure bottom shell incorporating water-tight seals.
Figure 51:
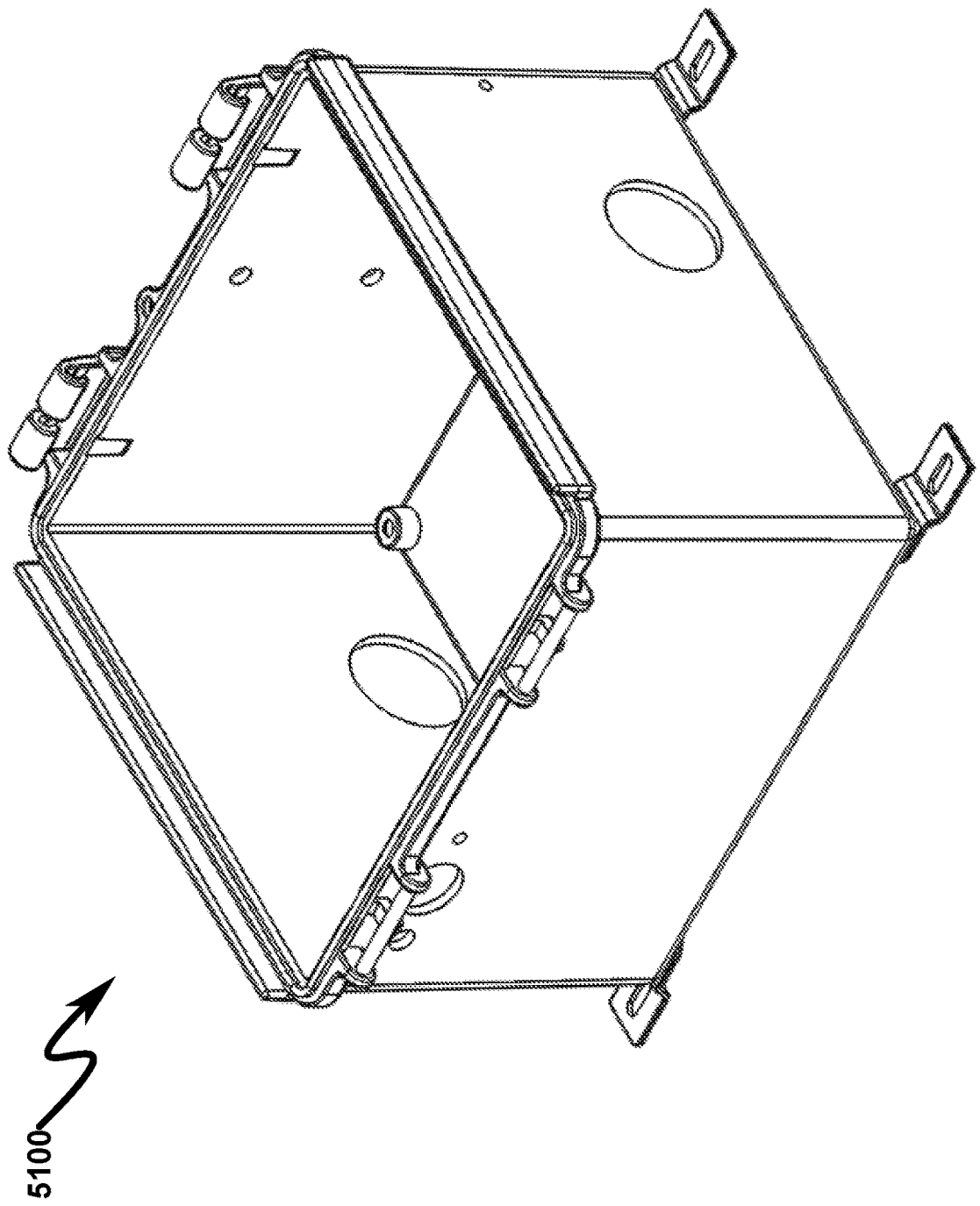
FIG. 51 illustrates a top left rear perspective view of a preferred exemplary system embodiment depicting an alternative modular audio module (MAM) enclosure bottom shell incorporating water-tight seals.
Figure 52:
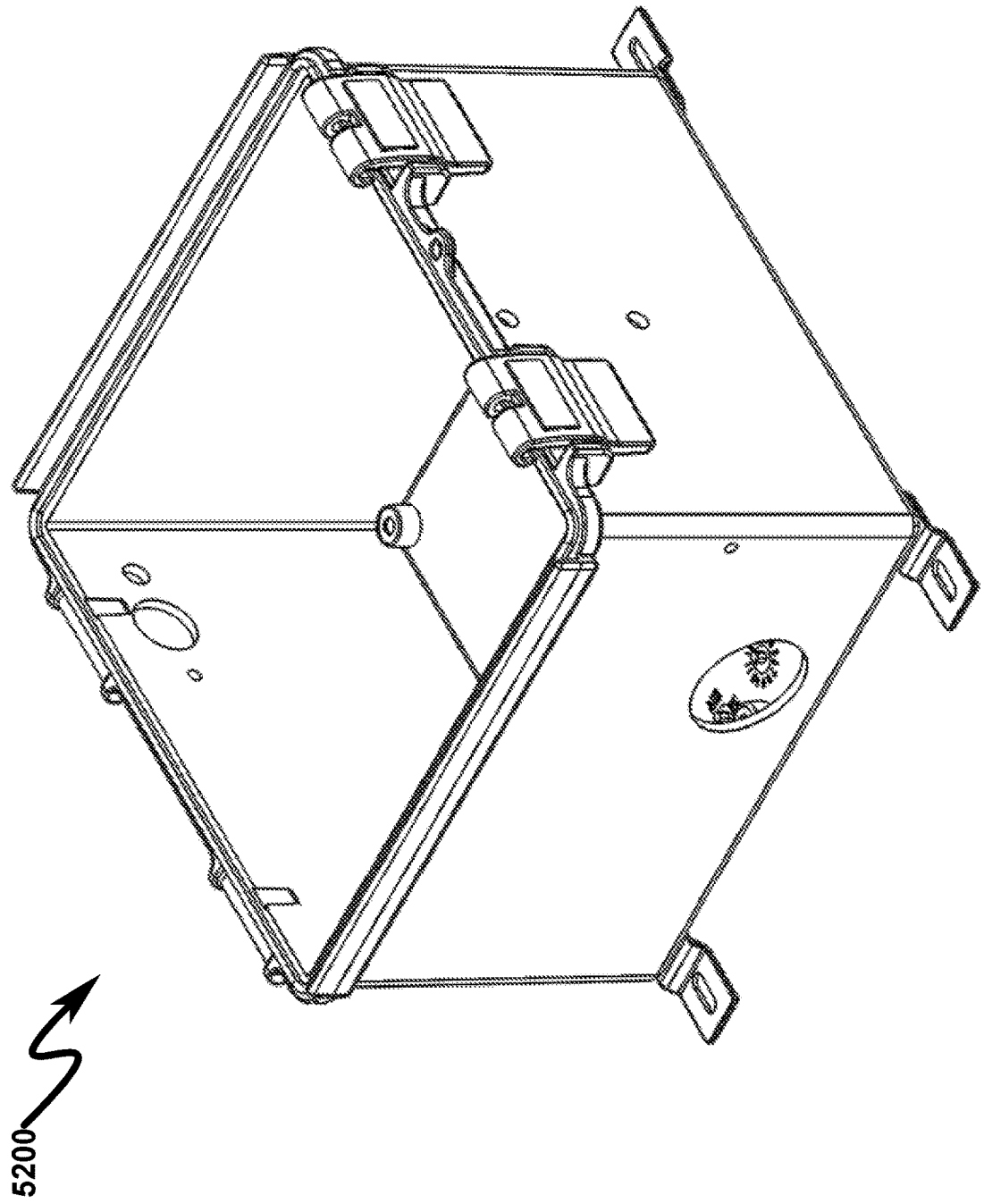
FIG. 52 illustrates a top left front perspective view of a preferred exemplary system embodiment depicting an alternative modular audio module (MAM) enclosure bottom shell incorporating water-tight seals.
Figure 53:
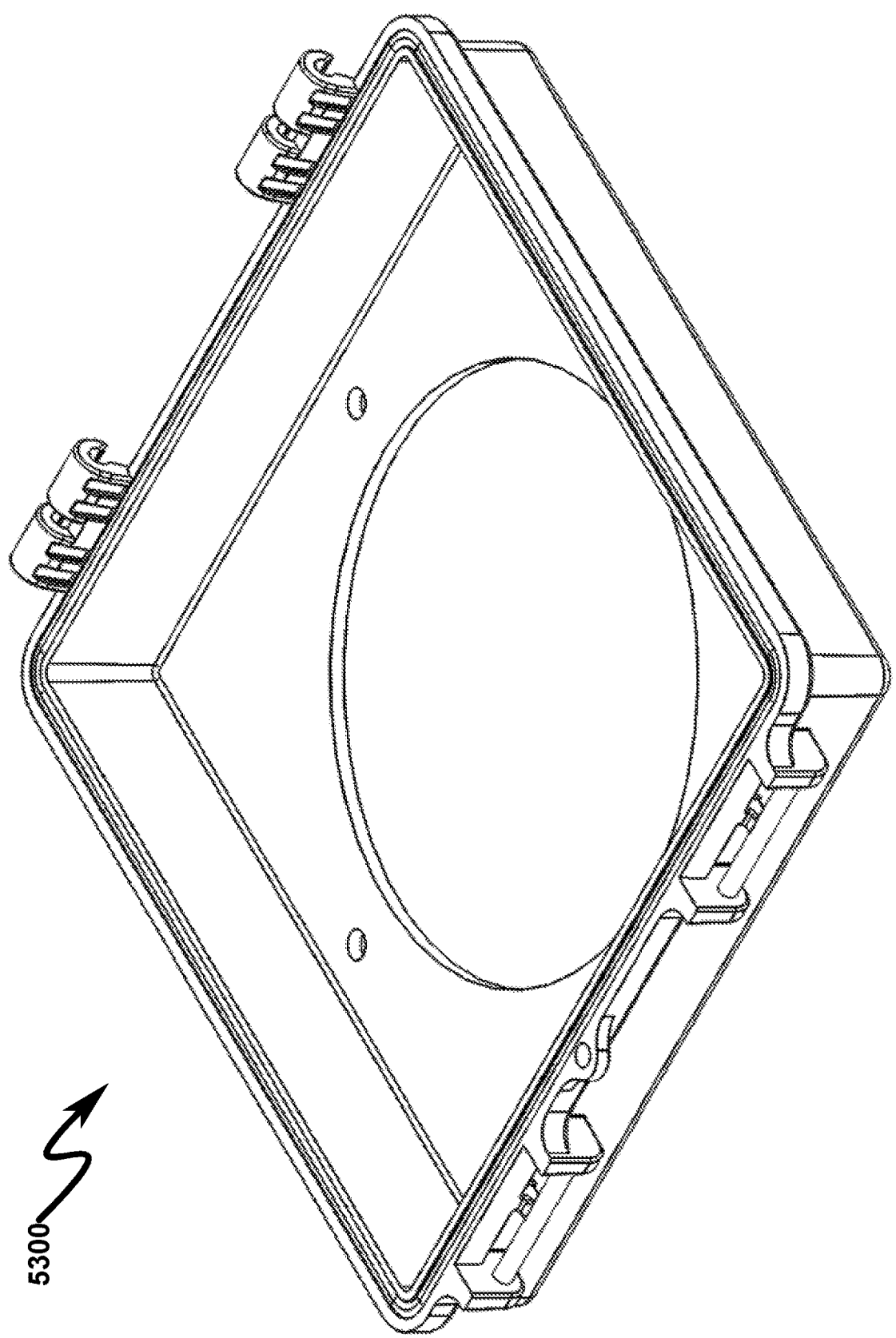
FIG. 53 illustrates a bottom right front perspective view of a preferred exemplary system embodiment depicting an alternative modular audio module (MAM) enclosure top shell cover incorporating water-tight seals.
Figure 54:
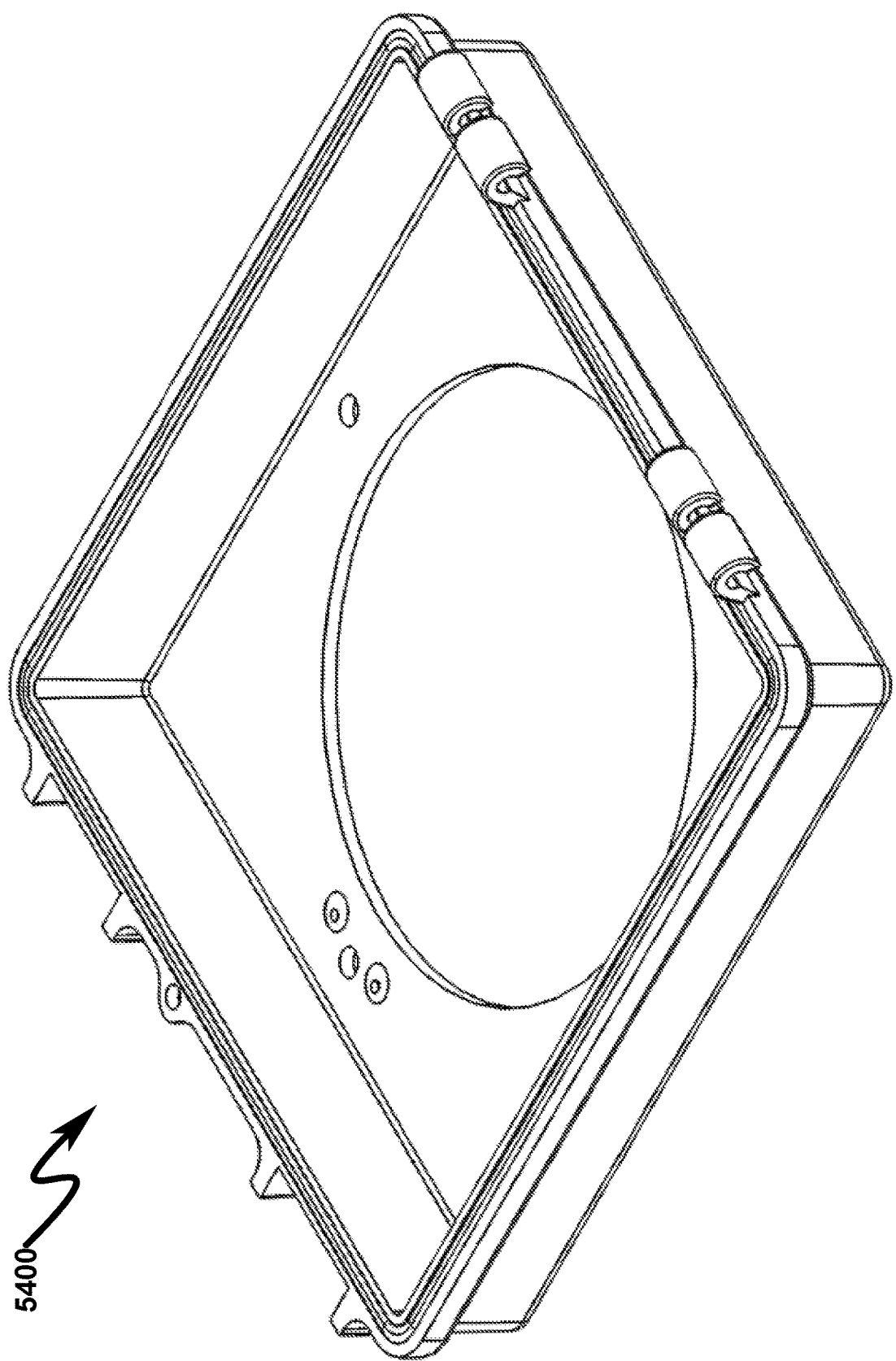
FIG. 54 illustrates a bottom right rear perspective view of a preferred exemplary system embodiment depicting an alternative modular audio module (MAM) enclosure top shell cover incorporating water-tight seals.
Figure 55:
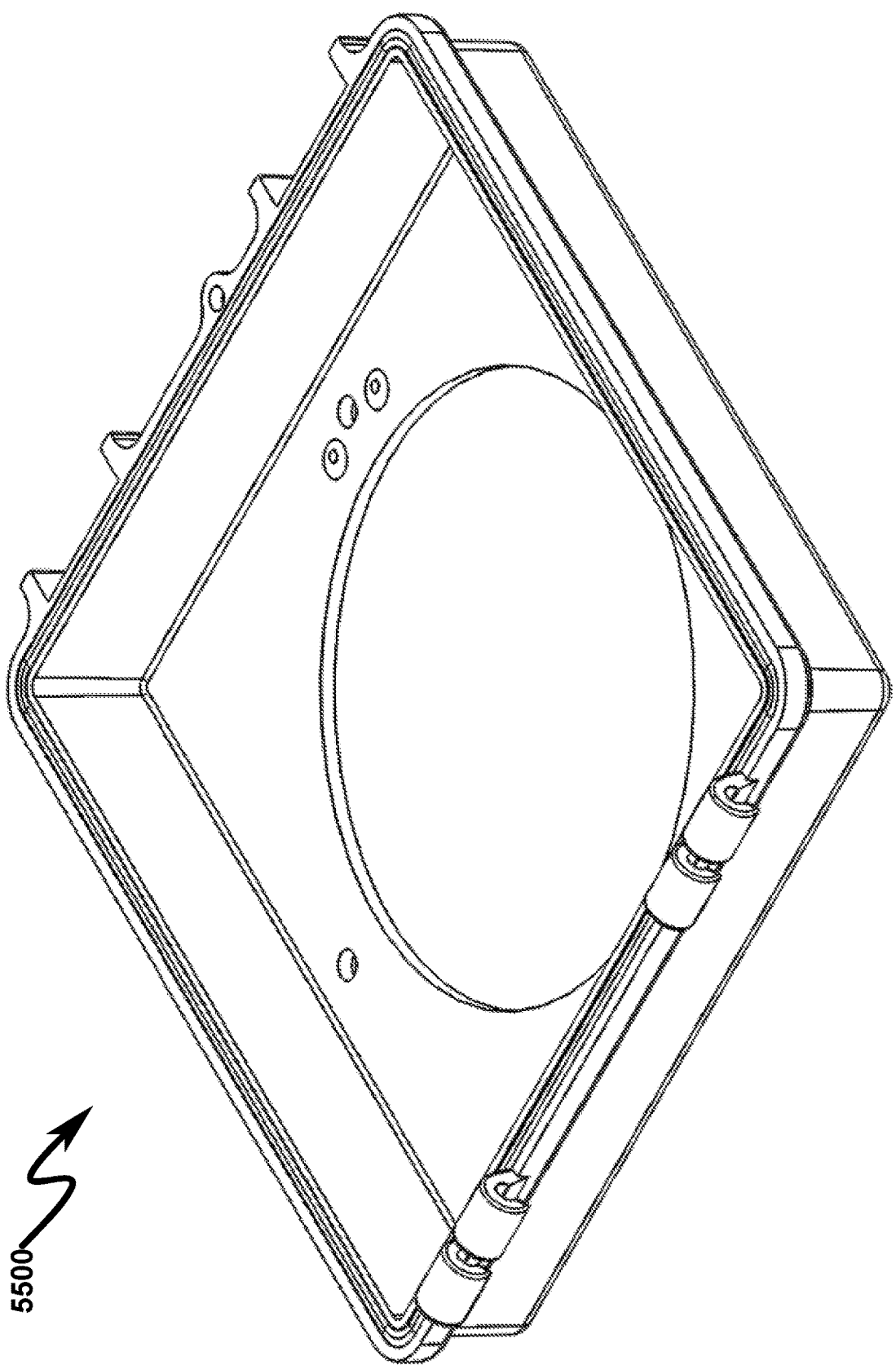
FIG. 55 illustrates a bottom left rear perspective view of a preferred exemplary system embodiment depicting an alternative modular audio module (MAM) enclosure top shell cover incorporating water-tight seals.
Figure 56:
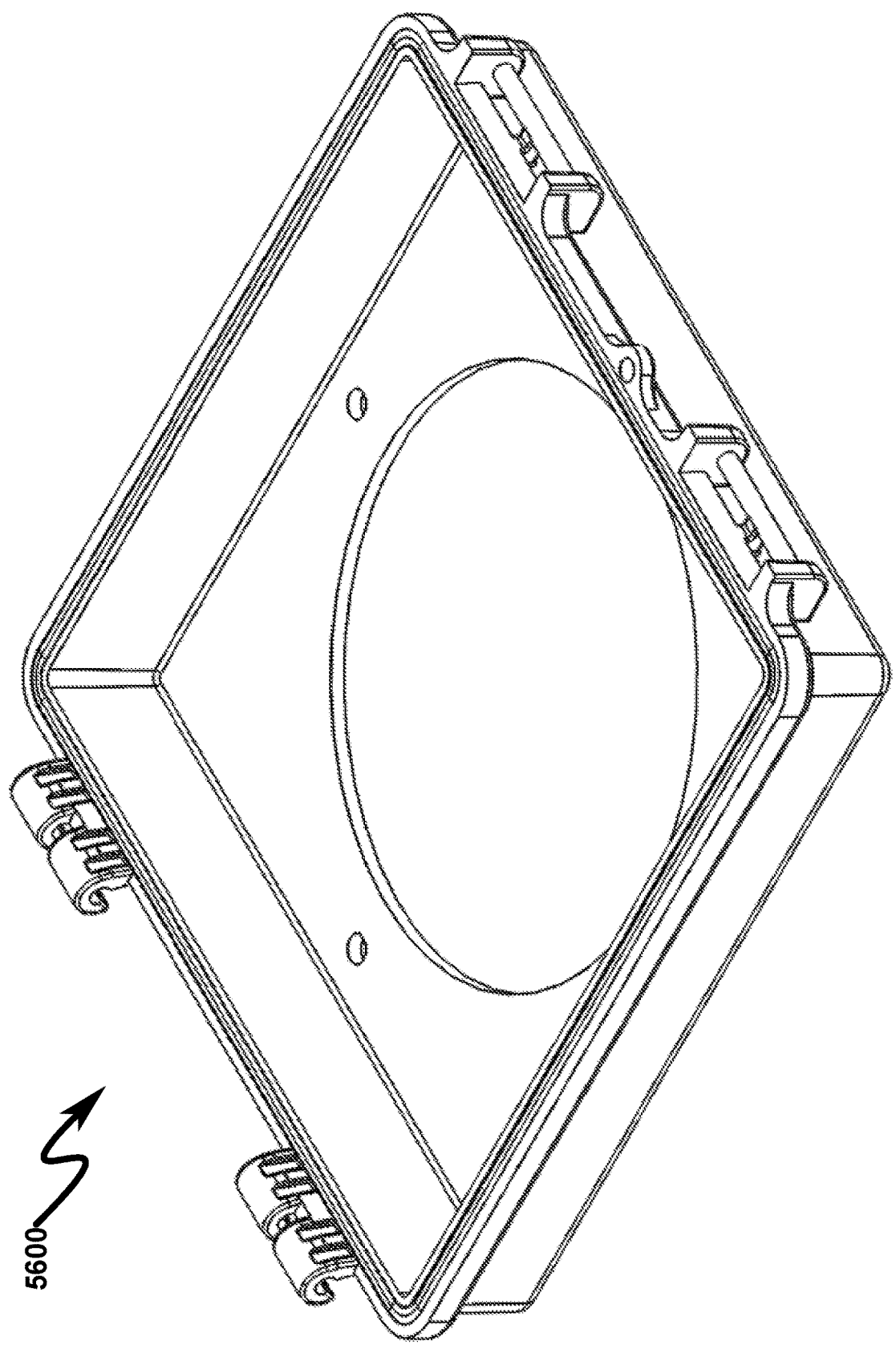
FIG. 56 illustrates a bottom left front perspective view of a preferred exemplary system embodiment depicting an alternative modular audio module (MAM) enclosure top shell cover incorporating water-tight seals.

An alternative MAM enclosure incorporating water-tight seals is generally depicted in FIG. 49 (4900)-FIG. 56 (5600). Here the enclosure openings can be fitted to an audio speaker and/or other PED detectors as required in the particular application context.

Figure 57:
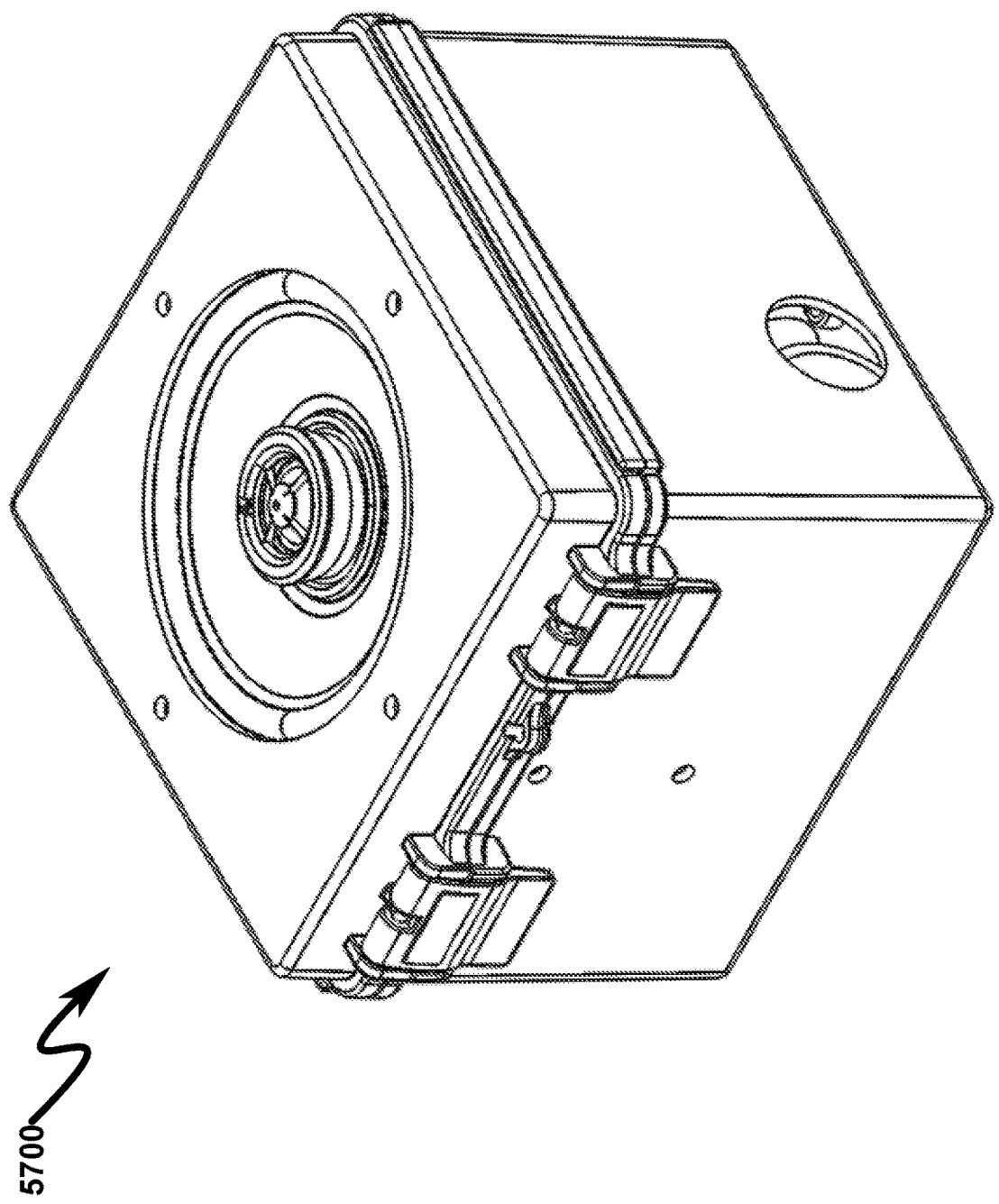
FIG. 57 illustrates a top right front perspective view of a preferred exemplary system embodiment depicting an alternative modular audio module (MAM) assembly incorporating water-tight seals.
Figure 58:
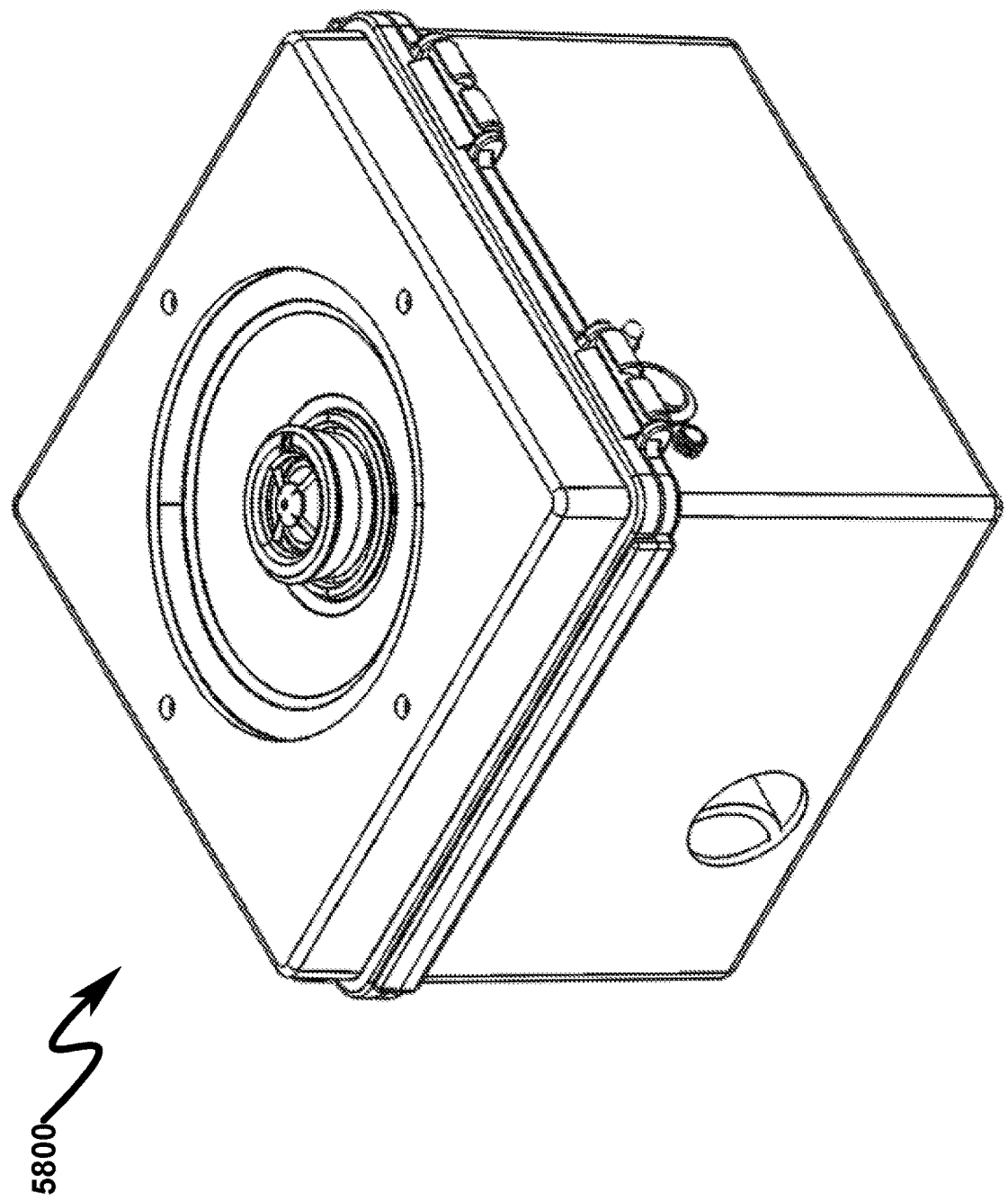
FIG. 58 illustrates a top right rear perspective view of a preferred exemplary system embodiment depicting an alternative modular audio module (MAM) assembly incorporating water-tight seals.
Figure 59:
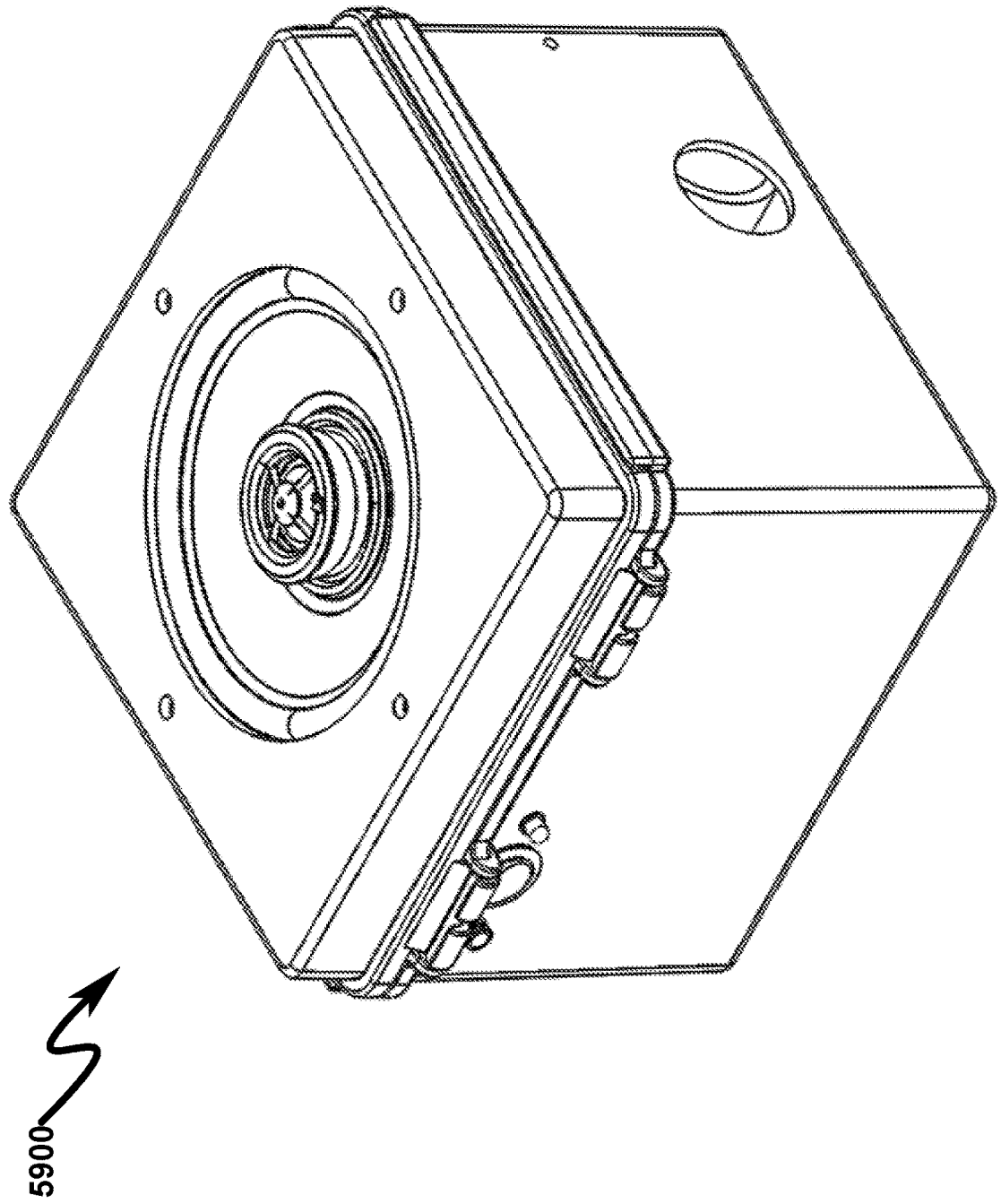
FIG. 59 illustrates a top left rear perspective view of a preferred exemplary system embodiment depicting an alternative modular audio module (MAM) assembly incorporating water-tight seals.
Figure 60:
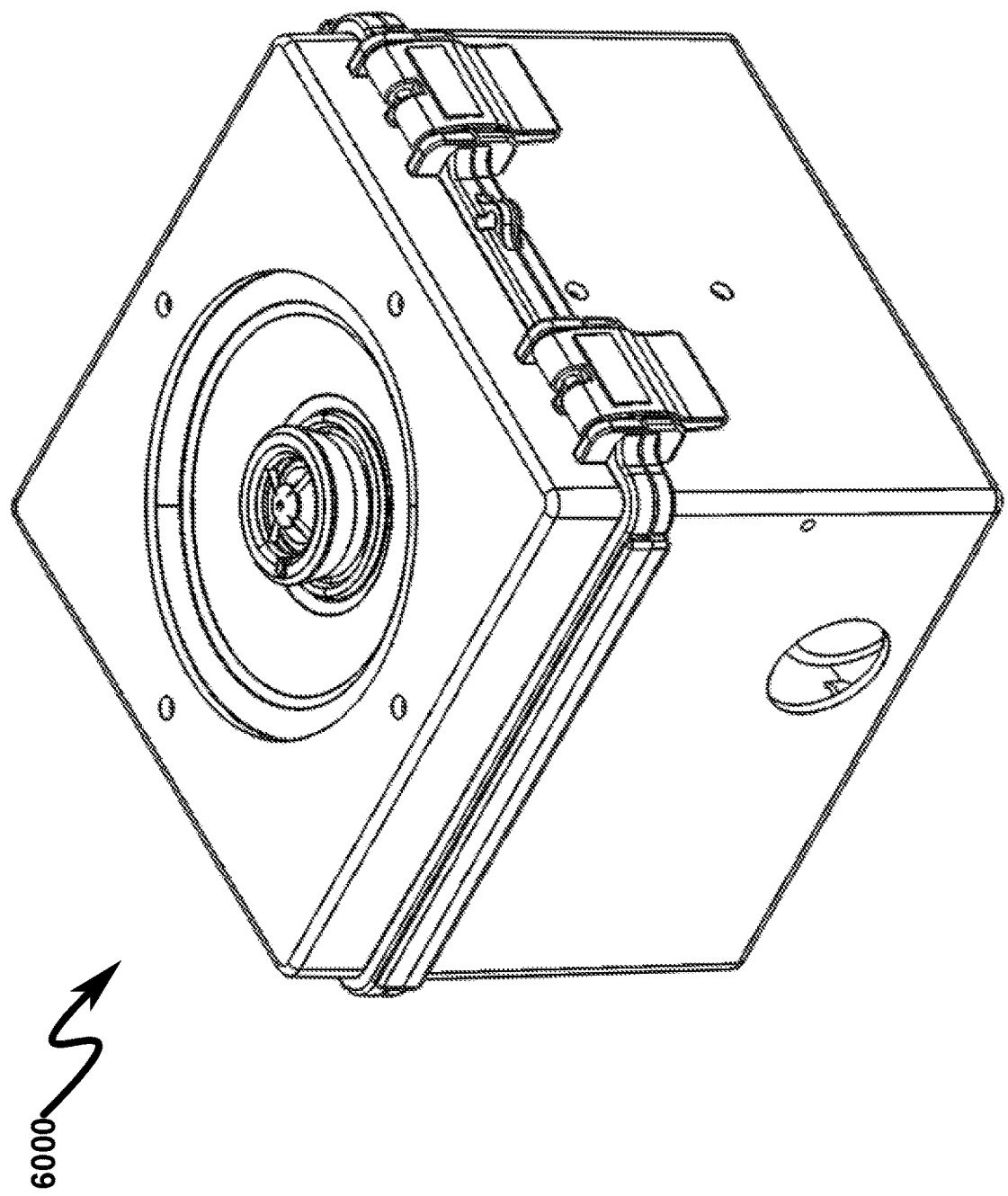
FIG. 60 illustrates a top left front perspective view of a preferred exemplary system embodiment depicting an alternative modular audio module (MAM) assembly incorporating water-tight seals.
Figure 61:
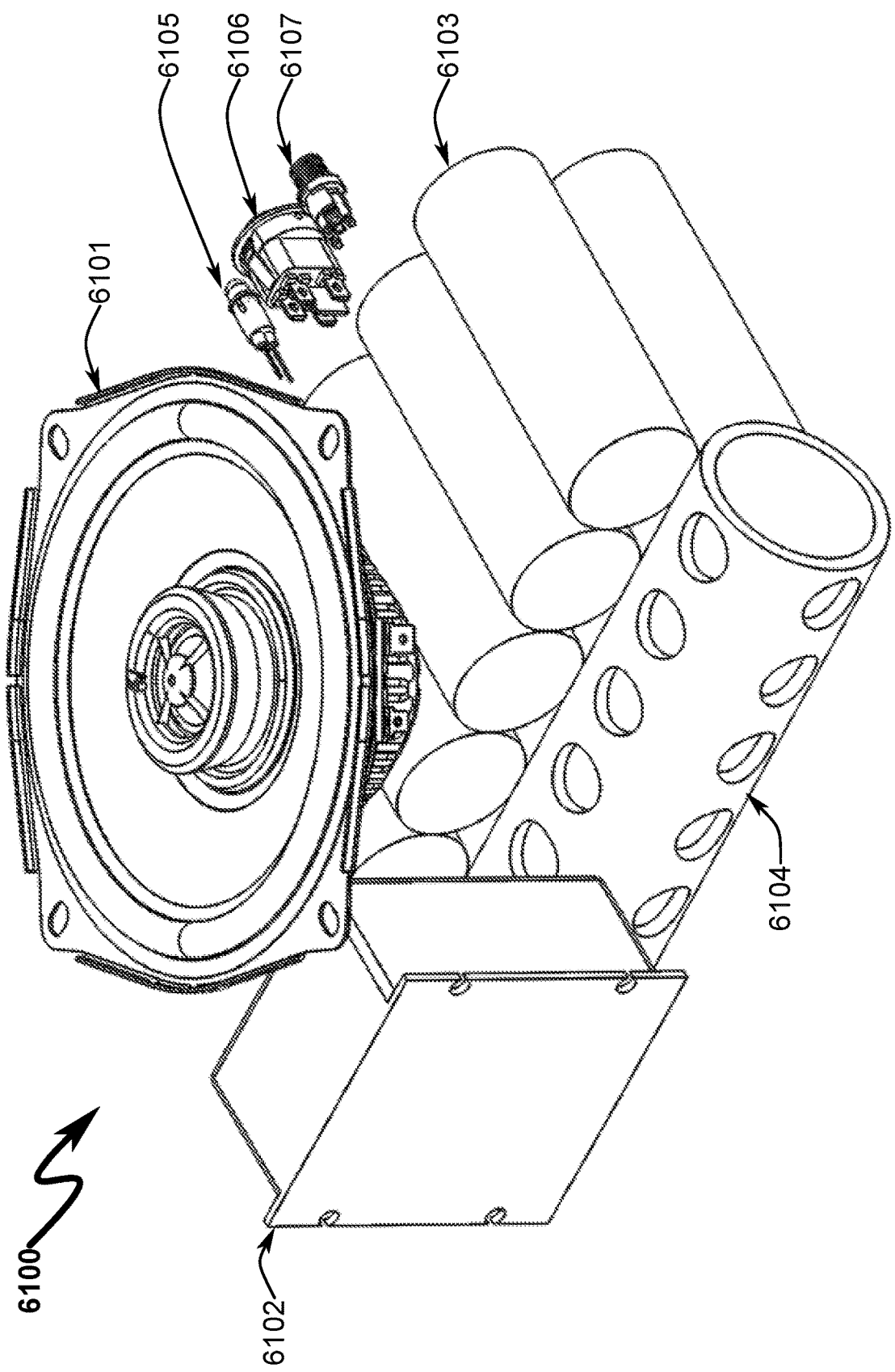
FIG. 61 illustrates a top right front perspective view of a preferred exemplary system embodiment depicting an alternative modular audio module (MAM) internal assembly view of major components (without water-tight sealing enclosure)
Figure 62:
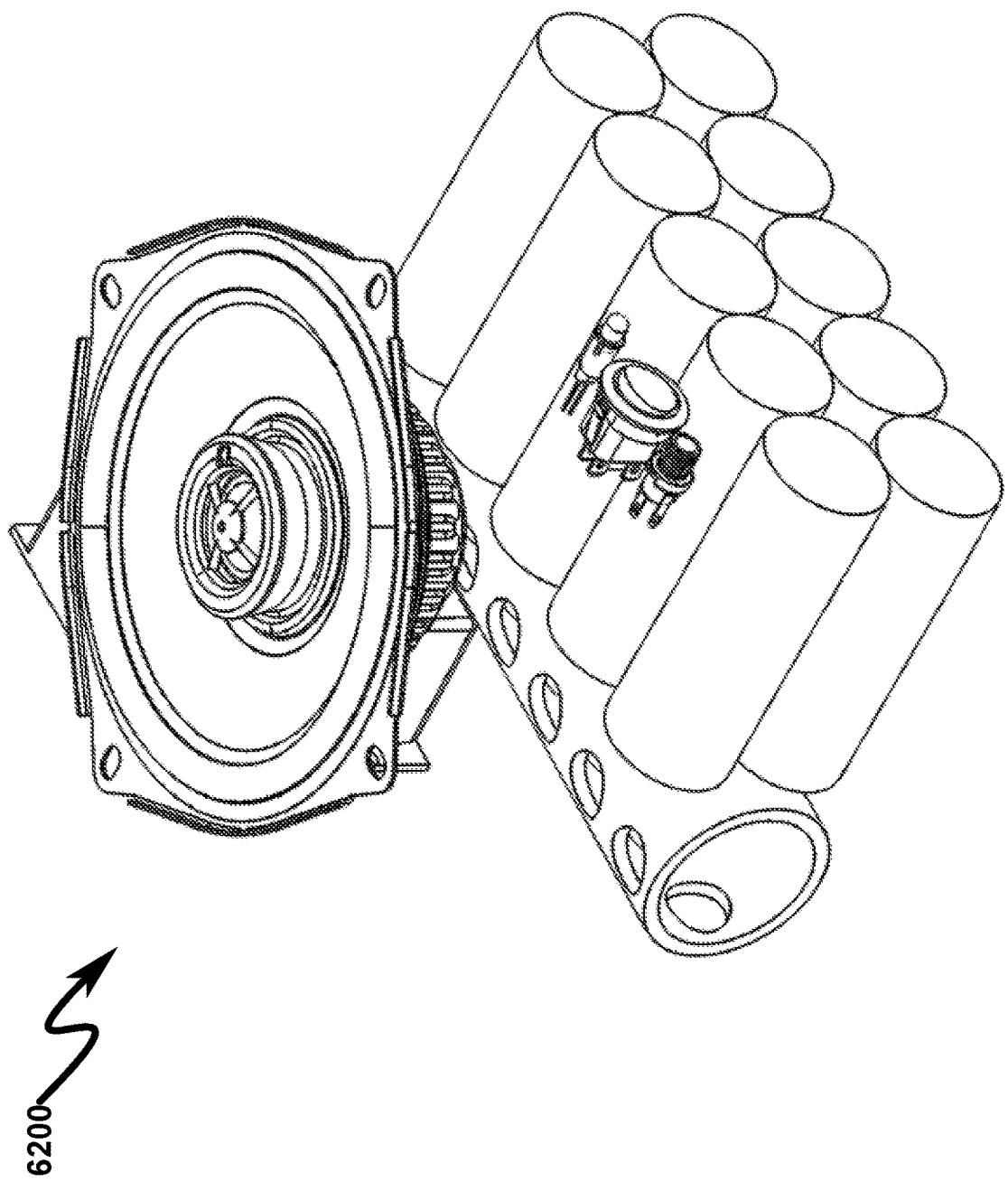
FIG. 62 illustrates a top right rear perspective view of a preferred exemplary system embodiment depicting an alternative modular audio module (MAM) internal assembly view of major components (without water-tight sealing enclosure)
Figure 63:
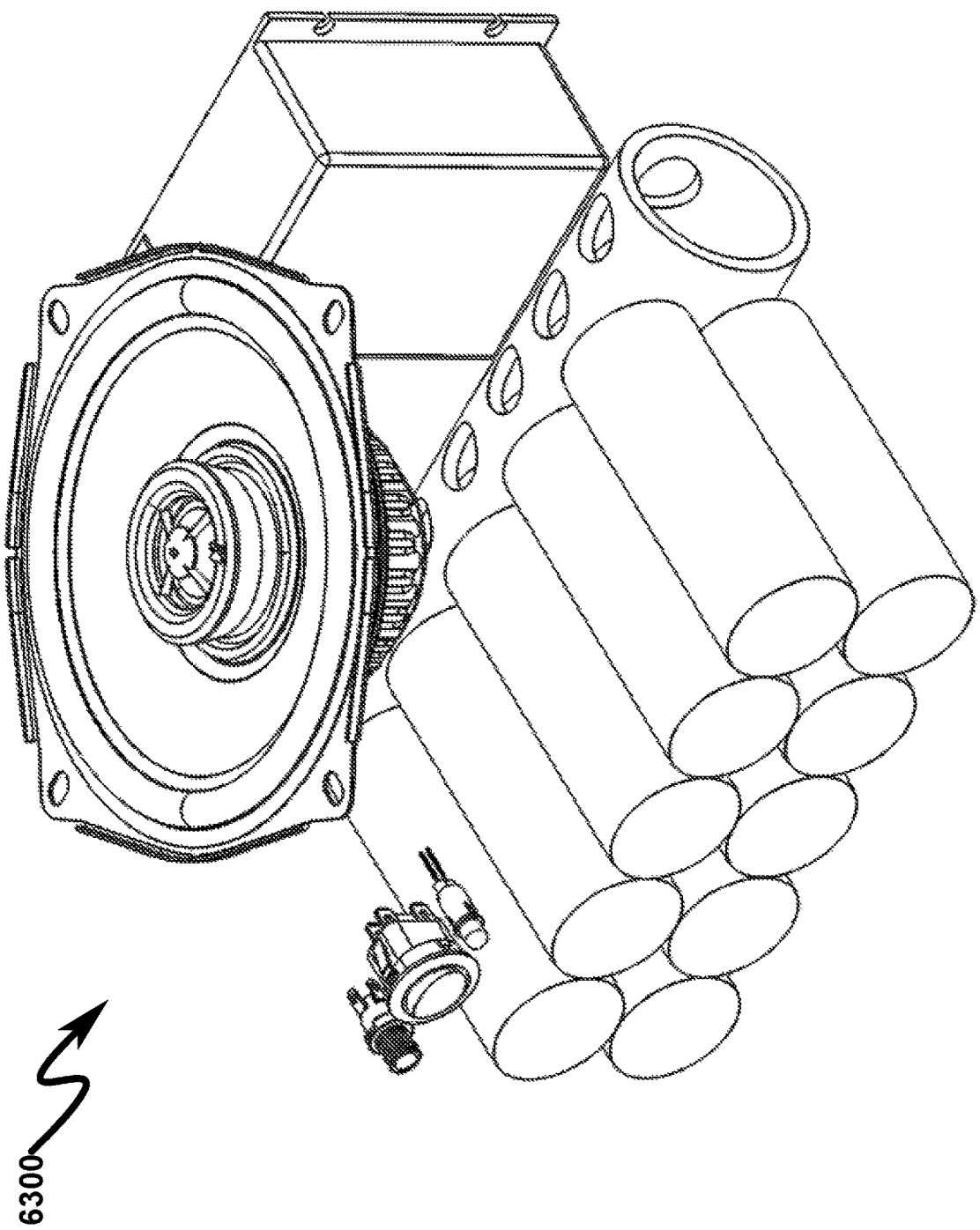
FIG. 63 illustrates a top left rear perspective view of a preferred exemplary system embodiment depicting an alternative modular audio module (MAM) internal assembly view of major components (without water-tight sealing enclosure)
Figure 64:
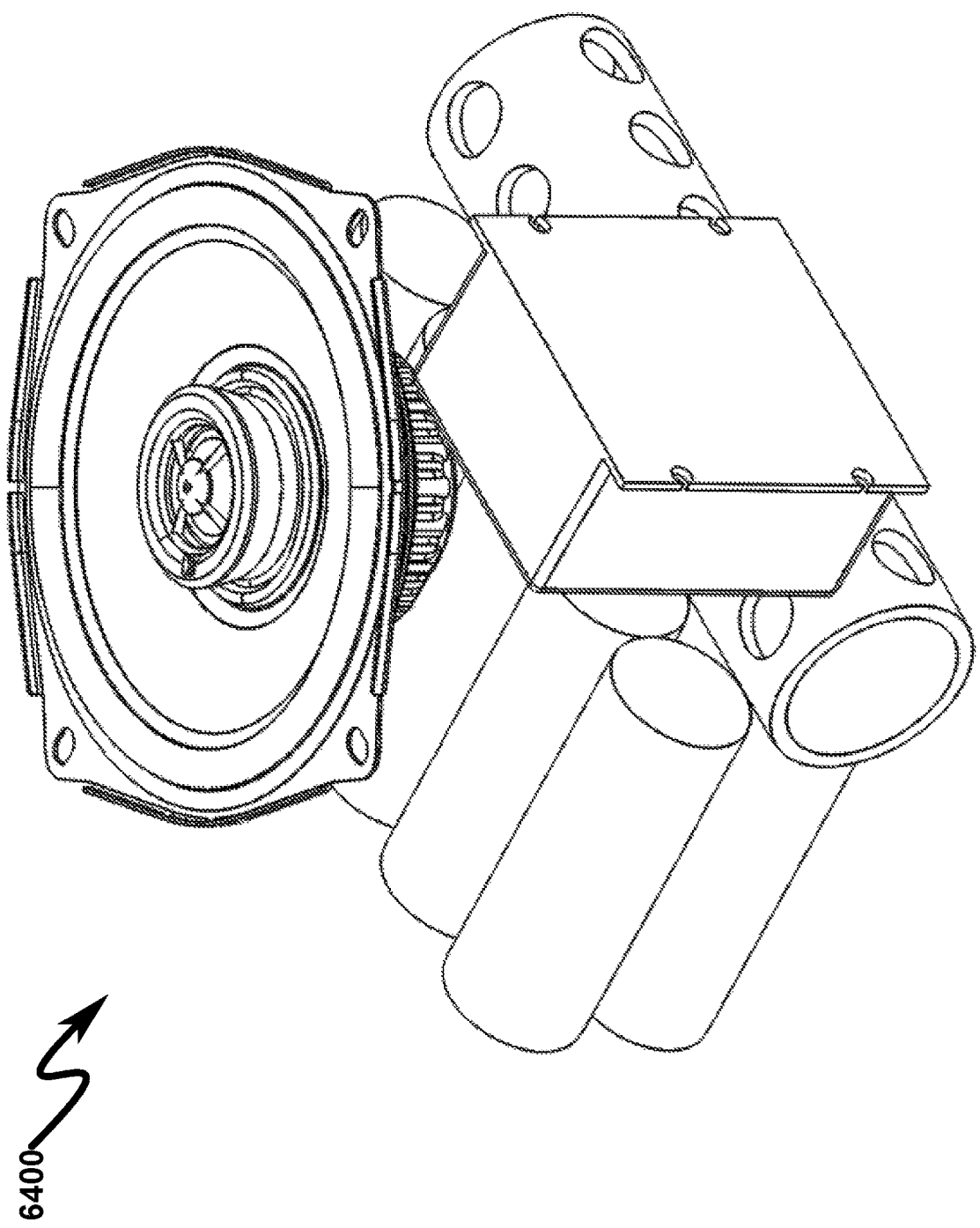
FIG. 64 illustrates a top left front perspective view of a preferred exemplary system embodiment depicting an alternative modular audio module (MAM) internal assembly view of major components (without water-tight sealing enclosure).

Various external views of this water-tight assembly are depicted in FIG. 57 (5700)-FIG. 60 (6000). Major internal components associated with this assembly are depicted in FIG. 61 (6100)-FIG. 64 (6400) where the water-tight enclosure has been hidden from view. These views generally depict the speaker (top) (6101), amplifier box (6102), battery packs (×10) (6103), acoustic tube (6104) (to prevent unwanted case vibrations at high speaker volume levels), indicator light (6105), power switch (6106), and pushbutton control switch (6107) used to implement and operate the MAM.

Anti-Terrorist Application Context

The present invention specifically anticipates that some embodiments of the invention may have particular application to the detection of terrorist events and response to terrorist events by government agencies. The audio mesh network described herein may be used to deploy a spatially diverse set of MAMs that may be used to both detect physical events associated with a terrorist event, but also provide for immediate audio response to these events at the point of the terrorist event.

For example, a MAM configured with a radiation detector and wind speed/direction sensor may be configured to automatically emit emergency audio messages to the public to direct them in a direction opposite the wind flow of radiation should a nuclear dirty bomb be triggered. Similarly, thermal detectors, explosion detectors, and other hazard related detectors can be used to trigger preprogrammed audio messages instructing the public on the path to safety should such an event occur. Communication between MAMs within the audio mesh network may also provide further information as to the scope of the terrorist event and yet further define the path to safety as determined by an overall evaluation of each MAM within the mesh network.

Communication of the terrorist event to the CCS and appropriate government authorities is also anticipated such that the extent of the event can be monitored by interrogating each MAM within the audio mesh network to determine which MAMs are impacted and their specific GPS location. As the MAMs may be mobile, this GPS information can be used to dynamically determine the scope of the event. Furthermore, the use of DDA in this context may provide for additional mobile mapping of the scope of the terrorist event.

An example of this anti-terrorism application may be found in the use of the present invention in providing audio communication along the path of a footrace such as the Boston Marathon, New York Marathon, or Chicago Marathon. In these circumstances there are large crowds that are constantly in motion over a widely diverse spatial area. As such, it is difficult to provide for centralized communication to each of the participants in the event of a terrorist event such as a bombing or the like. The use of the present invention in these circumstances allows each MAM to autonomously detect a terrorist bombing event and direct the race participants to an appropriate safe rally point depending on the specific location of the terrorist event. This safe harbor direction may be indicated by audio messages, indicator light alarm, audio signal alarm, or other PED and/or alarm devices controlled by the MAM. Since each MAM may operate independently as well as in coordination with other MAM in the audio mesh, these directions can be dynamically updated to provide updated safe evacuation routes in the event of a multiple bombing event such as that which happened in the Boston Marathon on Apr. 15, 2013.

Preferred Embodiment System Summary

The present invention preferred exemplary system embodiment anticipates a wide variety of variations in the basic theme of construction, but can be generalized as a mobile audio mesh distribution (MAD) system comprising:

(a) computer control system (CCS); and
(b) a plurality of modular audio modules (MAM); wherein:
the CCS comprises:
  (1) digital computer control (DCC);
  (2) WiFi radio frequency transceiver (WRT); and
  (3) emergency radio frequency transceiver (ERT);
the MAM each comprises:
  (1) WiFi radio frequency transceiver (WMT);
  (2) emergency radio frequency transceiver (EMT);
  (3) digital audio control (DAC);
  (4) global positioning system (GPS) real-time clock (RTC);
  (5) local audio storage (LAS);
  (6) audio playback recorder (APR); and
  (7) audio amplifier/speaker (AAS);
the DCC is electrically coupled with the WRT and the ERT;
within each of the MAM, the DAC are each electrically coupled with their respective WMT, EMT, RTC, LAS, and APR;
within each of the MAM, the APR is electrically coupled with the AAS;
within each of the MAM, the LAS is configured to store digital audio information;
the CCS is configured to transmit using the DCC an emergency message event (EME) via the ERT to at least one of the MAM for reception by the EMT on the at least one of the MAM;
the MAM are each configured to receive the EME via the EMT under control of the DAC;
the DAC is configured to emit an emergency audio message (EAM) via digital transmission to the APR and audio signaling to the AAS upon receipt of the EME;
the CCS is configured to transmit a master CONFIG file (MCF) to at least one of the MAM via communication between the WRT and the WMT;
the master CONFIG file comprises an audio file list (AFL);
the AFL comprises a paired list of audio playback filenames (AFN) and their playback date/time/event triggers (PDT);
the DAC are each configured to request the master CONFIG file (MCF) using the WMT from another of the MAM;
the DAC on each of the MAM are each configured to compare a local CONFIG file (LCF) stored on the LAS of the MAM to any MCF received from another of the MAM and if these files differ, to update the LCF with the contents of the MCF and request a download of any AFN not present on the MAM from another MAM to the LAS;
the DAC on each of the MAM are each configured to compare date/time information from the RTC to the PDT and emit audio data from one of the AFN to the APR;
the APR is configured to receive digital audio signals (DAS) from the DAC and convert the DAI to analog audio signal levels (ASL); and
the AAS is configured to receive the ASL from the APR and emit amplified audio on a speaker.

This general system summary may be augmented by the various elements described herein to produce a wide variety of invention embodiments consistent with this overall design description.

Preferred Embodiment Method Summary

The present invention preferred exemplary method embodiment anticipates a wide variety of variations in the basic theme of implementation, but can be generalized as a mobile audio mesh distribution (MAD) method, the method operating in conjunction with a mobile audio mesh distribution (MAD) system comprising:
  (a) computer control system (CCS); and
  (b) a plurality of modular audio modules (MAM);
wherein:
the CCS comprises:
  (1) digital computer control (DCC);
  (2) WiFi radio frequency transceiver (WRT); and
  (3) emergency radio frequency transceiver (ERT);
the MAM each comprises:
  (1) WiFi radio frequency transceiver (WMT);
  (2) emergency radio frequency transceiver (EMT);
  (3) digital audio control (DAC);
  (4) global positioning system (GPS) real-time clock (RTC);
  (5) local audio storage (LAS);
  (6) audio playback recorder (APR); and
  (7) audio amplifier/speaker (AAS);
the DCC is electrically coupled with the WRT and the ERT;
within each of the MAM, the DAC are each electrically coupled with their respective WMT, EMT, RTC, LAS, and APR;
within each of the MAM, the APR is electrically coupled with the AAS;
within each of the MAM, the LAS is configured to store digital audio information;
the APR is configured to receive digital audio signals (DAS) from the DAC and convert the DAI to analog audio signal levels (ASL); and
the AAS is configured to receive the ASL from the APR and emit amplified audio on a speaker;
wherein the method comprises the steps of:
  (1) with the CCS, transmitting using the DCC, an emergency message event (EME) via the ERT to at least one of the MAM for reception by the EMT on the at least one of the MAM;
  (2) with at least one of the MAM, receiving the EME via the EMT under control of the DAC;
  (3) with the DAC, emitting an emergency audio message (EAM) via digital transmission to the APR and audio signaling to the AAS upon receipt of the EME;
  (4) with the CCS, transmitting a master CONFIG file (MCF) to at least one of the MAM via communication between the WRT and the WMT;
  (5) with the DAC, requesting the master CONFIG file (MCF) using the WMT from another of the MAM;
  (6) with the DAC on each of the MAM, comparing a local CONFIG file (LCF) stored on the LAS of the MAM to any MCF received from another of the MAM and if these files differ, to update the LCF with the contents of the MCF and request a download of any AFN not present on the MAM from another MAM to the LAS; and
  (7) with the DAC on each of the MAM, comparing date/time information from the RTC to playback date/time/event triggers (PDT) in the MCF and emitting audio data from one of audio playback filenames (AFN) present in the MCF to the APR.

One skilled in the art will recognize that these method steps may be augmented or rearranged without limiting the teachings of the present invention. This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the DAC is configured to generate the EAM using either a preprogrammed audio message retrieved from the LAS or to generate the EAM using a text-to-speech converter that interprets the contents of the EME and converts the contents of the EME from text to speech.

An embodiment wherein the ERT and the EMT operate under a PAINLESSMESH network protocol.

An embodiment wherein the ERT and the EMT each comprise a 900 MHz transceiver.

An embodiment wherein the CCS is configured to direct a drone delivery aircraft (DDA) to aerially travel between one or more of the MAM that are in WiFi communication with the CCS to one or more of the MAM that are not in WiFi communication with the CCS and transfer an updated CONFIG file received from one or more of the MAM that are in WiFi communication with the CCS to the one or more of the MAM that are not in WiFi communication with the CCS.

An embodiment wherein the CCS is configured to direct a drone delivery aircraft (DDA) to deliver backup communication data (BCD) received from the CCS to one or more of the MAM in the event of WiFi communication loss between the CCS and the MAM.

An embodiment wherein at least one of the MAM further comprises a physical event detector (PED), the PED configured to transmit a status message to the CCS based on the detection of a physical event detected proximal to the at least one of the MAM.

An embodiment wherein at least one the MAM further comprises a physical event detector (PED), the detector selected from a group consisting of: indicator light alarm; audio signal alarm; 900 MHz signal strength detector; WiFi signal strength detector; battery capacity detector; battery voltage detector; ambient temperature detector; internal temperature detector; GPS coordinate detector; GPS real-time clock (RTC) timebase reference detector; audio output volume detector; ambient sound volume detector; RFID tracking identifier detector; humidity detector; motion detector; wind speed detector; vibration detector; beta radiation detector; gamma radiation detector; neutron radiation detector; photo cell detector; visual image recording detector; infrared image recording detector; ultraviolet image recording detector; visual video recording detector; infrared video recording detector; and ultraviolet video recording detector.

An embodiment wherein at least one of the MAM further comprises a physical event detector (PED), the at least one of the MAM configured to emit an audio message to the AAS depending on the detection of a specific range of data generated by the PED or a Boolean logic expression (BLE) applied to data generated by the PED.

An embodiment wherein the at least one of the MAM further comprises a physical event detector (PED), the at least one of the MAM configured to emit a specific audio message, indicator light alarm, or audio signal alarm on the AAS describing safe passage from a terrorist event detected at the locale of at least one of the MAM based on the detection of a specific range of data generated by the PED and information received from another MAM of the MAM.

One skilled in the art will recognize that other embodiments are possible based on combinations of the embodiments listed above and/or elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., floppy disks and hard drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F.3d 1346 (Fed. Cir. 2007) (U.S. patent application Ser. No. 09/211,928), the present invention scope is limited to computer readable media wherein the media is both tangible and non-transitory.

CONCLUSION

A mobile audio mesh distribution (MAD) system/method allowing synchronized audio distribution to modular audio modules (MAMs) and/or drone delivery aircraft (DDA) in mesh audio network (MAN) has been disclosed. The system/method utilizes a computer control system (CCS) that communicates wirelessly using a plurality of RF transceivers (RFT) over a RF mesh network (RMN) with one or more MAM that are configured to independently communicate with each other and automatically determine if audio updates are required from the CCS. The MAM are configured to query other MAMs in the RMN to determine if a connected MAM has updated audio/text (UAT), and if so, to download the UAT and schedule audio playback on a speaker. Messages may be transmitted to the MAM in the event of an emergency, terrorist event, or a physical event detected (PED) using prerecorded or updated audio that trigger immediate or scheduled playback by the MAM.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. § 112(f) and such claim shall be construed to cover the corresponding structure, material, or acts described in the specification and equivalents thereof.

The phrase "MEANS FOR" specifically invokes the means-plus-function claims limitation recited in 35 U.S.C. § 112(f) and such claim shall be construed to cover the corresponding structure, material, or acts described in the specification and equivalents thereof.

The phrase "STEP FOR" specifically invokes the step-plus-function claims limitation recited in 35 U.S.C. § 112(f) and such claim shall be construed to cover the corresponding structure, material, or acts described in the specification and equivalents thereof.

The step-plus-function claims limitation recited in 35 U.S.C. § 112(f) shall be construed to cover the corresponding structure, material, or acts described in the specification and equivalents thereof ONLY for such claims including the phrases "MEANS FOR", "MEANS", or "STEP FOR".

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A mobile audio mesh distribution (MAD) system comprising:
(a) computer control system (CCS); and
(b) a plurality of modular audio modules (MAM);
wherein:
said CCS comprises:
   (1) digital computer control (DCC);
   (2) WiFi radio frequency transceiver (WRT); and
   (3) emergency radio frequency transceiver (ERT);
said MAM each comprises:
   (1) WiFi radio frequency transceiver (WMT);
   (2) emergency radio frequency transceiver (EMT);
   (3) digital audio control (DAC);
   (4) global positioning system (GPS) real-time clock (RTC);
   (5) local audio storage (LAS);
   (6) audio playback recorder (APR); and
   (7) audio amplifier/speaker (AAS);
said DCC is electrically coupled with said WRT and said ERT;
within each of said MAM, said DAC are each electrically coupled with their respective WMT, EMT, RTC, LAS, and APR;
within each of said MAM, said APR is electrically coupled with said AAS;
within each of said MAM, said LAS is configured to store digital audio information;
said CCS is configured to transmit using said DCC an emergency message event (EME) via said ERT to at least one of said MAM for reception by said EMT on said at least one of said MAM;
said MAM are each configured to receive said EME via said EMT under control of said DAC;
said DAC is configured to emit an emergency audio message (EAM) via digital transmission to said APR and audio signaling to said AAS upon receipt of said EME;
said CCS is configured to transmit a master CONFIG file (MCF) to at least one of said MAM via communication between said WRT and said WMT;
said master CONFIG file comprises an audio file list (AFL);
said AFL comprises a paired list of audio playback filenames (AFN) and their playback date/time/event triggers (PDT);
said DAC are each configured to request said master CONFIG file (MCF) using said WMT from another of said MAM;
said DAC on each of said MAM are each configured to compare a local CONFIG file (LCF) stored on said LAS of said MAM to any MCF received from another of said MAM and if these files differ, to update said LCF with the contents of said MCF and request a download of any AFN not present on said MAM from another MAM to said LAS;
said DAC on each of said MAM are each configured to compare date/time information from said RTC to said PDT and emit audio data from one of said AFN to said APR;
said APR is configured to receive digital audio signals (DAS) from said DAC and convert said DAI to analog audio signal levels (ASL); and
said AAS is configured to receive said ASL from said APR and emit amplified audio on a speaker.

2. The mobile audio mesh distribution system of claim 1 wherein said DAC is configured to generate said EAM using either a preprogrammed audio message retrieved from said LAS or to generate said EAM using a text-to-speech converter that interprets the contents of said EME and converts the contents of said EME from text to speech.

3. The mobile audio mesh distribution system of claim 1 wherein said ERT and said EMT operate under a PAINLESSMESH network protocol.

4. The mobile audio mesh distribution system of claim 1 wherein said ERT and said EMT each comprise a 900 MHz transceiver.

5. The mobile audio mesh distribution system of claim 1 wherein said CCS is configured to direct a drone delivery aircraft (DDA) to aerially travel between one or more of said MAM that are in WiFi communication with said CCS to one or more of said MAM that are not in WiFi communication with said CCS and transfer an updated CONFIG file received from one or more of said MAM that are in WiFi communication with said CCS to said one or more of said MAM that are not in WiFi communication with said CCS.

6. The mobile audio mesh distribution system of claim 1 wherein said CCS is configured to direct a drone delivery aircraft (DDA) to deliver backup communication data (BCD) received from said CCS to one or more of said MAM in the event of WiFi communication loss between said CCS and said MAM.

7. The mobile audio mesh distribution system of claim 1 wherein at least one of said MAM further comprises a physical event detector (PED), said PED configured to transmit a status message to said CCS based on the detection of a physical event detected proximal to said at least one of said MAM.

8. The mobile audio mesh distribution system of claim 1 wherein at least one of said MAM further comprises a physical event detector (PED), said detector selected from a group consisting of: indicator light alarm; audio signal alarm; 900 MHz signal strength detector; WiFi signal strength detector; battery capacity detector; battery voltage detector; ambient temperature detector; internal temperature detector; GPS coordinate detector; GPS real-time clock (RTC) timebase reference detector; audio output volume detector; ambient sound volume detector; RFID tracking identifier detector; humidity detector; motion detector; wind speed detector; vibration detector; beta radiation detector; gamma radiation detector; neutron radiation detector; photo cell detector; visual image recording detector; infrared image recording detector; ultraviolet image recording detector; visual video recording detector; infrared video recording detector; and ultraviolet video recording detector.

9. The mobile audio mesh distribution system of claim 1 wherein at least one of said MAM further comprises a physical event detector (PED), said at least one of said MAM configured to emit an audio message to said AAS depending on the detection of a specific range of data generated by said PED or a Boolean logic expression (BLE) applied to data generated by said PED.

10. The mobile audio mesh distribution system of claim 1 wherein at least one of said MAM further comprises a physical event detector (PED), said at least one of said MAM configured to emit a specific audio message, indicator light alarm, or audio signal alarm on said AAS describing safe passage from a terrorist event detected at the locale of at least one of said MAM based on the detection of a specific range of data generated by said PED and information received from another MAM of said MAM.

11. A mobile audio mesh distribution (MAD) method, said method operating in conjunction with a mobile audio mesh distribution (MAD) system, said system comprising:

(a) computer control system (CCS); and
(b) a plurality of modular audio modules (MAM);
wherein:
said CCS comprises:
  (1) digital computer control (DCC);
  (2) WiFi radio frequency transceiver (WRT); and
  (3) emergency radio frequency transceiver (ERT);
said MAM each comprises:
  (1) WiFi radio frequency transceiver (WMT);
  (2) emergency radio frequency transceiver (EMT);
  (3) digital audio control (DAC);
  (4) global positioning system (GPS) real-time clock (RTC);
  (5) local audio storage (LAS);
  (6) audio playback recorder (APR); and
  (7) audio amplifier/speaker (AAS);
said DCC is electrically coupled with said WRT and said ERT;
within each of said MAM, said DAC are each electrically coupled with their respective WMT, EMT, RTC, LAS, and APR;
within each of said MAM, said APR is electrically coupled with said AAS;
within each of said MAM, said LAS is configured to store digital audio information;
said APR is configured to receive digital audio signals (DAS) from said DAC and convert said DAI to analog audio signal levels (ASL); and
said AAS is configured to receive said ASL from said APR and emit amplified audio on a speaker;
wherein said method comprises the steps of:
  (1) with said CCS, transmitting using said DCC, an emergency message event (EME) via said ERT to at least one of said MAM for reception by said EMT on said at least one of said MAM;
  (2) with at least one of said MAM, receiving said EME via said EMT under control of said DAC;
  (3) with said DAC, emitting an emergency audio message (EAM) via digital transmission to said APR and audio signaling to said AAS upon receipt of said EME;
  (4) with said CCS, transmitting a master CONFIG file (MCF) to at least one of said MAM via communication between said WRT and said WMT;
  (5) with said DAC, requesting said master CONFIG file (MCF) using said WMT from another of said MAM;
  (6) with said DAC on each of said MAM, comparing a local CONFIG file (LCF) stored on said LAS of said MAM to any MCF received from another of said MAM and if these files differ, to update said LCF with the contents of said MCF and request a download of any AFN not present on said MAM from another MAM to said LAS; and
  (7) with said DAC on each of said MAM, comparing date/time information from said RTC to playback date/time/event triggers (PDT) in said MCF and emitting audio data from one of audio playback filenames (AFN) present in said MCF to said APR.

12. The mobile audio mesh distribution method of claim 11 wherein said DAC is configured to generate said EAM using either a preprogrammed audio message retrieved from said LAS or to generate said EAM using a text-to-speech converter that interprets the contents of said EME and converts the contents of said EME from text to speech.

13. The mobile audio mesh distribution method of claim 11 wherein said ERT and said EMT operate under a PAINLESSMESH network protocol.

14. The mobile audio mesh distribution method of claim 11 wherein said ERT and said EMT each comprise a 900 MHz transceiver.

15. The mobile audio mesh distribution method of claim 11 wherein said CCS is configured to direct a drone delivery aircraft (DDA) to aerially travel between one or more of said MAM that are in WiFi communication with said CCS to one or more of said MAM that are not in WiFi communication with said CCS and transfer an updated CONFIG file received from one or more of said MAM that are in WiFi communication with said CCS to said one or more of said MAM that are not in WiFi communication with said CCS.

16. The mobile audio mesh distribution method of claim 11 wherein said CCS is configured to direct a drone delivery aircraft (DDA) to deliver backup communication data (BCD) received from said CCS to one or more of said MAM in the event of WiFi communication loss between said CCS and said MAM.

17. The mobile audio mesh distribution method of claim 11 wherein at least one of said MAM further comprises a physical event detector (PED), said PED configured to transmit a status message to said CCS based on the detection of a physical event detected proximal to said at least one of said MAM.

18. The mobile audio mesh distribution method of claim 11 wherein at least one of said MAM further comprises a physical event detector (PED), said detector selected from a group consisting of: indicator light alarm; audio signal alarm; 900 MHz signal strength detector; WiFi signal strength detector; battery capacity detector; battery voltage detector; ambient temperature detector; internal temperature detector; GPS coordinate detector; GPS real-time clock (RTC) timebase reference detector; audio output volume detector; ambient sound volume detector; RFID tracking identifier detector; humidity detector; motion detector; wind speed detector; vibration detector; beta radiation detector; gamma radiation detector; neutron radiation detector; photo cell detector; visual image recording detector; infrared image recording detector; ultraviolet image recording detector; visual video recording detector; infrared video recording detector; and ultraviolet video recording detector.

19. The mobile audio mesh distribution method of claim 11 wherein at least one of said MAM further comprises a physical event detector (PED), said at least one of said MAM configured to emit an audio message to said AAS depending on the detection of a specific range of data generated by said PED or a Boolean logic expression (BLE) applied to data generated by said PED.

20. The mobile audio mesh distribution method of claim 11 wherein at least one of said MAM further comprises a physical event detector (PED), said at least one of said MAM configured to emit a specific audio message, indicator light alarm, or audio signal alarm on said AAS describing safe passage from a terrorist event detected at the locale of at least one of said MAM based on the detection of a specific range of data generated by said PED and information received from another MAM of said MAM.

\* \* \* \* \*